(12) United States Patent
Wu

(10) Patent No.: US 10,069,892 B2
(45) Date of Patent: Sep. 4, 2018

(54) VERSATILE INFORMATION MANAGEMENT SYSTEM AND METHOD THEREOF

(71) Applicant: Jianqing Wu, Beltsville, MD (US)

(72) Inventor: Jianqing Wu, Beltsville, MD (US)

( * ) Notice: Subject to any disclaimer, the term of this patent is extended or adjusted under 35 U.S.C. 154(b) by 517 days.

(21) Appl. No.: 14/499,170

(22) Filed: Sep. 27, 2014

(65) Prior Publication Data

US 2016/0094681 A1 Mar. 31, 2016

(51) Int. Cl.
*H04L 29/08* (2006.01)
*G06F 17/30* (2006.01)

(52) U.S. Cl.
CPC ......... *H04L 67/02* (2013.01); *G06F 17/3089* (2013.01); *G06F 17/30292* (2013.01)

(58) Field of Classification Search
CPC . H04L 67/42; H04L 67/02; G06F 8/00; G06F 17/3089; G06F 17/30292
See application file for complete search history.

(56) References Cited

U.S. PATENT DOCUMENTS

| | | | | |
|---|---|---|---|---|
| 2006/0047546 A1* | 3/2006 | Taylor et al. | ........ | G06Q 10/087 705/26.2 |
| 2007/0006041 A1* | 1/2007 | Brunswig et al. | .. | G06F 11/3688 714/38.14 |
| 2007/0011144 A1* | 1/2007 | Balan et al. | ........... | G06Q 30/02 |
| 2008/0209336 A1* | 8/2008 | Brown et al. | ..... | G06F 17/30873 715/744 |
| 2009/0287718 A1* | 11/2009 | Motoyama et al. | ... | G06Q 10/06 |
| 2011/0231280 A1* | 9/2011 | Farah | ..................... | G06Q 10/10 705/26.8 |
| 2013/0007106 A1* | 1/2013 | Tobin et al. | .......... | G06F 9/4443 709/203 |
| 2014/0006282 A1* | 1/2014 | Friedman | ............... | G06Q 20/12 705/44 |
| 2014/0108971 A1* | 4/2014 | No et al. | ............... | G06F 3/0482 715/762 |
| 2014/0236972 A1* | 8/2014 | William | ............ | G06F 17/30917 707/755 |
| 2015/0040048 A1* | 2/2015 | George et al. | ......... | G06Q 10/06 715/769 |
| 2015/0212814 A1* | 7/2015 | Fransen et al. | ......... | H04L 67/10 717/122 |
| 2015/0269212 A1* | 9/2015 | Kramer et al. | ... | G06F 17/30368 707/687 |

* cited by examiner

*Primary Examiner* — Suraj Joshi
(74) *Attorney, Agent, or Firm* — Jianqing Wu

(57) ABSTRACT

A versatile information management system allows users to configure web page configuration, navigation system, database tables, and personal searchable pads, and can be configured as a static web site, a dynamic web site, a versatile data entry system, a real-time information sharing system, a training and leaning system, an investigative discovery system, and a versatile electronic binder. The system is implemented with global editing capability, unique data validating methods, data archival methods, interactive search and data-feeding functions, standard sorting methods, local and global search features, and phrase constructing functions.

20 Claims, 14 Drawing Sheets

| Assign Project Manager | View Project Manager | Assign Project Manager | Discussion Board | E-mail | Log out |
|---|---|---|---|---|---|

| Code | Project Full Name | Project Manager | Password | E-mail address | Actions |
|---|---|---|---|---|---|
| glg | Corporate Litigation Site | g-admin2 | 123456 | manager2@test.com | View Modify Delete |
| mdg | Internal discuss Site | g-admin1 | 567890 | manager2@test.com | View Modify Delete |

| Assign Project Manager | View Project Manager | Assign Project Manager | Discussion Board | E-mail | Log out |
|---|---|---|---|---|---|
| Code | Project Full Name | Project Manager | Password | E-mail address | Actions |
| glg | Corporate Litigation Site | g-admin2 | 123456 | manager2@test.com | View Modify Delete |
| mdg | Internal discuss Site | g-admin1 | 567890 | manager2@test.com | View Modify Delete |

Name Search | Full Screen | Email | Setup Project | Setup Tables | Log out

Internal Discussion Group
Search — 302 Manager: Man Fastman Date: 3/2/2009

| Notes | Names | Privilege log | Doc-log | Hot Log | Discussion | Pad | Instructions |

Change Project Password

- Change Password
- Update Account Info
- Modify Project Setup
- View Project Members
- Assign New Members
- Update Shared Account
- Export Project Data
- Import Project Zip
- Reset Configuration
- Set Up Web Pages Old Password [ ]
New Password [ ] — 304
New Password [ ]

303

[Change] [Cancel]

FIG. 2

Modify Project Setup

| Project Full Name | Project Green Forest | (1-50 letters) |
| Project Code | GP 1 | (3-10 letters) |
| Member Login Methods | Group and Personal ▼ | |
| Entry Validation Page | Via Tentative ▼ | 305 |
| Data Validation Method | Manager and Vote ▼ | |
| Required Votes No. | 3 | |
| Pad Max Record Size | 200 | |

Do you allow server's administrator to access your project data?
○ Yes  ⊙ No

[Submit]

FIG. 3

Reset Project By Configuration File

1. Choose one of the options:

○ Restore project settings to system's default
   ○ Delete data from selected tables (keep the table structure)
   ⦿ Reset selected tables by configuration file (DELETE DATA)

a. Select tables below or [Select All]

☐ Changes          ☐ Acronym
   ☐ Transaction      ☐ Privilege-Log
   ☐ Attorneys        ☐ Production_Log b. Set Additional Options ☐ Delete all existing tables (DATA) that do not match with any table in the Configuration file ☐ Create a new table according to the configuration file If the table does not exit in your current system.

○ Reset all tables by your own configuration file (DELETE ALL DATA)

2. Find your configuration file:

[_____] [Browse]

[Submit]

FIG. 6

Set Up Page Configuration (Step 2)

| No | Navigation | Order | Description | Page Type |
|---|---|---|---|---|
| 1 | Articles | 1 | A newspapers article | Static HTML page ▼ |
| 2 | Background | 2 | Background info | PDF Page ▼ |
| 3 | Event | 3 | Important Events | Data Table ▼ |
| 4 | Names | 4 | Names Table | Data Table ▼ |
| 5 | Document | 5 | Documents | Native documents ▼ |
| 6 | First_trip | 6 | Club First Trip | Multi-Topic Page ▼ |
| 7 | Staff | 7 | Staff Profiles | Multi-Section Page ▼ |
| 8 | Pad | 8 | Personal Server Pad | Pad Table ▼ |
| 9 | Discussion | 9 | Discussion Board | Discussion Board ▼ |

[Submit]   [Cancel]

FIG. 7

| No | Navigation | Order | Web Elements | Setup |
|---|---|---|---|---|
| 1 | Article | 1 | Static PDF page | Update |
| 2 | Background | 2 | PDF page | Update |
| 3 | Event | 3 | Data Table | Setup/Modify |
| 4 | Names | 4 | Data Table | Setup/Modify |
| 5 | Document | 5 | Native Documents | Update |
| 6 | First Trip | 6 | Topic-pasting Page | Update |
| 7 | Staff | 7 | Multi-Section Page | Update |
| 8 | Pad | 8 | Personal Pad | Setup/Modify |
| 9 | Discussion | 9 | Discussion Board | Backup/Clear |

Set Up Page Configuration (Step 3)

Submit   Cancel

FIG. 8

| Table | Set Up Data Tables | | | |
|---|---|---|---|---|
| Event | Data Entry Layout | Modify Table History Table | Delete Table & Backup Data Upload Data | Advanced Setup |
| Names | Data Entry Layout | Modify Table History Table | Delete Table & Backup Data Upload Data | Advanced Setup |
| Priv_log | Data Entry Layout | Modify Table History Table | Delete Table & Backup Data Upload Data | Advanced Setup |
| Doc-Log | Data Entry Layout | Modify Table History Table | Delete Table & Backup Data Upload Data | Advanced Setup |
| Pad | Modify | | | — 501 |

FIG. 9           Set Up More Table

Create Database Table Structure

\* Table Navigation [Names]  ← 502
Table Name [Names]
Insert entry   Delete entry  ← 503

504 →

| Col 1 Field | First_Name | Type | VARCHAR | Length 30 | Not NULL ☐ | Unique ☐ |
| Col 2 Field | Last_Name | Type | VARCHAR | Length 30 | Not NULL ☐ | Unique ☐ |
| Col 3 Field | Firm | Type | VARCHAR | Length 100 | Not NULL ☐ | Unique ☐ |
| Col 4 Field | Notes | Type | VARCHAR | Length 200 | Not NULL ☐ | Unique ☐ |

Submit

FIG. 10

Structure of the Names Table

| | Field | Data Type | Null | Unique | Setup Data Source |
|---|---|---|---|---|---|
| ☐ | First_Name | VARCHAR | Yes | No 505 | Setup |
| ☐ | Last_Name | VARCHAR | Yes | No | Setup |
| ☐ | Firm | VARCHAR | Yes | No | Setup |
| ☐ | Notes | VARCHAR | Yes | No | Setup |

[Delete] [Add] [Modify] ← 506

FIG. 11

Modify Columns for Names

Col 1 Field [First_Name]  Type [VARCHAR]  Length [30]  Not NULL ☐  Unique ☐

[Submit]   507

FIG. 12

Advance Setup--Change Navigation Name, Table Name, Access Rule, and Validation Route or Page, and Validation Method

Setup for Table: Event

| | | |
|---|---|---|
| Navigation Name | Event | (Fewer than 20 letters) |
| Table Name | Event | (Fewer than 20 letters) |
| Data validation Page | Via Combined Table ▼ | |
| Data Validation Method | Manager and Vote ▼ | |
| Votes | 3 (Excluding owner) | |
| Data Access Rule | Private Edit ▼ | |
| Display Scope | ▼ | |

[Change]

Email | Setup Project | Setup Tables | Log out

Internal Discussion Group

Global Search — Manager: Man Lastname — Date: 3/2/2009

Notes | Names | Privilege log | Doc-log | Hot Log | Discussion | Pad | Instructions Back to Summary Page | Active Table | Archive Table Active Table Notes — 539

Rec. Id [ ] [ ] [Go] [All Date ▼] [ ] [ ] [Go] [All Fields ▼] [ ] [Go]

| | 1 Sys record id | 2 Events | 3 Date | 4 Comment | 5 Entry date | 6 Confirm date | 7 Initials | 8 App |
|---|---|---|---|---|---|---|---|---|
| ☐ | 21 | First Amendment — 540 | | | | | | |
| | | | 07/10/2010 | | | | | |
| | | | | A first amendment was distributed on July 10, 2010. The major change was the privilege review standard. | | | | |
| | | | | | 04/19/2011 09:03:37 | 04/19/2011 09:06:31 | MAN1 | VOTE |
| ☐ | 21 | First Amendment | | | | | | |
| | | | 07/10/2010 | | | | | |
| | | | | The first review instruction was published on the instruction page. You can identify this file by document ID0010. — 541 | | | | |
| | | | | | 04/18/2011 20:48:26 | 04/18/2011 21:38:36 | MAN1 | VOTE-R |

Archive: [Selected Records] [Displayed Records] [Found Records] [Whole DB Table]

FIG. 15

☐ 1223 test99991@test.com  Lisa Cars  Law House LLP  01-20-2008 — 546

| Current Votes : 3 | | |
|---|---|---|
| User ID | Initials | Voting Date |
| 6 | TSF | 04-03-2009 12:32:07 |
| 5 | TST2 | 04-03-2009 12:29:18 |
| 4 | TST1 | 04-03-2009 12:21:05 |

— 547

☐ 1218 test1218@test.com  Scott Foster  04-03-2008

Upload Data to the Event Table

[Sequential Placement] [Field Name Match] ☐ Select/deselect all

Fields in the Table: —548    —550    Fields in the File:

| Sys_record_id | Sys_record_id | Clear | Add | ☐ | Sys_record_id |
| Sys_user_id | Sys_user_id | Clear | Add | ☐ | Sys_user_id |
| Sys_status | Sys_status | Clear | Add | ☐ | Sys_status |
| Entry_date | Entry_date | Clear | Add | ☐ | Entry_date |
| Confirm_date | Confirm_date | Clear | Add | ☐ | Confirm_date |
| IP | IP | Clear | Add | ☐ | IP |
| Initials | Initials | Clear | Add | ☐ | Initials |
| App | App | Clear | Add | ☐ | App |
| Event | Acronym | Clear | Add | ☐ | Acronym |
| Date | Date | Clear | Add | ☐ | Date |
| Comment | Comment | Clear | Add | ☐ | Comment |

549 — [Submit]   [Clear All]   —551

FIG. 16

Set Up Display Layout for the Event Table
Select fields to show up (Step 1)

Layout Scope : [For all members in group ▼]    — 620

| Sys_record_id | Add | Event_name |
| Entry_date | Remove | Date |
| Confirm_date | Add All | Comment |
| Initials | Remove All | |
| App | | |

621 —    — 622    — 623

Font Size [14]   Px (Max size is 20 px)
Lines Per Record [2]   Lines ( Max no. is 20)
Max Size/length of Line [100]   (Default is 100)

[Back]   [Next]   — 624

| | | 1 | | 2 | | 3 | | 4 | | 5 | | 6 | |
|---|---|---|---|---|---|---|---|---|---|---|---|---|---|
| | | Sys_record_id | | Entry_date | | Initials | | Events | | Date | | Comment | |
| ☐ | 1 | 110 | 2 | 05/30/20 | 3 | MAN 1 | 4 | others | 5 | 04/02/20 | 6 | From other | |
| ☐ | 1 | 174 | 2 | 05/30/20 | 3 | MAN 1 | | | | | | | |
| ☐ | 1 | 175 | 2 | 05/30/20 | 3 | MAN 1 | | The page at http://localhost:9080 says: | | | | | |
| ☐ | 1 | 176 | 2 | 05/30/20 | 3 | MAN 1 | | | | | | | |
| ☐ | 1 | 177 | 2 | 05/30/20 | 3 | MAN 1 | | Are you sure you want vote? | | | | 732 | |
| X | 1 | 178 | 2 | 05/30/20 | 3 | MAN 1 | | | | | | | |
| X | 1 | 179 | 2 | 05/30/20 | 3 | MAN 1 | | Cancel | | OK | | | |
| X | 1 | 180 | 2 | 05/30/20 | 3 | MAN 1 | | | | | | | |
| X | 1 | 181 | 2 | 05/30/20 | 3 | MAN 1 | 4 | Meeting | 5 | 05/29/20 | 6 | First Record | |
| ☐ | 1 | 182 | 2 | 05/30/20 | 3 | MAN 1 | 4 | Call | 5 | 05/29/20 | 6 | A first Amend | |
| ☐ | 1 | 183 | 2 | 05/30/20 | 3 | MAN 1 | 4 | Sales | 5 | 05/29/20 | 6 | First Review | |

All Records in Event (240 Records)
Enter | Delete | Vote | Revoke | Edit | Search
Validated Table | Tentative Table | Combined Table | Edit Table | Look-up Table

FIG. 28

Personal Server Pad t ← Shrink Font | Enlarge Font
Sorted by Alphabetic

TED- (TED spread) US T-bond / euro dollar spread strategy — 733
TGE- Tokyo Grain Exchange (Japan)
TIBOR- Tokyo inter-bank offered rate (Japan) — 735
TIFFE- Tokyo International Financial Futures Exchanges (Japan)

LSE
LTOM   - London Traded Option Market ( UK, now part if LIFFE )
PHOT   - Phidelphia Board of Trade ( US )
PHLX   - Philiaadelphia Stock Exchange

734

Save

FIG. 29

| Global Search Result | | | |
|---|---|---|---|
| tex | Global Search | | Member: Smith |
| Event | Acronym | Names | Priv-log | Doc-Log | Discussion | Instructions | Pad |

Global Search Results (Red Record ID Means the Record Is Unverified) — 790

Key: tex; First Table: [Acronym ▼] Order By: [Sys_record_id ▼] [Go]

| Acronym |
| Sys_record_id |
| Full_name |
| Comment |

1: 8;VID;Vendor identifier in software. a little text th[...]ion Digital, a digital for output voltages:[];[];[];[];[] [Acronym] —— 791

2: 10;VID;Vendor identifier in software. a little text t[...]gnized product name;voltage identification Digital, a digital, for [...];[];[] [Acronym]

3: 3314;test; 07/06/2010; Heat Wave Scorches the Northeast Today in 2 minutes: Northeast & Mid-Atlantic states see near-record temperatures [Discussion]

FIG. 30

VERSATILE INFORMATION MANAGEMENT SYSTEM AND METHOD THEREOF

The present application claims priority from U.S. Provisional Application No. 61/883,807, filed Sep. 27, 2013, which is incorporated herein by reference in its entirety.

FIELD OF THE INVENTION

The present invention relates to information management system, and, in particular a web-based information management system.

BACKGROUND OF THE INVENTION

The Internet has provided all kinds of possibilities to collect and share information. The earliest applications are static web sites for distributing information. Those web sites do not accept data from viewers and have very limited functions. Then, dynamic web sites were developed to distribute information that changes in real time. Dynamic web sites often use database applications to keep track of information. The users can add data to the web server for distribution to viewers.

Database Management System ("DBMS") has been the most powerful tool for managing large amounts of information and become the key component for managing information. Its history can be traced back to mid-1960s. As a result of half a century development, database technologies have become the most powerful technologies for managing mass information. By using database technologies, all kinds of information management systems have been developed. Network applications have been developed to manage business activities such as bidding, negotiation, inventory control, and rebate processing. They are designed and developed specifically for intended purposes.

After more than half a century of development, database technologies have become so complex that it is beyond the reach of ordinary users. It is noted there was a need for automated configuration and management. The development of numerous database options has increased flexibility in database management. Despite the efforts by all experts from the whole world, database technology is still considered as an art for server computers and mainframe computers. They are only used for large enterprise business. Because of the conventional notion that database application is not for personal computing, few studies have been directed to building the bridge between powerful database applications and small web applications.

Web interfaces between a database application and web users are realized by static programming. By using such a method, a server program using a database application must be designed specifically for each of the unique applications. The deployment of database application for online uses is generally expensive and requires a long development cycle. No publication teaches how to extend a database application to the browser in a quick and easy way so that ordinary users can run and use the database from a client computer. Another problem is that those who are in the best position to manage projects do not have access to the server.

There is a need for a simple technology which allows the users to run and use database application from web pages on a client computer rather than from a sever terminal. For example, there are always situations where a large number of the people work on a project from client terminals at various locations and such projects have short life cycles. Each of the projects requires different data types, and amounts in a highly unpredictable manner. Therefore, it is neither possible to develop a static web interface for a database system, nor economically feasible due to the nature of one-time use and constant changes.

Assuming that the task is to investigate an organized crime by multiple agencies in several locations, the project might require dozens of investigators to interview thousands of witnesses at various cites and collect information from all kinds of sources. Frequently, a vast amount of collected information might be ultimately useless, and the success of the investigation may depend upon the ability of the agencies to identify and connect only a few pieces of critical information. Thus, a web-based system for collecting, storing and distributing a massive amount of information at the lowest costs would be the best tool for finding such connections.

Another example is management of information for discovery for a large suit. In the last several decades, document reviewers received a binder containing review instructions on the first day of review. With information expansion in the information age, binders have become larger and larger. The background information may have tens of pages, the list of key players might be hundreds of pages long, and there might be hundreds of pages of relevant transactions. For a global company, any topic might require hundreds of pages of outlines. The investigators might have to use two, five or more large binders for tracking case information. When the task is to answer specific questions based upon the results of investigation, the investigators have to search binders. This become a task that could incur prohibitory costs.

The paper binder method is no longer workable for many reasons. All binders will become obsolete in three days due to discovery of new information and the changes in response to case activities. All reviewers or investigators have to learn large numbers of critical facts, terms, or transactions, and they cannot share the work product of others. When the entire review team is changed, the knowledge and experience of the team will disappear, thus the lead investigator might know little about review history, relevant facts, key transactions, important events, and critical documents. They never have a second chance to get the first-hand information, nor do they have time to re-review mountains of documents or just those important documents. When a reviewer runs into an unfamiliar term, a technology, a transaction, an event, a product, or a person, the reviewer may try to scan through the volumes of binders, ask a colleague who may not know it either, and just make a guess. In this finding-needles-in-a-sea working setting, none of the methods is productive and workable. Unfamiliar substance is the biggest time-killer and the number one factor responsible for poor performance and disastrous outcome. Corporate documents contain difficult technologies, uncommon acronyms, foreign language terms, unfamiliar jargon, and implied assumptions all over the places, and it is beyond the point for any intelligent reviewer to make a reasonable call. Reviewers have to make the best guess all the times. A bad call missing the most favorable evidence or inadvertently failure to keep a privileged smoking-gun document may ruin the client case.

The demand for a cheep, fast, and flexible web based information system exists in every walk and life. The same problems exist if a task is to find a small number of pieces of information from a potentially large and poorly defined information sources. A web-based information system disclosed in the present invention will be useful in clinic trails, census data analysis, research and development, surveys, business operations, personal information management, corporate internal investigations, and governmental inquiries.

For the forgoing reasons, there is a need for a new technology to use existing information technologies so that the user can tailor their use without additional development cycle. Such a system can be customized as a static web page, static web site, dynamic web site, information collecting system, data entry system, investigative information sharing system, database management system, electronic binder, and electronic book; and there is a need for using a system approach to configuring applications within a life cycle and between project life cycles.

SUMMARY OF THE INVENTION

One object of the present invention is an information system that has configurable data tables ("database table") and non-configurable tables with a unique method for setting up display layouts and necessary tools for configuring, saving, changing and applying each layout out. The invention has tools for deleting, adding and changing database tables within a project life cycle and between project life cycles.

Another object of the present invention is an information sharing system that has a plurality of the table views, a plurality of access levels, a systematic framework for validating data records, and methods for controlling user's authority to view, edit, and write data records for each of the data tables and table views.

Another object of the present invention is static and dynamic websites, which distribute information to viewers. By using simple setup features, the user can configure it to be a general web site for distributing information. The data in the web sites may come from a database application so that the user can add, edit, and delete any of data records from the data tables.

Another object of the present invention is an investigative information management system that is equipped with a server pad with interactive search capacity. A server pad is a server database-driven notepad-like tool for storing casual information. The server pad has a large window box for writing data, a submit button for saving and updating the data, tools for sorting saved data on the server, a search box for conducting searches, and an input box for interactively retrieving saved data. Its sorting, searching and interactive retrieving capabilities make it an ideal tool for storing a large amount of causal investigative information. The user can write down pieces of information in a pad table for later reference. The search capacity allows the user to manage a large amount of information.

Another object of the present invention is a training and learning system, the data tables of which can be configured during a project life cycle and between project life cycles, and the configured data tables support sorting and search functions. The system can be configured to show the exactly same navigation system, any of the known web page components, and all features so that it is suitable for training and teaching a large number of users remotely. The number-based and letter-based navigation bar is the most effective tool for keeping all trainees on the same page. Therefore, such a system is an ideal tool for conducting long distant training and teaching especially for matters involving a large amount of information.

Another object of the present invention is a shared Internet electronic binder for storing and sharing information. The bidder supports all known web page components, graphic images, and database tables. It allows the users to instantly access the information on any page and add information to the binder according to the rules and method, edit the information to ensure it is current and accurate. The binder allows users in multiple locations to work on the binder remotely and securely.

Another object of the present invention is a mass data entry system, which provides interactive search and data-feeding function, which not only saves time, but also improves data consistency. The interactive data search and data-feeding function can be configured for any of the configurable data tables within a project life cycle. Those functions help the users to eliminate the need to check the existence of data records, avoid entering duplicate records, and help users resolve inconsistent data records.

One object of the present invention is a phrase construction function for interactively feed data from a static source or one or more database fields. In a four-component case, a data field may be entered by using a plurality of component input components, some of which may have interactive data search and data feeding functions with an improved data consistency.

The system of the present invention has tools for creating new data tables: using a configuration file to reset the project, importing a model project zip file, and creating table structures manually from a client terminal by a privileged user. Thus, the system can be reconfigured in aspects from use purposes, data tables, web page components, to functional features instantly.

BRIEF DESCRIPTION OF DRAWINGS

FIG. 1 shows the page for viewing all projects or groups under the system.

FIG. 2 shows the home page for setting up projects by a privileged user where the user has opened the "Change Project Password" page.

FIG. 3 shows a page for modifying project setup.

FIG. 6 shows a page for resetting all data tables and/or static pages for a project.

FIGS. 7-8 show pages for defining web page configuration, including web page number, web page types, and their relative positions in the navigation bar for a project group.

FIG. 9 shows a page for setting up the structures and related functions of data tables.

FIG. 10 shows a page for creating a data table.

FIG. 11 shows the structure of a data table and the method for modifying, adding, and deleting columns.

FIG. 12 shows a page for modifying a column in a data table.

FIG. 13 shows a page for changing navigation name, table name, description, data validation route or page, data validation methods, and data access rule for a data table.

FIG. 14 shows a page for archiving data for a data table by four different selection criteria.

FIG. 15 shows a page for showing vote details for a data record.

FIG. 16 shows a page for uploading data from a text file into a data table by sequential field placement and field name match.

FIGS. 17-20 show the process for setting up a display layout by a privileged user (the page for a member is substantially same except it does not have the drop down box at the top).

FIG. 26 shows the tentative table of the names table, where the operational functions include "Enter," "Delete," "Vote," "Revoke," and "Edit."

FIG. 27 shows an Edit Table page for editing a plurality of data records in a table format.

FIG. 28 shows a combined table, where only a few of the columns are displayed, validated records are marked in the background color around their check boxes, and the user is about to vote for data records 178, 179, 180 and 181.

FIG. 29 shows an interactive search and data-feeding function on a server pad using a single input box.

FIG. 30 shows the search result from conducting a global search, which searches the key in all data tables, discussion table, and personal server pad table, and displays the result according to a user-selected first table and an associated sorting field.

DETAILED DESCRIPTION OF INVENTION

Figure 4:
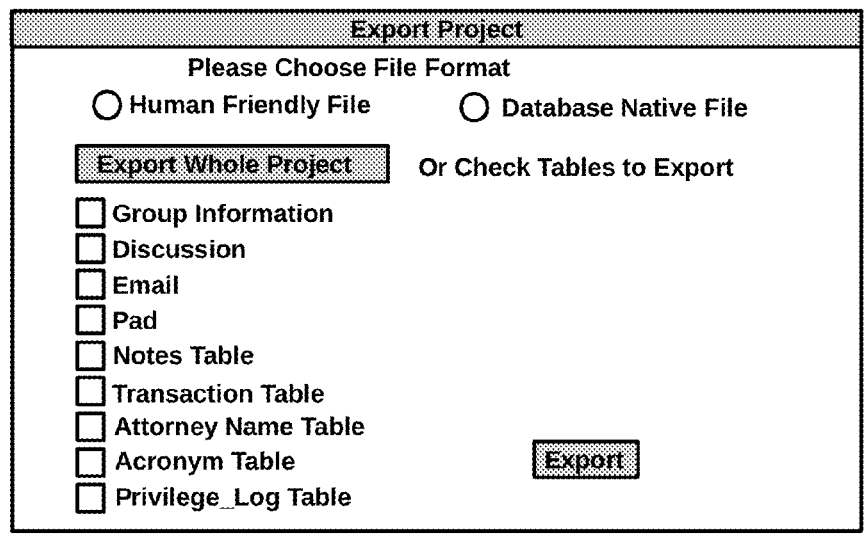
FIG. 4 shows a page for exporting and downloading a project.

"Project" is used to define an operational environment for a group of users who can use data tables, discussion board, personal pad, and email. The word "project" may be replaced by task, assignment, book, case, or matter. In the disclosure, "user" means either a project manager or a project member. "Manager" is a user with supervisory authority while "member" is an ordinary user of a group.

A. The Hardware Structure

The system comprises a server and client computers, all of them are connected in a network so that they are able to exchange data using common data transmitting protocol such as TCP. The server is installed with a relational database system such as MYSQL for storing files and data.

B. Server Management Under Multiple Tier Accounts

The system may host plural projects and it thus has three different log in pages: a log in page for the server administrator, a log in page for project managers, and a log in page for project members. The member's log in page has input boxes for project code, user name, and password.

Each of the projects is run by at least one project manager and plural members assigned to the project. Each project is totally independent from other projects on the system. No file sharing and data exchanges between the users of two projects are allowed although modification can be made to allow cross-project data sharing for special purposes. In using this system, the administrator first creates accounts for managers. To create a manager account, the administrator first logs in the server and assigns project managers with a unique log in account and password.

Upon logging in, the administrator can see the default page showing a list of active discussion boards. Each entry indicates a running project. The administrator can see assigned managers by clicking the View Project Managers on the navigation bar in FIG. 1. Each of the project entries is followed by three links: View, Modify and Delete. By clicking "View," the administrator can view manager account details except the password. After the administrator resets the manager's password, the manager will be prompted to change password in next sign-in session.

By clicking the "Assign Project Manager" button on the navigation bar, the server opens the "Assign Project Manager" page. On the page, the administrator assigns a log in name, a tentative password, and optionally an email address for a project or group. The administrator can assign as many manager accounts as practicable by responding to a prompt for assigning more manager accounts at the end of each assignment. Whenever the administrator has assigned a manager account and given the log in name and password to the assigned manager by any arrangement such as phone, email or regular mail, the administrator's duty is discharged. The rest authority of managing projects will be passed on to the project manager.

After the initial account assignment, the passwords are shown in this table. However, after managers have changed their passwords, the passwords are shown in stars. If the administrator clicks the View link, the administrator can view the information about the manager: log in name, account password, company, manager's initials, legal name, full address, phone number, email address, and IP address. The initials or other strings are used for the convenience of managing the project. By clicking the "Modify" link, the server generates a page containing editable fields (except IP address) that are filled with original account information. The administrator can use this page to update account information and reset password, which causes the manager to change password again.

The administrator can also delete any of the manager accounts from the server. If a manager account has been associated with a project, the administrator is prompted to type in "yes" in a pop-up window to confirm. After the deletion, the project associated with the manager's account is inactivated so that no members can access the project. The project data are not deleted by this operation alone. It is preferable to allow the administrator to create a compressed encrypted file by using a project password such as group log in password so that the project data may be reloaded in the future. The administrator is not allowed to access project files. The project manager should properly delete or archive the project data before the manager account is arranged for deletion. Additional back-end tools may be used to delete abandoned projects.

The users on a project collectively use a discussion board and other data tables. The administrator can view the discussion board for a project just like the members of the project if the administrator has been granted the right to access to it. Any of the managers can prevent the administrator from accessing the project data by using the manager's setup page. If the project manager does not grant the right to access to the discussion board to the administrator, the administrator cannot view discussion pages. The administrator has the power to control the right of the manager, but has no right to directly control the project. While the administrator can reset the manager password, the project manager will know this action upon next signing in. This access right control scheme ensures that the system is safe in various environments requiring different levels of security.

If the project manager changes its log in name, the server keeps track of its associated project. This can be achieved by using a manager ID as an association field. If there is a need for assigning a new manager account as a replacement account, it is possible to change the field in the project data so that the project is associated with the project manager. The system is implemented so that each project may be associated with a plurality of manager accounts and the managers can manage projects by rotation.

In addition, the administrator may send to and receive email from any of the project members on the server by using the page invoked by pressing the email button (FIG. 2). The email functions are similar to those for project members. When the email page is opened, there are three sub-menu items: Send Messages, Sent Messages, and Received Messages. The administrator can write and send email, search and view email, and delete or archive email, as under any well-known web email systems.

The server administrator can suspend, archive, and delete projects. However, the administrator must go through a series of steps of authorization before such an operation can be performed. In order to suspend an active project, the server administrator must fill a certificate, which states that a notice has been sent to the project manager on a certain date and a response has been received, and provides a statement of certification before deletion is allowed. The certificate is kept in a system file for tracking project histories. If the administrator tries to delete an obsolete project or archive a finished project, the administrator is prompted to provide information on the status of the project and the time lapse since the closing of the project. The server deletes the project only after the administrator has provided satisfactory answers. Before deletion is performed, the administrator is asked to consider archiving the project. The administrator can use an export tool to archive the project. When the project is archived, the administrator gets a compressed project file. A project manager who has the project file may render the project on this or another system. In the alternative, the administrator can periodically dump project data by using database dump tool or equivalent. The dumped file may be stored on an independent system or a storage media.

It is understood that the system may be modified to allow the administrator to configure and manage projects. In this case, the manager would be in the administrator's position to set up projects. In the simplest implementation, the server may be designed to host just one project.

C. Common Features of the Information System

The default navigation bar comprises buttons for a plurality of data tables, static pages, topic pages, multiple-section pages, discussion board, and personal pad. Each of the navigation buttons is associated with a configurable data table, a static page, a discussion board, or other pages. The number of and types of web pages ("page configuration") can be changed within a project life cycle or between two project cycles. In an alternative implementation, data tables are set up with the most useful tables containing suitable data fields. Default page configuration can be set up by executing a default configuration file or by uploading a configuration file. The table structures of all data tables can be changed, and thus they are referred to as "configurable data tables" or "data tables."

If a data table is set up, it can be opened in one of the three views: Validated Table, Tentative Table, or Combined Table. Even though they are called as tables, their data come from the same data table. A given view of different data tables presents similar type of data records such as validated records, tentative records, or all records. Each of the views has a table name (i.e., a table title on the web page), a search box at the top, a table body containing data records, and plural action buttons at the top or the bottom. The number and nature of fields in a view depend on application need and can be determined at setup.

Figure 24:
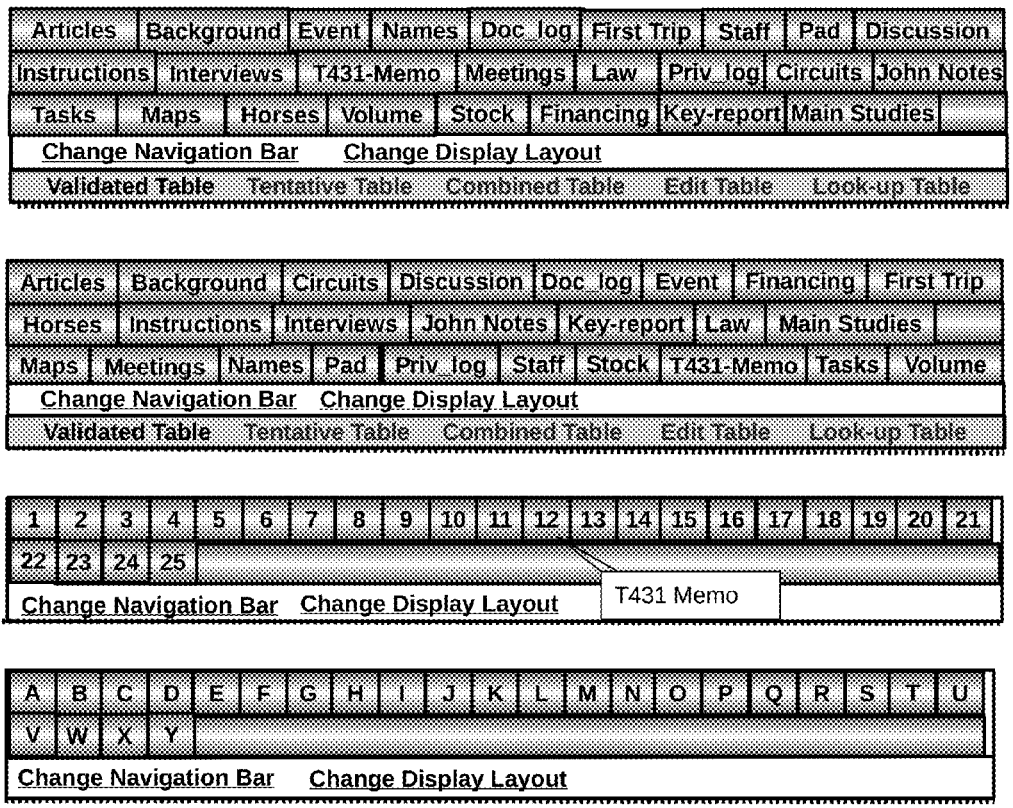
FIG. 24 shows four navigation bars: navigation names in the original order, navigation names in an alphabetic order, numeric numerals in an ascending order, and capital letters in an alphabetic order. This navigation bar appears in nearly all web pages even though they are not shown in some figures.

Each of the navigation buttons is associated with one web page ("page component"), which might be a static HTML page, a pdf page, an image page, a composite web page, a dynamic database table, a discussion board, and personal server pad, and email. The discussion board includes the pages for sending messages and viewing messages (with search functions). Each dynamic table generally has five views: validated table, tentative table, combined table, Edit table, and look-up table. The system does not limit the number of navigation buttons or tabs. It may have five, ten or any reasonable number buttons by default, but may contain as many as fifty or a hundred buttons. FIG. 24 shows navigation tabs which may be in button names in original setup order ("CO"), button names in alphabetic order ("CO"), numbers in ascending order ("NA"), and capital letters in ascending order ("ND"). Other things such as letters, Chinese numbers, any other symbols may replace numbers. By default, the manager can set up a default navigation bar for the whole user group, but each member may change his or her navigation bar by using the "Change Navigation" link at web page top. When the system is used for teaching and learning purposes, all group users may use the group navigation bar to synchronize their page views.

All data tables are similar in their views but vary in their table structures such as field number, field data types and field names, and action buttons. For each table, new records are entered on a tentative table or combined table and is validated as validated records by using any selected validation method. The tentative table and the combined table are referred to as validation route or validation page and a validation button is placed on the tentative table and combined table. After a record is validated, it cannot be edited or deleted by ordinary users except manager. Only a manager can further edit or delete it. Validation methods include manager validation, voting validation ("user validation") and collaborative validation. If a data table is set up with a tentative table as validation route, the tentative table shows only tentative records while the validated table shows validated records. If a data table is set up with a combined table as the validation route, all validated and tentative records appear in the combined table, while only validated records appear in the validated table. The system may be set up with an additional option for viewing all three tables. View-selecting bar (the Block 701 in FIG. 26) allows the manager to select views.

The combined table shows all records just as in a conventional table. This table uses different display colors to distinguish tentative records from validated records, and contains additional action buttons for voting, revoking, and validating data records. When those functions and unique marking colors are removed, the combined table becomes a conventional table except that the combined table supports a default display layout and user-configured display layouts. Accordingly, the invention encompasses the traditional table.

All tables have function keys (as shown in Block 703 in FIG. 26) for the users, managers or members, to input data records and edit records; the manager can delete any records on both validated table and tentative table, while each of the members is allowed to delete his own tentative records if data access rule is set for private edit or delete or edit any of the tentative records if data access rule is set to "public"; the manager uses the Validate button on the validation page to accept or validate data records, while each of the members uses the Vote and Revoke on the validation page to cast a vote or retract a vote. When a tentative record is validated by using any method, it disappears from the tentative table (the combined table if the data entry route is set to the combined table) but appears in the validated table.

The tentative table has a check box on the left of each of the data records. Those check boxes can be used in conjunction with plural action buttons placed anywhere. For the combined table, a check box is placed in front of each of the tentative records. On manager pages, the manager can edit and delete each of the records. Of course, a data table may have all of the three views available. The number and type of the action buttons depend upon the table view, validation route, validation method, and record ownership. The best arrangements can be shown in the following table:

TABLE 1

Functional Keys on Different Pages in a Preferred Embodiment

| User | Validation Method | Table Views | Functional Buttons |
|---|---|---|---|
| Manager | Manager | Validated | Edit, Delete, Enter, Remand |
| Manager | Manager | Tentative/Combined | Edit, Delete, Enter, Validate, Validate All |
| Manager | Vote | Validated | Edit, Delete, Enter, Remand |
| Manager | Vote | Tentative/Combined | Edit, Delete, Enter, Vote, Revoke |
| Manager | Manager/Vote | Validated | Edit, Delete, Enter, Remand |
| Manager | Manager/Vote | Tentative/Combined | Edit, Delete, Enter, Validate, Validate All, Vote, Revoke |
| Member | Manager | Validated | (None) |
| Member | Manager | Tentative/Combined | Edit, Delete, Enter |
| Member | Vote | Validated | (None) |
| Member | Vote | Tentative/Combined | Edit, Delete, Enter, Vote, Revoke |
| Member | Manager/Vote | Validated | (None) |
| Member | Manager/Vote | Tentative/Combined | Edit, Delete, Enter, Vote, Revoke |

*A member can edit and delete tentative records of the member, and all tentative records if the data edit rule is set to public.

If the table is set up with manager validation, the action buttons on the member's validation page include "Enter," "Delete" and "Edit." The member's ability to edit and delete records depends upon data access rule and record ownership. The action buttons on the manager's validation page include "Enter," "Delete," "Edit," "Validate" and "Validate All."

The system provides tools for deleting and editing data records on the validation page. The member's ability to delete and edit data records depends upon the data access rule and record ownership. The member can edit and delete only his own records if data access rule is set to private edit, but can edit any tentative record if the data accord rule is set to public edit. In addition, the manager's validation page contains an optional action button or link ("Accept All" or "Validate All") for accepting all records. When data validation route is a combined table, the action buttons are same as they are on the tentative table. "Validate all" may be used to validate all tentative records shown in the table. This operation requires the manger to confirm on a pop-up window by typing in "yes."

If a data table is set up with voting validation only, the action buttons on the member's validation page include "Enter," "Delete," "Edit," "Vote" and "Revoke." The buttons are placed on the tentative table or the combined table. The Edit button allows the user edit records according to the data access rule. The manager page has the same buttons. The user, manager or member, can cast vote for any tentative records. When a member tries to delete or edit a record of another member when data access rule is set to private edit, the member will get a message that the member has no permission to do it.

If a data table is set up with both manager validation and vote validation, all six buttons "Enter," "Delete," "Edit," "Validate" ("Validate All"), "Vote" and "Revoke" are placed on the manager's validation page. The manager can delete and edit records on the validation page. The manager can directly validate data records or vote for data records. Five buttons "Enter," "Delete," "Edit," "Vote" and "Revoke" are placed on the member's tentative table page or combined table page. The members can vote for tentative data records. The member's right to delete and edit records is limited by the data access rule and the data ownership.

Each of the functions for deleting, editing, voting, revoking vote, validating data records is designed to handle a plurality of data records. The edit function allows the user to sequentially edit selected records.

A validated table holds only validated records and members are not allowed to delete or edit any validated records. However, the user may delete or edit validated records through a special arrangement. If the manager wants to have members to rework on certain data records, the manager can change the statuses of those data records by using "Remand" button so that they are routed back to the validation table where the members can edit them. If corrective work need to be done by members, the manager changes the data access rule to pubic edit. After the members edit data, the manager then validated the data by using the "Validate All" function.

Sorting function is associated with each of the column headers for each of the data tables, each of which is also a link for sorting data records using the field as the sorting key. By clicking a column header such as "Events," "Date" or "Comment" in the transaction table, the member causes a script to call the server program to send an updated page with the selected column as a sorting key. Therefore, in response to a sorting request, the server sends the data records that have been sorted by any of the fields.

Two kinds of search methods, local search and global search, are available to search each of the data tables. Local search is limited to the scope of the table view or a single data table. A search in a tentative table will show only tentative records, a search on a validated table will get only validated records, and a search on a combined table will get both validated and tentative records. Global search ("combined search") is for searching all data tables and non-configurable tables for discussion board and personal pad. Search function may be implemented to across table views to retrieve both validated and tentative data records.

All tables and views have a page number navigation bar at the bottom like any of the known page number navigation bars.

When the shared log in method is set up for use, the registered users are allowed to log in as a group. To keep track of activities, the IP address is recorded for each message posted on the discussion board. For example, a message posted by a shared account contains the header information: "Member Name: SHARE|Post Date: 02-25-2009|IP: 192.168.41.10". "SHARE" is a link for displaying the sender's log in name and IP address.

D. Features for Managing Projects

Upon logging in, the user, who has a higher privilege, is prompted to provide basic information such as his first and last name and his initials for identification purpose. Other notation, number and string may be used in lieu of initials.

After the user logs in, the user can set up a project and configure data tables. The user is prompted to provide only certain critical information. On an initial setup page (which is similar to the view in FIG. 3), the user enters project name or group name, project code, selects an option for log in method by calling page. The process of creating a project includes (1) generating a create project form, (2) entering essential data in the form, (3) sending the form to the server, (4) getting data from the submitted form, (5) deleting existing data from static tables such as email and discussion board, (6) creating a group ID, and (7) writing data in the groups table and the member's table.

Data validation methods determine who has the authority to validate tentative records and how tentative data records are validated, whereas the validation route determines where tentative records are lodged initially and validated. The system allows the manager to select one of the three choices: Manager validation only, voting validation (or collaborative data entry) only, and both manager validation and voting validation. If a table is configured with voting validation, a data record can be validated when a predetermined number of members have voted in favor of acceptance.

If the validation route is a tentative table, new records enter into the tentative table which contains only tentative records. Upon validation, their statuses are changed so that they "appear" on the validated table, and "disappear" from the tentative table. This validation route allows the user to keep track of tentative records. The other validation route, "combined table", allows new records to enter the combined table that shows both validated records and tentative records. All data records are stored in the same database table with different values in their validation status so they are shown in different colors and looks. Use of a combined table as a validation route allows members to see all data records in one view. When a record in the combined table is validated, its status is changed, it appears in the validated table, but remains in the combined table as a validated record with its marking color changed.

If a data table is configured with a tentative data as a data validation route and the manager validation method, the manager validates tentative records on the tentative table. On this page, there are a search box at the top, the body of the table in the middle, and four buttons: "Enter," "Delete," "Edit," and "Validate."

The manager's home page contains a topper menu including "Email," "Setup Project," "Setup Tables." "Setup Project" is a link for setting up a project while "Setup Tables" is a link for setting up data tables, and modifying existing data tables, the record size of server pads, and other data table features. Email is a link for calling the page for viewing and sending email. The user is allowed to send email to the administrator, co-managers, and the project members. On the Setup Project page (FIG. 2), there are topper link 301, a navigation bar 302, left-side menus 303 and a page-display area 304. The left side menu include (1) Change Manager's Password, (2) Update Manager's account Information, (3) Modify Project Setup, (4) View Project Members, (5) Assign Project Members, (6) Update Shared log in Account, (7) Export Project Files, (8) Import a Project Zip File, (9) Reset Configuration, and (10) Set Up Web Page Configuration.

The user can change or update his account information by using Update Account Information. The user can also change the password using the form shown in FIG. 2.

FIG. 3 shows the page for a project manager to create or modify a project. All menu items are shown in Block 305. Although the form contains six items, only project full name and project code are required during the initial setup (some values are given default values). The user can change and update project full name, project code, member log in methods, data validation routes (e.g., data validation pages), pad maximum record size (a number), and the right of the administrator to access the discussion board.

This data validation setting has a system-wise effect, but the user can change the validation route for each of the tables under the "Setup Data Tables" page (FIG. 9) which contains menus 501 for each table. The user can also set server pad's record size for all members of the project group, but each of the members can overwrite this number in his own setting.

If data validation route for the whole project is a tentative table, new data records are lodged on the tentative table for all data tables, and validated records are lodged in a validated table for all data tables. If data validation route is a combined table, new data records are shown in the combined table for all data tables. Tentative records in the combined table are marked in distinctive a color and look. The specific setting for each of the data tables will supersede this project-wise data validation route setting. Maximum suggestion Number (not shown in FIG. 13) is the maximum number of data pieces to be displayed in the selection box.

On the "View Project Members" page, the user can view, modify and delete any of the member accounts by clicking a respective link: View, Modify and Delete. The account information page shows log in name, password, company, member initials, member name, address, phone number, email address, and numeric IP address, and a "Modify" button. The page for modifying member account contains editable input boxes for all fields except the IP address field.

The "Assign Project Members" is for assigning member accounts. After the user provides a log in name and a password, the user submits the page. The user can repeat this process until the user has no more account. On this page, the user may also upload a text file containing log in-name and password pairs to create accounts quickly. The file contains data in the format: "person-1, 111111; person-2, 222222; person-3, 333333". The name-password pairs may be delimited by a carriage return or semicolon. Upon successful upload, the server sends the page showing newly entered project members. If the uploaded file is not of a right type or the data in the file is not in a proper format, the server responds with an error message. From the displayed result, the user knows if accounts have been created successfully. The manager can assign accounts for associate managers so that they have the same privilege as the manager's account except that an associate manager does not have the authority to assign manager accounts to other managers.

The system includes a program for generating passwords for a list of members automatically. The program ensures that two identical log in names are not assigned to two members. Also, it is preferable that the system avoids assigning identical passwords to two accounts. This program can be further modified to support the following process. The user first collects a list of email addresses from project members, and type them with proper delimiters in a text file. The user inputs the email addresses into a large input box on a web page and submits the page to the server, or upload this file onto the server so that the server can extract all email addresses. The server generates a log in name and temporary password for each email address, and sends an invite message containing the log in name and the password to each of the email addresses. The email message may contain a link for accessing the newly created account or an instruction on logging in. Each of the project members will be prompted to change password when the member logs in the account for the first time.

Three log in options are (1) group shared log in method, (2) personal log in method, and (3) both. The member log in method is defaulted to private or personal log in method. When a personal log in method is set up for use, each of the project members can access all features and functions under the personal account. When the group log in method or a shared method is used, all project members can log in and access the project by using a common log in name and a common project password. In this case, the project members cannot use personalized features such as email, account management, and server pad. When both log in methods are selected, a registered user can log in by using the group account or personal account. "Update Shared log in Account" is for changing shared log in name and shared password.

FIG. 4 is the page for exporting project in database native format or human-friendly format ("HFF"). Two files are used to keep track of exported files. One of the files is called data.properties and the other is struct.properties. Struct.properties is a map showing table names and the location of the files containing the structures of tables, and data.properties is a map showing table names and the location of the files containing the actual data for data tables.

Figure 5:
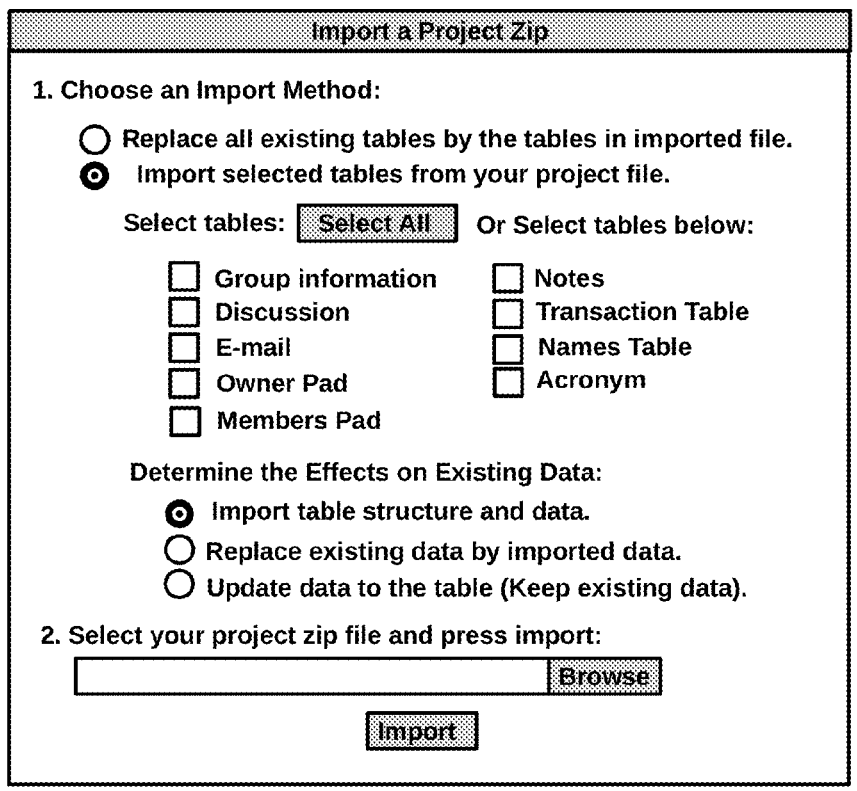
FIG. 5 shows a page for uploading and importing a project zip file.

FIG. 5 shows the page for importing a project by uploading a project zip file. The system allows the user to replace all tables and data by tables and data from the uploaded zip file or import selected tables from the project zip file. When the second option is selected, the system displays existing data tables, owner pad, discussion board, and group information so the user can choose any of them as import targets. The user can further choose to (a) import table structure and data, (b) replace existing data in the table by imported data, and (c) add data in the table (keep existing data). Option (a) of the second menu causes the system to drop the selected table and create a new table, and copy the data into the newly created table. Option (b) does not affect the table structure of target tables, but restores the data in the target tables to the state right before the project was exported. Option (c) keeps original data and adds new data records to the table. Different affects may be achieved by modifying the program.

FIG. 6 shows the page for "Reset Project by Configuration File." Upon clicking this link, the server sends a page for uploading a configuration file, the user has the options to (1) restore all project settings to system's default, (2) delete all project data from all tables including email and the discussion board, (3) reset selected tables by a configuration file, and (4) reset all data tables or web elements by a configuration file. All data tables are configurable by using a configuration file in the order of seconds within a project life cycle. A data table may be added, deleted and changed in the order of minutes any time within a project life cycle. To further improve system performance, an export tool is developed to export a configuration file in proper format that contains configuration information about the system.

There are different ways of changing project data. It may remove project data and table structures by exporting project zip file and dumping database at terminal and discarding data. It can reset data tables by calling a default configuration file, uploading configuration file from the manager client, interactively setting up data tables for data entry, and importing a model project file.

FIGS. 7-8 show the web pages for setting up web page configuration for the group. The system generates a default page configuration by reading a default configuration file or by running a program using setting data for a default page configuration. The number of web pages can be any of a reasonable number of web pages, of any known web page types, including static pages and web pages for data tables. This setup feature can be called by clicking "Setup Web Pages" in FIG. 2.

In creating a new web page configuration, the user is prompted to enter the number of pages or tabs and open a setup page in FIG. 7. This page contains a numeric order number and four columns: navigation, original order, description, and page type. The user fills navigation names in the navigation columns, fills order numbers under the Order column, fills descriptions for each page, and selects a page type by using the associated drop-down box. The options available under the drop-down box include static web page, native page, multiple topic page, multiple-section page, frequently asked question page, discussion board, server pad, data tables and any page type which is known in prior art. Any of known web pages can be used as page components, they can be defined by functions and description, and they can be created, changed, and deleted on a web user interface. After the user fills this page and submits it to the server, the server writes the data in a Page table (also known as a Head table). In the Page table, the system writes a value for each page type tentatively. In response, the system generates the page shown in FIG. 8, which asks the user to set up each of the contemplated pages. On the page shown in FIG. 8, the user can click the "setup" link to open the page for setting up the web page. The set up page for each type of web pages is well known in prior art.

E. Set Up Web Page Configuration and Navigation System

Each of known web pages can be used as a web page in the system. The system also has static web pages and dynamic page pages. Static web pages include static web page ("SWP"), native page ("NAT"), multiple topic page ("MTP"), frequently asked question page ("FAQ"), multiple section page ("MSP"), and discussion board ("DIS"), and any other web pages known in the art because they can be easily incorporated into the navigation system. Dynamic web pages include all views of data tables ("TAB"), Edit Table, server pads, and index page. Each of the web pages is associated with a navigation button.

If a user clicks a navigation button corresponding to a web page that has not been set up, the system sends a pop-up message, informing the user that it has not been set up. If a page has an attachment, the user can download and view it by clicking the attachment name.

The system has an optional Index page, which is for tracking all changes to the data for the group and allows each of the users to see all edits and changes.

Static web pages may be uploaded as a file and stored in a folder or a file field of a database table. Native file may be rendered under the browser. The viewer for rendering PDF file has been used in many commercial web sites, and in some document review systems. Other native files can be used as web pages. Other supported file extensions include .DOC, .DOCX, .XLS, .XLSX, .PPT, .PPTX, .PDF, .PAGES, .AI, .PSD, .TIFF, .DXF, .SVG, .EPS, .PS, .TTF, .XPS, .ZIP and .RAR. In an embodiment, native files may be opened directly under the browser or opened by supporting applications. However, some native files such as scanned PDF, TIFF, and Zip files do not support the global search function. One solution to this problem is to create an array of search keys for those web pages and save them in an associated database table. The search keywords are not provided for a static web page during the setup, the search result indicates that a global search has not been done for the web page so that the user knows the limitation. If a web page contains an image or images, the user should enter description and search keys regarding the image so that the images will not escape from global and local searches. When reliable search algorithms for images and non-text files are available, they may be used in the local and global search functions.

The system uses three types of database tables: configurable data tables for storing project data, fixed database tables for storing discussion dialog, email, and project instructions, and special database tables used by the system. Each of the project group has its own navigation bar. A group may be defined by a data record in the groups table. The fields of example database table are group_id, group_code, group_name, default_bar, login_method, allow_admin_access, validation_route, reg_date, logindate, pad_record_size, max_suggestion_num. The validation_route value determines global default data validation route: tentative table or combined table. The value for Default_bar signals the default navigation bar, which could be overwritten by the user's own preference. The user preference is determined by an integer value stored in users tables.

At the setup stage, most of the options for the project can be blank or filled with system default values. To fill the values for options, the user uses the "Setup Project" page to fill data for the optional fields such as project name, log in name, group log in name and password, global validation method, global validation route, and global display scope. The system can be further modified so that a project manager can manage a plurality of projects. In this implementation, the server shows a list of active projects on the manager's home page and each project entry is represented by a link for opening it. After a project is opened, all functions should be the same. In this case, the user can be associated with several projects. The records in Page, display setup, suggest_source, and records_properties contain a unique group ID value.

The web pages are tracked by using a unique database table or one or more files (referred to as a tracking table). This database table contains project group identity, the web page name, navigation name, page description, page appearance order, and optionally, the features such as validation method, validation route, data access scope, and data display scope. The relationship between table names, navigation names, table structures, and page locations is maintained by the program. The information may be saved in one or more files, one or more database tables, and various files and tables combination, while the preferred scheme is that navigation names, table names and table structures are stored in one single database table or a single file. One example tracking table contains table_id (auto_increment primary key), group_id int, navigation, page_name, page_description, order_no, page_type, page address, validation_route, has_records, validation_method, votes number, access_rule, create_date, edit_table_display_scope, has_history_table.

Validation_route denotes record validation route for the associated data table: T=tentative table and F=combined table; Validation_method is for validation method: 0=manager validation, 1=voting validation, and 2=both manager validation and voting validation; vote number is the number of vote required to validate a record by the voting method; "Access_rule" ("data access scope") defines data access scope: 0=private edit and 1=public edit; has_records indicates if the table has data: N=no data, and Y=have data; edit_table_display_scope determines whether the validated records are displayed in Edit Table: O=No and 1=Yes; and has_history_table indicates if a data table has a history table: Y=Yes and N=No. Table_name stores common table names, which are not the table names used in the database application.

The table names used by the database application (i.e., t1, t2 ... tn or t_h1, t_h2 ... t_hn) are formed by adding a prefix "t" or "h_t" to table Ids. If the page is of data table type, the page is associated with the data table name in database application by this Id. Each non-database web page is associated with the actual file by page_address. The table names incorporating auto-incremental Id ensures that table names in the database application are unique. Page address may be omitted in an embodiment all web pages are stored in a database table.

An alternative table-tracking scheme, that meets the above requirements, comprises statements "Ownership", "Pagename1; Pagename2; . . . PagenameN," "Navigation1; Navigation2; . . . NavigationN;" "page-order1; page-order2; . . . page-orderN;" "page-type1; page-type2; . . . page-typeN;" "page-address1; page-address2; . . . page-addressN" and "feature1; feature2; . . . featureN." Pagename, navigation, page_order, page_type, and feature are for the same page if they contain an identical affixed index number. Another data structure might be "Ownership", "navigation1; pagename1; page_type1; page_order1; page_address1; feature1" "navigation2; pagename2; page_type2; page_order2; page_address2; feature2" . . . and "navigationN; pagenameN; page_typeN; page_orderN; page_addressN; featureN." Those statements may be stored in one or more files, in one or more tables, or in various file and table combinations. In this scheme, the affixed index may be omitted because their relationship can be established by their appearance order and their index numbers can be established by their positions. Data structure may be simplified by sharing navigation names and page names and by eliminating the order number. It is even possible to omit both page names and navigation names; and the system uses a string such as "Button" or "Page" affixed by an incremental number as a navigation name and a page name. Those statements may be in one or more files, in one or more tables, or even in file and table combination. A file may also be in binary, text or any suitable format as long as the system can read, write, delete, and change any entries and anything within an entry. Table names may serve as table ID if their names are unique. The table structure can be omitted in the Page table or file because the field names can be obtained from the database table itself. In database application such as MYSQL, field names can be gotten using "desc table_name."

When the database application malfunctions, the system is unable to provide the required data for constructing the navigation system. This will make the whole system fails. One of the methods for remedying this problem is that a program is designed in such a way that it creates the navigation system when it is unable to access database. This allows the users to read all static pages. One method is to create a file in text or a JSP format, which is generated by using the most current data from the Page table or file. The file contains navigation information. When this method is used, the program uses the text file or the JSP insert file to construct a navigation bar directly whenever the server is unable to connect to the database application. In the alternative, the navigation data may be saved so that the system need not read the Page table each time the system sends a page. When this method is used, this file or JSP file must be updated each time when the Page table or file is changed or updated. Still another method is periodically copying navigation data to a second file. In this case, the relationships between the navigation names, page names, and table ID or page addresses are determined by their entry order or special arrangement in the second file. When the database application fails, the server reads navigation names, page names, table ID or page addresses from the second file to generate a navigation bar so that the users can access basic static pages. The system needs to update the second file when the Page table is created, updated or dropped. Many tools such as the configuration tool, the setup project tool, the "Setup Tables" tool, and the import and export tools should support those used methods. While this scheme can avoid system total failure in the event of failure of the database application, it is useful only for a system containing a limited number of database tables.

The system offers options to show navigation bars in the following choices: original navigation names (in original order or alphabetic order), numbers in a proper order, and letters or other characters in a descending or ascending order. When data tables are configurable within a project life cycle, the server should be able to construct navigation buttons for newly created data tables in real time. To generate a navigation bar for a web page, the server uses class Navigation and JSP code to create the navigation bar.

The code declares an array list for storing table navigation names. It specifies a navigation class, and then calls the allNavigations( ) method by passing the user role to get values for the list. The method returns information on page types, web page locations, and navigation names. Depending on implementation methods, the navigation data may be stored in two to three arrays before a navigation bar is placed on any web page. If static web pages are stored in one or more group's folders, the program needs to return navigation[ ], type[ ], and address[ ] and optional description[ ]. Additional variable may be used to store the names of programs for calling web pages. The program returns data in response to a request for any of the navigation bar options. The first option is a navigation bar comprising user-provided navigation names in their original order (as the first navigation bar in FIG. 24). In this case, navigation[ ] contains the original navigation names, type[ ] contains page types and address[ ] contains the file path or database names (it may be just numbers). To generate a navigation bar comprising user-provided names in an alphabetic order, data in navigation[ ] are arranged in alphabetic order, with type[ ] and address[ ] rearranged accordingly. The third option is a navigation bar comprising user-provided numeric numbers. This navigation bar can be created by filling navigation[ ] with user-provided numeric numbers while the description [ ] are filled with the description for generating info tip. An info tip using data from a description will show up whenever a user moves mouse over a numeric navigation button. The fourth option is a navigation bar comprising alphabetic letters. In this case, navigation[ ] is filled by alphabetic letters, roman numerals, or any suitable symbols corresponding to user-provided numeric numbers. Navigation [ ] may contain A, B, C, . . . , N, a, b, c, . . . , N or I, II, VI, . . . . Additional options such as using the first one or few letters of the user-provided names can be generated to create a short navigation bar. The static pages are saved in a folder for the group, and their names must be unique. Their names may be formed from affixing table ID or other unique string.

If the system uses one single database for storing static data for all static web pages, the address information may be coded into the table names. For example, all pages are stored in tables T1, T2, T3, . . . . TN, some of which are configurable data tables, and others are non-configurable tables containing static web page data. The non-configurable tables contain only limited fields for storing web pages. To save storage space, attachments for a static page may be stored in one or more dedicated attachment tables in different sizes. Each particular type of static page is associated with a unique table structure, and thus, the system knows the table structure from the page type. The page type information may be merged into the naming system of the data tables. For example, table names may be formed by using a table Id, which is an auto incremental number, with a prefix or suffix code. Different codes may denote different page types. The auto incremental numbers will insure that table names will not be duplicated. The prefix or suffix code T, S, M, N, D, and P may denote configurable table, single static page, multiple-section page, native file page, discussion board, and server pad. Since each of those tables/page structures is known, the search programs can search through search keys, text, and description, but avoid searching those fields containing non-text files. Global search can be performed on those tables/pages. Similarly, the tables are treated in the same ways as data tables by the import and export programs. If the system detects a table name, M10, the program knows that the $10^{th}$ table is of the type for storing multiple-section page. If it detects a table name D23, the program knows it is a discussion board. The tables for storing their respective attachments may be named in a way like D23_atts, D23_attm, D23_attl, respectively, where last letters reflecting different attachment sizes.

To reduce the number of database tables, all static pages for one group may be stored in a shared database table and associated attachment tables. The prefix code may be T, S, D, P, and E, respectively, for data tables, static web pages, discussion board, server pad, and email. One example table naming method and sharing scheme are that all groups share system tables, but use their own tables for configurable tables, static web pages, discussion board, and email. Each of the members has a personal pad table. In the Page table, an entry for personal pad defines the location of the pad button on the navigation bar, but its table Id on the Page table is ignored because each user needs to open his own pad table. Therefore, a different naming scheme for all pad tables may be used as long as their names are unique.

The table for holding a static web page contains the following fields: group_id, page-id, description, search keys, text, and file number. Since their fields are fixed, they can be searched by the global search program and import and export programs just like normal data table. One or more data tables are used to store files, images, and attachments. This storage scheme is similar to discussion board. The program should know from the page type how to store and retrieve page data.

The method returns navigation[ ], address[ ], and optional description[ ]. The table for storing a static page contains a field for storing file name so that the system knows the file type before it renders the page. By using this table naming scheme, the system knows the type of the page, uses a proper method to retrieve data from the table, constructs web page according to the page type or specification, and renders it properly. For the convenience of exporting and importing data, each project should use its own data tables or folders to store static pages.

Figure 23:
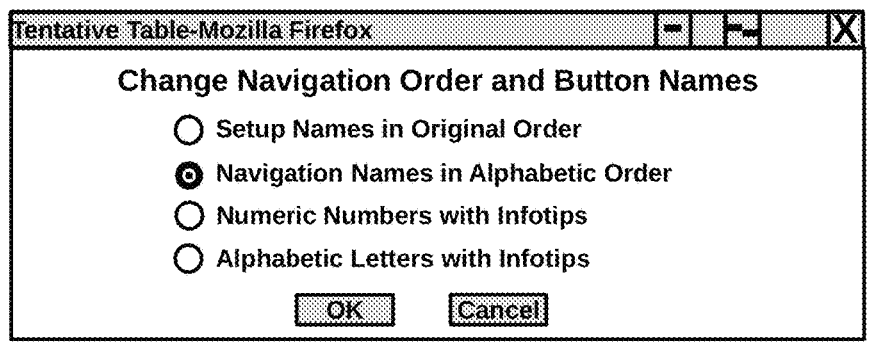
FIG. 23 shows a pop-up dialog window for changing navigation button names and arrangement order.

Since the system can return various types of navigation bars, the selection of navigation bars is made by both the manager and the user. The system knows how to create all of those navigation bars shown in FIG. 24 based upon page configuration information shown in FIG. 8 and rules for creating number- and letter-substituted navigation bars. A preference of a group navigation bar is written in the groups table by the manager. The manager may choose one of the navigation bars as a default group navigation bar. If a user does not set up the user's own choice, the system always uses the group navigation bar. The user can change navigation bar by using the Change Navigation link shown in FIGS. 24, 26, and 27, the preference value is written in the users table. FIG. 23 shows a dialog window when a user clicks the "Change Navigation Bar" link. When the user logs in, the system will get the personal preference and track it by session object or a hidden variable. The navigation bar preference may be denoted by one letter or digit or several letters. When personal preference is set, the system will ignore the group default navigation bar in the groups table.

In creating a navigation bar, a JSP page creates the navigation bar with all buttons using all data records in the Page table for the group. For each navigation button, the system gets the navigation name, determines from type the proper program for opening or rendering the page, and calls the program with a proper file path and file name. When the system is implemented with a limited number of web page types, the program names may be part of calling paths or addresses. If the system implements a large number of web page types, program names may be stored in program_name[ ] and filled by a program method. Since a JSP program is directly associated with page type, if program name is returned, the type[ ] may be omitted. One of the navigation bars may be shown in the following example:

<li><a href="/uis/jsp/member/oneStaticPage.jsp?pageid=s1&page_index=0"><span id="cur2">Article</span></a></li>

<li><a href="/uis/jsp/member/validatedTable.jsp?pageid= t6&page_index=5"><spanid="cur1_5">Names</span></a></li>

<li><a href="/uis/jsp/member/discussion.jsp?pageid=d7&page_index=6"><span id="cur2">Discussion</span></a></li>

The first tab "Article" is for calling oneStaticPage.jsp to retrieve the data from table s1 and renders the page. The second tab "Names" is for calling a validatedTable.jsp to get the data from the table t6, and to display the table according default or selected layout. The third tab is for calling discussion.jsp using the table d7 and related attachment tables. Page_index numbers are used as identifications of the pages and they are used in the style file to determine which of the tab should be the opened page.

A Java program, Navigation.java, imports the utility ArrayList and declares an ArrayList NavigationList. The program first connects to the database application to get data from the Page table, fills ht[0] with table address, ht[1] with navigation names, and ht[2] with program name for each of the web pages or tabs. The program uses a right JSP program name for each of types of the page. The program then adds ht (containing table address, navigation names, and associated program name) to NavigationList for each of the navigation tabs or web pages by using navigationList.add (ht). The program finally uses the public method, ArrayList getNavigationList( ), which returns the navigationList.

When the JSP page creates a web page which needs a navigation bar, it first includes the Navigation class by using <jsp:useBean id="blm" class="uis.Navigation"/>. It then declares an array list ArrayList pagelist=new ArrayList( ), instantiates an class object by blm.allNavigations((String) session.getAttribute("group_id")), and assigns the pagelist=blm.getNavigationList( ). It then goes through a loop (int i=0; i<pagelist.size( ); i++) to create web code (shown above) for the navigation bar. Navigation names can be original names, sorted names, derived numbers and letters in any proper order according to setup directive. Info tip may be added for navigation bar by using numbers and index. Navigation buttons are common components on web sites, and accordingly, all forms, variations, and looks of navigation buttons may be used in the present invention.

F. Set Up Configurable Data Tables

The user may open the page for setting up tables by clicking any of the links for data tables shown in FIG. 8. The "Setup Data Tables" page (FIG. 9) contains only entries for data tables and server pad that need set up, and contains links: "Data Entry," "Modify Table," "Delete Table & Backup Data," "Advanced Setup," "Layout," "History Table," and "Upload Data" for each of the data tables. Server Pad may contain only one field entry or has all normal setup features, depending on its implementation methods.

FIG. 10 shows the page for creating a new table. This page contains input boxes 502 for taking a navigation name and a table name, menu buttons 503 for adding or removing input box rows, and field input box rows 504. On this page, the user first enters a navigation name, and a table name, and description. Those values are saved in the Page table's fields. The table name should be one single string without any space, and may not contain special characters and strings that have been used as system field names. The user defines each field by providing a field name and a length. The field name should contain no space, no "-" and special characters. Type can be selected in the drop-down menu, and available choices include integer, tiny integer, char, varchar, double, year, date, time, and date and time. Each field should be assigned with a data type, the check box for Not Null is checked if the field cannot be null, and the check box for uniqueness is checked if the value in the field must be unique. After the user creates a suitable number of fields and fills all required fields, the form is submitted to the server for processing. If the operation is successful, the server shows the page "Setup Tables and Boards" with the newly created table in it. The table is added as the last page of the current web pages and the order number is generated by the server. If the server encounters an error, it responds with an error message.

After a data table is deleted, a "Setup" link is automatically placed next to the table entry on the "Setup Data Tables" page on FIG. 9. When the first data table is deleted, the table name and navigation name will become "Table N" (where N is a numeric number) on those pages, and the navigation button name in Page Configuration (FIGS. 7, 8) is filled with "Table N." When the manager clicks the navigation button "Table N," it will send the user a "Setup Tables" page. If a member clicks the navigation button, it sends the message: "This table is not set up for use. If you need it, ask your manager to set up." The user can recreate the same table by creating this setup link associated with the table or create a new data table by clicking the "Set up More Table" link at bottom in FIG. 9.

One of the links on FIG. 9 is for deleting any of the data tables by using the "Delete Tables & Backup Data" link. Upon clicking this link for the Event table, the server presents a page titled "You can delete the Event and/or backup the data for the table" followed by three choices: (1) Delete the data; (2) Delete the table without saving its data; and (3) Backup its data only. The option 3 is followed by a check box for selecting a human friendly file format.

When this check box is checked, the server extracts and writes data in a delimited text file. All of those functions require the manger to confirm by typing "yes."

FIGS. 11-12 shows the pages for modifying any of the existing data tables. FIG. 11 contains edit buttons 506 and a setup link 505, which is for setting up data sources for the field. The edit buttons comprise "Delete," "Add," and "Modify." The full structure of the names table could have eight input box rows, respectively, for email address, first name, middle initial, last name, firm or company, dates, type, and comments, but the figure shows only four columns. There is a check box in front of each row. The user can change any of the fields. Each row contains a field name, a type, a null flag, and a uniqueness flag. If the user selects a column (e.g., Last_Name) and clicks the Modify button, the server sends a page titled "Modify Columns for Names" for editing the field in FIG. 12. The input boxes (507) in this figure are substantially same as the input boxes used in the table for creating a new data table. Upon edit and submission, the server updates the table structure to reflect modifications. To add a new field, the user clicks the Add button in FIG. 11, and the server sends a page titled "Add Columns for Names Table." This page looks like the page in FIG. 12 except that it has the buttons "Insert row" and "Delete row" for adding or removing input box rows. After the field names are provided and their types and flags are set, the page is submitted to the server. If the new fields are added successfully, the server responds with the same page titled "Structure of Names Table" except that it has newly inserted fields at the end of the table. If the user deletes a field from the table, the field and all of the data in this field will be deleted. After the user is reminded with the risk of losing data, the user confirms the deletion, and the field together with its data will be deleted. The page on FIG. 9 is updated, reflecting the deletion.

Upon clicking the link "Delete Table and Backup Data" for the Acronym table, the server presents a page titled "You can delete the Acronym table and/or backup the data for the table" followed by three choices: (1) Delete all data from the table, (2) Delete data and table structure, and (3) Backup its data only. The first option is for deleting data without affecting the table. The page contains operation type with three values, respectively, for deleting data, dropping table, and downloading the data. Upon submission, the server gets user ID and group ID, gets the value for operation type, and table ID. If the user-selected option is to delete data, the server deletes data by using executeUpdate on "delete from table" and "alter table tablename auto_increment=1," followed by cleaning related tables. If the user-selected option is to drop table, the server executes "drop table table_name" and "delete from Page where table_id='tableid'." If the user-option is to download the data, the server uses the code similar to the corresponding code for downloading a zipped project.

The process for deleting a data table may include the follows. The user selects his deletion option and submits the form. The server generates a pop-up window and user types "yes" and submits it. After the server properly confirms the user's intention, it deletes data from the table. The second option allows the user to delete both data and table structure. If the user selects this second option, the browser generates pop-up, the user types in "yes," the server ascertains the confirmation and drops the table. After a table is deleted, a Setup link may be placed next to newly created "Table #" entry as an option. The user can recreate the same table or a different table by clicking the "Setup" link next to the table space or use the bottom link. The third option allows the user to back up data by dumping the data to a file and downloading the file. The user selects the backup data option, the server extracts the data from the table, writes it in a file, and starts downloading the file. Upon finishing downloading, the server prompts the user to open or save the file. The user saves the file. When the data backup is called, the server extracts data and writes the data in a delimited text file or simply gets a dump file.

FIG. 13 shows "Advanced Setup" which is used to set up for data tables advanced features such as Navigation Name, Table Name, Data Access Rule, Data Validation Route, Validation Method, and display scope. The user can change the navigation name and the table name, change the value for the access rule, select a data validation route from a tentative table or a combined table, and select a data validation method in the drop down box. Data validation methods include manager validation, member validation ("member validation" or "validation by vote"), and both of the methods. If the voting validation method or both validation methods are selected, the setup page opens an input box right below the drop-down box to prompt the user to type in a numerical value. The number determines the number of votes required to validate tentative records. The creator of the data record is not counted as a vote by default. If an inputted number is a reasonable integer smaller than the number of members on the project, the system accepts it. If the number is not good, the server prompts the user to provide a new number. On this page, the user can also set up or change the data access rule. The choices are private edit or public edit. Private edit allows the owner of a record to edit it before it is validated. Public edit allows anyone to edit tentative records.

There may be a need to edit a large number of data records by users. The manager can move the records back to the tentative or combined table by changing their status values by using simple server tools or the "Remand" button. After mass edits are done, the manager then moves them back to the validated table by changing their statuses. To increase flexibility, back-end tools are developed for manipulating data records and their statuses. Those tools allow the manager to find records and change their statuses at once by marking them with desirable values in the validation data fields.

The vote validation method may be modified for collaborative data entry. One single data record may be entered and confirmed by several users. A data record may need to have data components A, B, C. A first user enters data component A with some instruction. When a second user finds this unfinished record, and knows data component B, the second user enters data component B in the same record. A third user finds this unfinished data record and has data component C, the third user enters data component C. The table may be set up with structure for accepting different data components in different fields or in one single field (in this case, the data entry format must be instructed by the first user or is obvious to all users). This data entry scheme requires that all users have right to edit tentative records. Moreover, a confirmed data record may remain as a tentative record for more users to add the data components repeatedly. Finally, the manager may admit this data record by using manager validation.

FIG. 14 shows the page for moving data from an active table to a history table so that the system will not search obsolete data. It contains a search tool 539, a sorting field header 540, and an archiving tool 541 at bottom. The user can move "selected records", "displayed records" "found records" and "whole database table" to the history table. "Selected records" are only the records that the user selected. "Displayed records" are those records shown in the displayed page. "Found records" are all records that are found but may be displayed in next few pages due to the display limit by the number of records per page. Records may be identified by using the search tool 539 and sorting header 540 to search using date range, ID number range, and search keys in any or all the fields. When the whole table is moved, all records will disappear from the active table.

When the user opens an archival table, the user can move data back to the corresponding active table by using similar four selection methods.

Dedicated multiple section discussion page under the instructions tab allows the manager to post a series of topics. The page shows N sections, each of which contains a title, a main text body, and one or more attachments. A user can download any attachment by clicking its name. If a user clicks a navigation button before the page is set up, a pop-window shows up informing the user that the page has not been set up. The user can type in data for each of the topics by using "Update" next to the topic. The opened page has a title corresponding to the topic, a large input box for providing data, a file path browser, and a "Add more file path" link, and a dynamically generated "Fewer file path." The user provides text in the large box with or without attachments. Upon successful submission of the page, the topic is set up. The web file may be saved in a folder or sub-folder for the group or a table containing group_id, text_id, topic_name, content, attachment int. Attachment may be saved in a sub-folder or saved in a topic_attachments table containing group_id, attach_id, file_name, file_path, and file content.

The manager can validate tentative records on the data validation page if a data table is set up with manger validation. If a tentative table is validation route, new data records are shown in the tentative table as tentative records. Validation tools are embedded on the tentative table. The manager uses a tentative page (similar to the table shown in FIG. 26 except that it has "Validate" and "Validate All" buttons) to validate data records. On the validation page, there is a global search box (not shown), a search box at top, the table body in the middle, and several buttons such as "Enter", "Delete", "Edit," "Validate," and "Validate All." A check box is placed in front of each of the data records.

The manager can find tentative records by using the search function at the top of a data table and can use the page number navigation bar to find the pages where tentative records are. The user selects data records by checking their boxes and clicks the "Validate" button. The browser responds with a pop-up window to confirm the intention. Upon confirmation, the browser sends a request to the server, updates the statuses of the data records, and refreshes the page by sending a validated page or the validation page. The validated records disappear from the tentative table and appear on the validated table. The user can validate all records by using "Validate All." When this method is used, it is easy to keep track of all validated records and tentative records. All data records are stored in the same database table with different values in their validation statuses so that they can be retrieved and shown in different views.

If the validation route is a "combined table," all tentative records and validated records are in the same table, but tentative records are marked with a unique color so that the user can distinguish them from validated records. Any other suitable methods may be used to mark the two kinds of records so that they can be easily identified. Also, validated records have a value in the approval field "APP." Necessary validation tools are embedded on the combined table. The combined table has a search box at top, the table body in the middle, and several buttons such as "Enter", "Delete", "Edit" and "Validate" and "Validate All." A check box is placed in front of each of the data records. The user selects data records by checking their boxes and clicks the "Validate" button. The browser responds with a pop-up window to confirm the intention. Upon confirmation, the browser sends a request to the server, updates the validation status of the data records in the data table, and re-sends a validated page or a combined page. Upon refreshing, the record appears in the validated table, and remains in the combined table as a validated record. This validation route is useful in the case that the members are interested in seeing all data records. Two validation routes, tentative table and combined table, can be used simultaneously for a data table so that validated records appear on the validated table, tentative records appear on the tentative table, and both of them appear on the combined table.

If the validation method is voting validation, the user can vote for data records just like any other users. The user can also know who has voted for a record 546 by moving the mouse over the check box in front of the record, as shown in FIG. 15. The voting info tip box 547 shows that record No. 1223 was originally created by TST, it was validated by three votes by TSF, TST1 and TST2. This info tip box shows user ID, initials, and voting dates and time. All voting tools are embedded on the tentative table or combined tables. Validating tools include voting and revoking buttons, the info tip for showing vote info or count, and a voting confirmation tool 732 shown in FIG. 28.

The user can edit and delete data records in any of the table views. The user can delete data records by checking the corresponding check boxes and pressing the "Delete" button. Deletion is performed by the server upon the confirmation of the intention on a pop-up window. The user can use the "Enter" button to call a data entry page for the table. This button works independently from the check boxes. The "Edit" button on the Manager's tentative table or the combined table is for calling the page for editing tentative records by the user. Upon editing, the initials of records' creator are changed by attaching "-R". For example, "TST" will become "TST-R," indicating that the record, created by TST, has been edited by the manager. The Edit page may contain both validation and edit functions, and thus the user has an option to edit a record only, validate a record, and edit and validate a record. When a record is both edited and validated, "-R" is attached to the creator's initials for editing the record, and manager's initials are added in the APP field. If a data record in the Validated table has been edited, the value under the APP field is attached with "-R." The approver initials "MAN" or "VOTE" thus become "MAN-R" or "VOTE-R" respectively, depending upon the validation method. If a validation table is configured with both the manager validation method and the voting validation method, the user can validate data records by using both the methods. Other features remain the same.

The system also has a feature for uploading a file containing delimited data or simply database dump file and loading the data into an associated data table as shown in FIG. 16. Upon submission, the server first uploads the file, reads the table structure from the file, reads table structure from the database or the Page table, and displays a field-matching table. This page has two placement buttons 548, existing table structure 549, file table structure 551 in the uploaded file, and match buttons 550. By using the "Sequential Placement" button, the fields in the file will enter into the input boxes corresponding to the fields in the existing table. The result (except the event field) shown in FIG. 16 has been achieved by using the sequence placement. The user can also click "Field Name Match" button, only the fields in the file, whose names are identical to the field names in the existing data table, are entered into the correspondent input boxes. Finally, the user can also match fields by using the manual match buttons 550. If the user wants to input acronym name into the event_name field, the user first clicks the "Clear"

button to clear the value in the input box for the event_name, clicks the check box in front of the acronym on the right, and clicks the "Add" button. Thus, "acronym" is added to input box for event name. The server inputs data according to the pair relationship between displayed field names and field names in the input boxes.

Figures 18, 19:
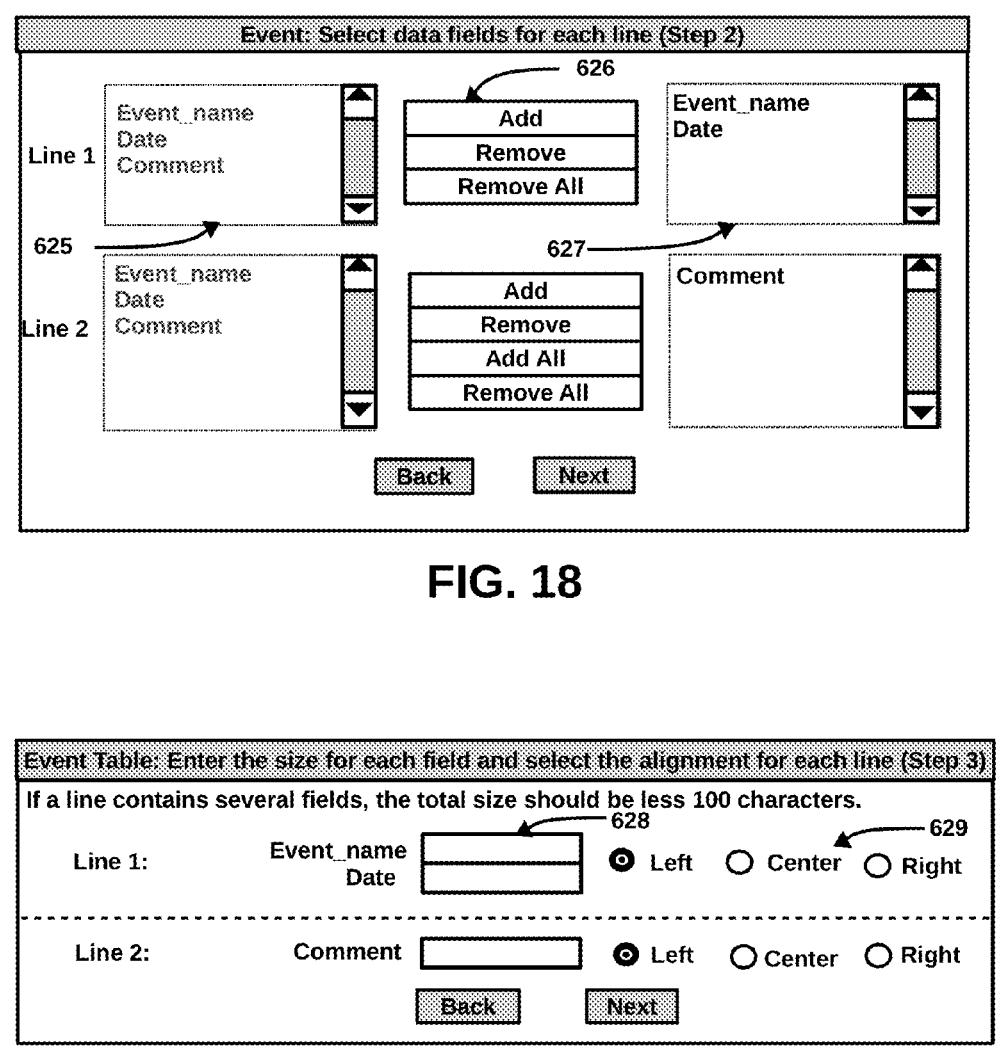
Figure 20:
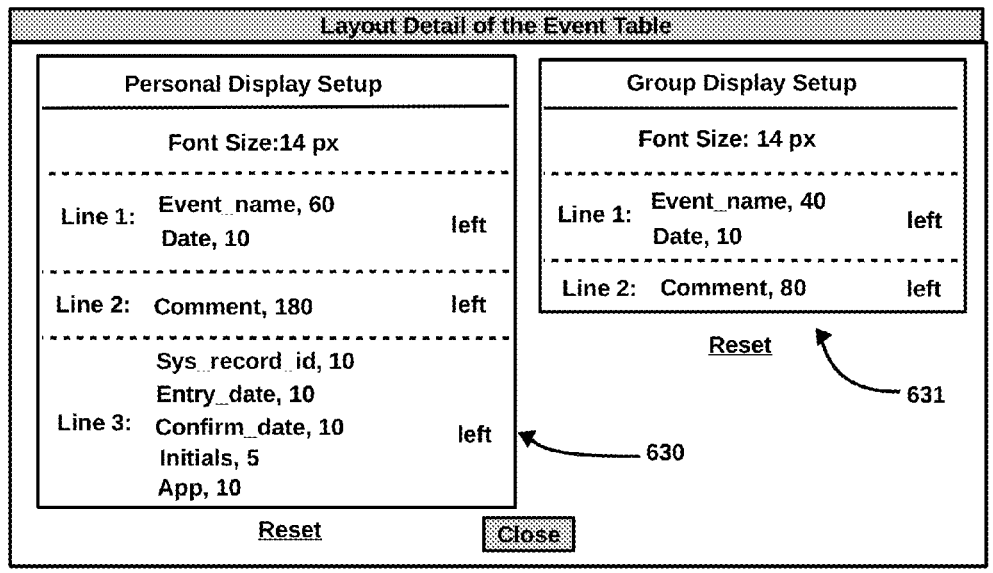

FIGS. 17-20 show the method and process for creating a display layout ("Layout") for a data table. The server sends a first page (FIG. 17) containing a box showing all fields available 621 for display. The user selects a layout scope at 620, moves fields to display to a box 623 using buttons 622, and provides display line number N, font size S, and the maximum display line size M (Block 624). Upon submission, the server gets N, M and S, and generates a second page shown in FIG. 18, which contains N pairs boxes with all user-selected fields on the each left box (Block 625) and nothing in the right box (Block 627). Each right box is to define the fields for one display line, and the user can move fields from a left box to a right box by using the "Add" or the "Add All" buttons (Block 626). When a field has been moved to a right box, it disappears from all left boxes. The user selects fields in the first left box and moves selected fields to the corresponding right box, selects fields from the remaining fields in the second left box and moves them to the corresponding right box, and selects the remaining fields in the third left boxes and move them to the corresponding right box until all available fields are allocated to all right boxes. The user submits the page to the server, and the server gets data and generates a third page (FIG. 19). This third page contains an input box 628 for a display size for each field in each display line and alignment options 629 ("Left," "Center" and "Right") for each display line. The user enters a value for each field size and selects an alignment option. Upon submission, the server gets the field size value of each of the fields and the alignment value for each of N display lines. If there is no error, the server creates a display layout and saves it, and sends a page showing display layout settings 630 and 631 (FIG. 20). Display set up can be done by adding a layout records from terminal and by uploading a text file containing tested layout definitions.

A static multiple-section web page contains many sections of web materials. In each section, it has a topic, a main text body, and one or more optional attachments at the bottom. There is distinctive separator between any two sections. Such a setup page allows the user to create as many sections by clicking "More Section" link. For each section, it has one file path by default. The user can add more file paths by clicking "More File." It also allows the user to include native attachment. This page allows the user to control edit right. If edit right is set to public, any other users can edit it; otherwise, only a privileged user can edit it. This type of web page and methods of creation have been used on all leading social media web sites. Therefore, all those existing technologies may be used on this system. Another web page is to render an image or PDF file. The update page contains a file path for uploading the file and the input boxes for sale to final dimension sizes. The manager may setup this page as a public page or a private page to control the edit right.

The system is implemented with an interactive search and data-feeding function in various cases (Similar to the feature in FIG. 29). This function can be set up for any database field using any data source. Each of the data tables has two types of fields: data entry destination fields (also "active field") and data source fields. A destination field is where data are entered, and data source fields are the fields from which data pieces are retrieved as potential data candidates for data entry. Thus, when the user types in the data input box on the data entry form, it causes the server to search source fields, retrieves data, sends retrieved data to the server, and displays the retrieved data in the selection box for user to select.

An active input field on a data entry page may take only a fixed number of words or phrases as potential data. For example, a destination field may only accept four values "excellent," "good," "fair," and "poor." Therefore, it is desirable to feed the selection box only with those choices on the data entry form. Those phrases can be put into a static file or saved in a database field. They may be embedded on the web page if their number is limited. If the number of data pieces is large, the data entry form may use interactive search and data feeding function. Another use of the setup function is to associate one of the database fields with one or more fields of one or more database tables. For example, a privilege log normally has a column containing attorney names. The attorney names are maintained in another table known as a names table. Therefore, it is desirable to use the names table as the data source for the input box for the attorney name field in the privilege log.

Figure 22:
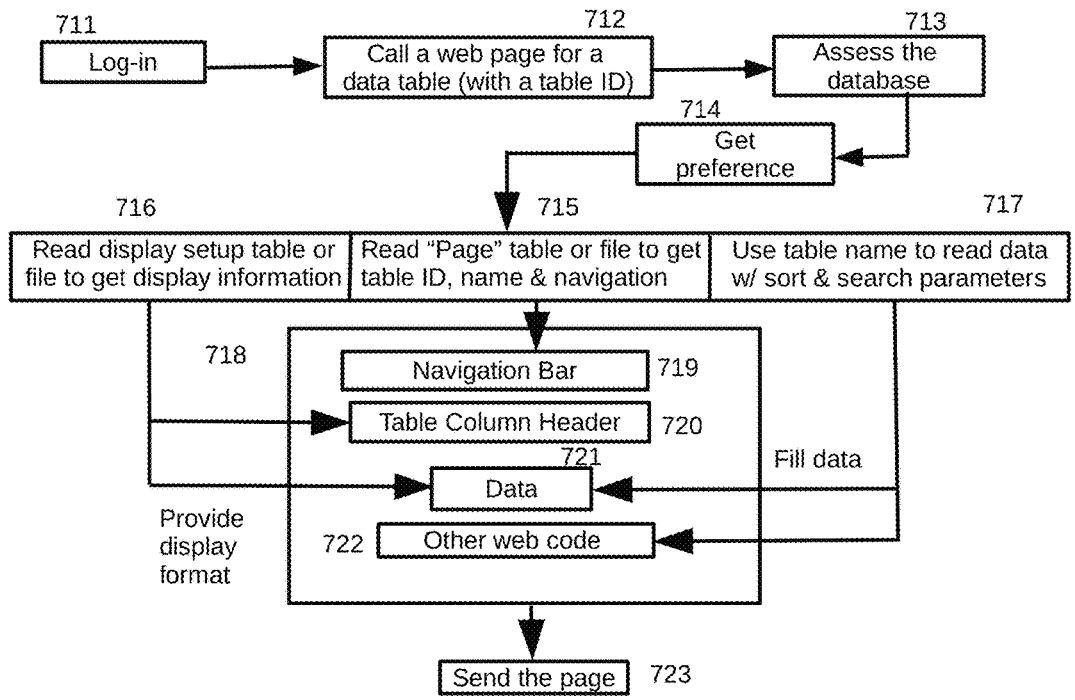
FIG. 22 shows the process of building a web page by using the information from preference table, a display setup table, a Page or Head table, and a data table, and other setup tables.

For any field in any of the tables, the user can set up a data source by clicking "Setup" in FIG. 22. Upon clicking "setup," the user is presented with a page titled "Set up Data Source for Table: Priv-Log, Table Field: Attorney_Name." On this page, there are four radio buttons for four mutually exclusive choices (1) Set up simple data source, (2) Set up composite data source, (3) Set up direct copy function, and (4) Delete setup. The first choice is to create a data source for a destination field. The second choice is to set up a data source for a field that comprises at least two component boxes for constructing phrases, the third choice is to set up a function for coping data from one or more source fields to a destination field. The last function is to delete the setup. In setting up this function, the server creates and saves a setup record about the data input field, static data source, table ID, data field names, and method.

In setting up the copy function, the server presents a page showing N−1 fields in a column, with a check box in front of each, and a column of input box. This page allows the user to select the data fields as data sources and enter an order number for each of the selected fields. The deletion function is used to delete the setup for the destination field.

In creating a simple data source, the user clicks the radio button for the first option, the server creates a large input box. The user then types in plural data pieces separated by semicolon or carriage return, and submits the page for processing. The user may select one or more data fields as additional data source by clicking associated check boxes, and submits the page for processing. The server retrieves the data and saves them as one data field in the suggest_source table. For example, when the user enters two phrases for the table ID=4 the field acronym: The program creates the record: INSERT INTO ' suggest_source' VALUES (4,'acronym','first data choice\r\nsecond data choice',' ',' ','0'). It means that for the table_id=4, the field acronym uses two phrases '"first data choice" and "second data choice" as input data sources. If the user selects the first-name and last-name fields of the attorney name table and the comment field of the transaction table, the server writes a record (INSERT INTO 'suggest_source' VALUES (4,'Acronym', ' ', '5;4;','Description, Comment,; Acronym,;','0');) in the suggest_source table or equivalent file. This record means that the acronym field of the acronym table (Id=4) has been set up with two data sources: The Description and Comments fields of the privilege_log table (Id=5) and the acronym field of the acronym table (Id=4). The server maintains settings in the setup table so that the server can create necessary script in support of the interactive data-feeding function on the data entry form.

Figure 21:
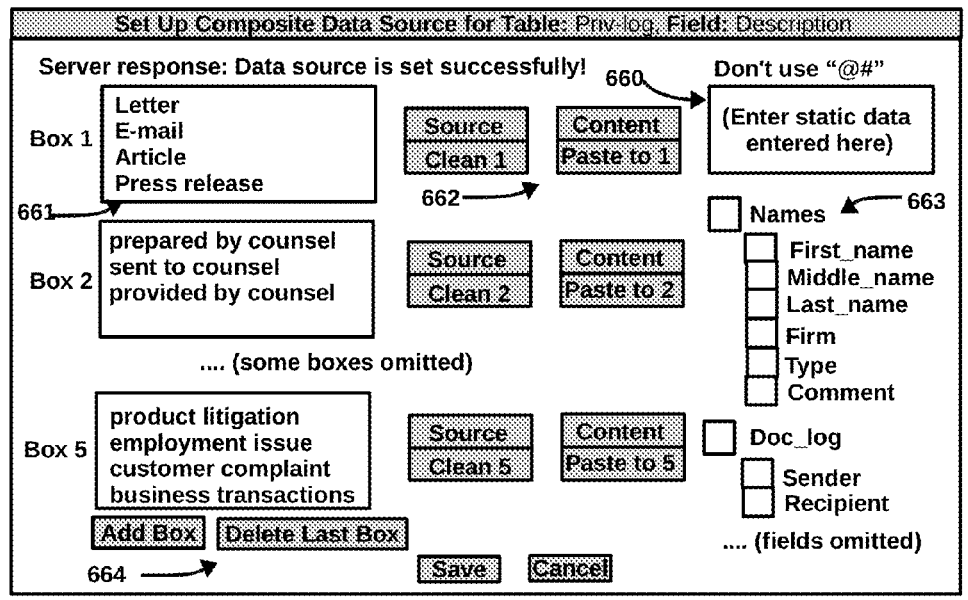
FIG. 21 shows a page for setting up a composite data source for a privilege log table.

FIG. 21 shows how to set up composite data source for a field. This setup page may be opened directly or indirectly by using Setup 505 in FIG. 11. By clicking "Composite data sources," the server opens the page shown. This page is also for a given destination field, and initially has only one left box and four buttons, each box of which is for one construction component. On the left, there is an input box 661. In the middle, there is a plurality of action buttons 662. On the right side, there is a large input box 660 for accepting static data pieces. It also has a tool 664 for adding and removing a whole block of input boxes and a corresponding tool 662 for each construction box. By using this tool, the user can create settings for two to N construction boxes. Each of the action buttons 662 has a "Source" button and a "Content" button. When the user clicks "Content", the page shows the fields of the same table on the right so that the user can select any of the fields as data source. If the user presses "Source", the page shows all available tables and fields of all available tables 663, plus an input box at the top. Each of the tables are preceded by a first-level check box while each of the fields is preceded by a nested-level check box so the user can select any of the tables and any or all of the fields for the selected tables. The user selects any tables and their fields as data sources, type static data pieces into the top input box with a proper delimiter such as line return or ";", and presses the "Paste to N" button to move static data pieces, the checked table name and checked field names into the associated left input box. The user can delete data from any of the left boxes by pressing a corresponding "Clean N" button. After setup is done for all input boxes, the page is submitted to the server for processing.

In creating a privilege log, the description may need five or more data components. A description contains [document type] [action done by attorney] [name of attorney] [preposition] [subject matter]. Therefore, the user needs to click the "Add Box" four times to create four additional boxes. Each of the data components may accept static data or the data from the data tables. In creating a static data source for the first component, the user first types "Letter; Email; Article; and Press release" in the input box 660, and then clicks "Paste to 1." The data in input boxes for components 2, 4 and 5 are created in the same way. The first input box for the first component has four word choices: letter, email, article, and press release. The input box for the second component has three phrases: "prepared by counsel," "sent to counsel" and "provided by counsel." The third input box uses the first name and last name in names table. The rest is obvious. After data sources are set for each of the components, the user submits the page to the server, the server writes a setup record in the setup table or equivalent file.

Additional setup functions allow the manager to choose data feeding orders. Any of the database fields may be a destination field using other data source and at the some time may also be a source for one or more other designation fields. If a component box uses a field that has already had an active data source, the user may use that data source. A data entry form may contain plural construction boxes respectively for different destination fields. And plural construction boxes may be built for the same destination field by using different data sources. An input box for a first destination field is set up with a static source of "A, B, C, and D". One of the component boxes of a construction box for a second destination field may need the same data source (A, B, C, and D). In this case, the data input box for the first destination field should be placed before the component box for the second field on the data entry form so that it is filled first. A script is embedded on the page for copying the value from the input box to the component box.

The single construction box method is useful on the data entry form with limited space.

The user also has tools for setting up a background construction method. This method is used to combine the values of a plurality of fields and store the result in a destination field. The user is allowed to define a destination field and construction components, which normally use data from the same table so there is no multiple-value issue. If a component uses data from a different database table, data value must be unique for each record. In this case, phrase construction can be performed without human attention after all of required fields have been filled with unique values. The user can use this function to retrieve the values from all selected fields or columns and append them with a separator space to form a phrase, and save the constructed phrase in the destination field. The program should mark up all records that have missing component data. In addition, all resulted phrases should be verified in a quality control stage to ensure that errors from component data incompatibility are fixed.

G. Functions and Features for Project Members

The access right of each of the project members is granted by the project manager as discussed above. In order to sign into the server, the user needs to use project code, log in name and password to log in. Upon signing in the server using a personal account for the first time, the user is prompted to change password and update account information. After the user provides required information such as email address, initials, first name and last name, the server generates a database table for storing data for the user's server pad. The user can view all configured web pages.

The topper navigation bar on a member page includes links Email, View, Acct, Info, and Tabs. "View" is for calling the page for setting up a table display layout, "Acct" is for managing, updating and viewing the member's account, and "Email" is for viewing and sending email. On this account page, there is a link "Change Password." Below this link is a form containing input boxes for email address, prefix, first name, middle initial, last name, title, company name, street address, city, state, zip code, country, and phone. The user may amend account information. By clicking the "Change Password" link on the Personal Account page, the user opens the page titled "Change Password." The user can provide old password and new password in duplicate, and submit the page. Next to the small navigation bar is status information of the user: today's date, project code, user name (the first and last name). In the center is also the full name of the project.

Figures 26, 27:
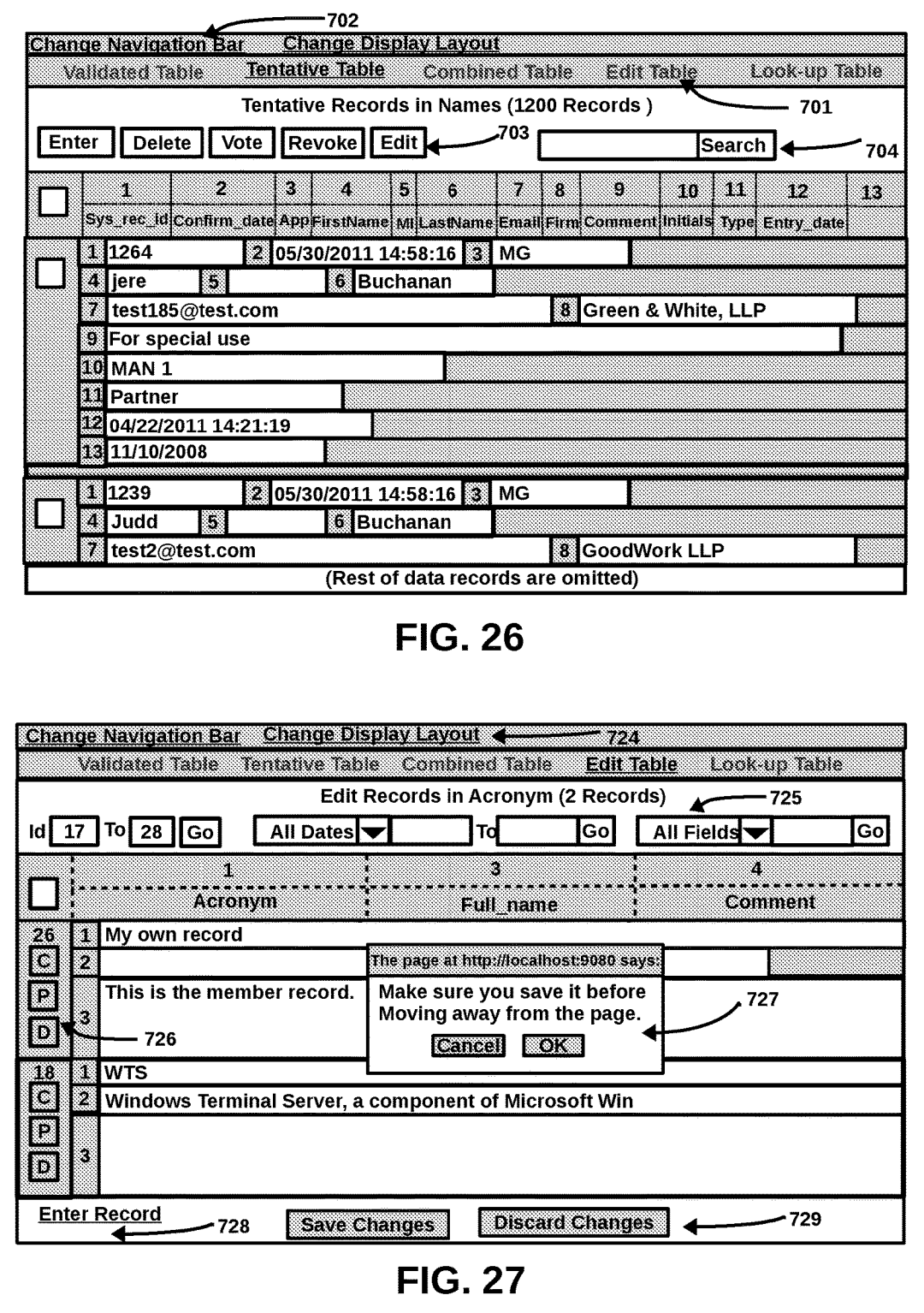

FIG. 26 shows a tentative table for a Names (attorney names) table. It has a view-selecting bar 701, links and tools 702 for changing navigation bar and display layout, action buttons 703, and a local search box 704, while FIG. 28 shows a combined table for an Event table. Use of the configured tables can be demonstrated by examining the functions of the "Attorney Name" table or the Names table. This table is used in typical privilege review. When a user encounters an attorney name in a document, the user enters the name into this table by using the "Enter Records. If data validation route for this table is a tentative table, this new record first enters into the tentative table, and is viewable and retrievable in the tentative table. The record is also searchable by all users using the global search function, but its tentative status is clearly indicated by a red record number or other marking in the search results. Unlike the manager's page, the initials of a record on the users table are not a link so other users cannot view the detailed information about the record owner.

Right below the project name in all table view pages is an input box for conducting global search. When a search key is typed in this box and the page is submitted, the server searches through all configured data tables, server pad table, and discussion board, and retrieves all records matching the search key. A search result from a global search is shown in FIG. 30. Each of the view tables contains a local search box 704 (FIG. 26). Search is conducted within the scope of the searchable records and plural search keys are treated as alternatives.

Figure 25:
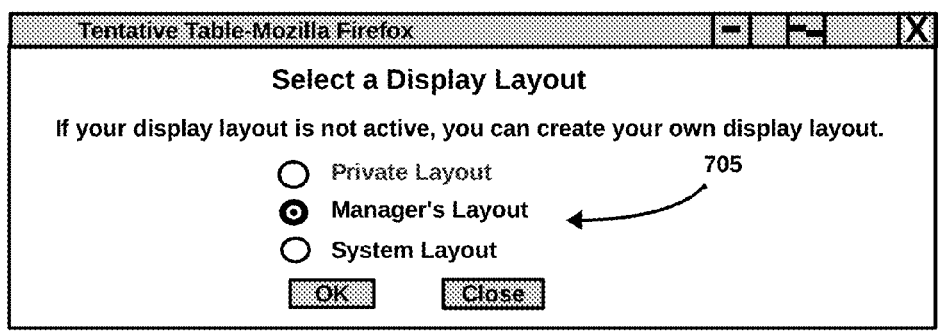
FIG. 25 shows a dialog page allowing the user to change a display layout for an associated data table.

FIG. 25 shows the pop-up page for the user to change display layout for a table view. This page is opened when the user clicks "Change Display Layout" at left top. The user can select a layout from the choices 705 including a group layout, a system layout, and personal layout. System layout is one created by a program trying to allocate display space as reasonable as it can.

FIG. 27 shows a display layout of using one data field per line for the Acronym table in an Edit Table view.

FIG. 28 shows the page for validating data for an Event table by users' votes on a combined page. A record is admitted to the validated table when a predetermined number of users have voted for the record. This page contains a search box, a table body, and four buttons at the bottom: Enter, Delete, Vote, Revoke and Edit. A "Select All" checking box is placed on the far left column of the column header. There is a check box in front of each of the records. To cast a vote on a record, the user selects a record by clicking the front check box, and clicks the "Vote" button. The server takes and saves the vote upon the user's confirmation. The index number of the record changes its color from black to green so that the user knows this is a record the user has voted. The user can revoke his or her vote before this record is admitted as a validated record. Upon being revoked, the number of the record becomes black again on the web page. Two more users, user B and user C, also cast their votes for this record in the same way. When the last user cast the vote required to validate the record, the status of the record is changed. The record changes color and look and appears on the validated table. The server informs the user that the record has passed validation and has moved into the validated table. If the user opens the validated table, the user can see that the newly validated record is marked with "VOTE" in the App field and date and time in the confirm_date field. If a privileged user opens the data table in the validated table view, the user can see detailed information of votes by clicking its record number.

If both voting validation method and manager validation method are set up for the data table, one extra button, "Validate" is placed on the validation page under the manager's tentative table. The user can vote for a record or validate it directly. If the validation route is a tentative table, the process for validating records by a vote is substantially the same as that on a combined table.

FIG. 30 shows the search results from searching "tex" using global search. Plural search keys separated by space are allowed and are treated as alternative keys. All known advanced match methods may be implemented. Retrieved data records are arranged in the order of the data tables. On the result page, the user can change the appearance order by selecting a table to be shown first in a drop-down box 790. In addition, the user can select a sorting key from the choices available in the sorting box 791 for the selected table. If the records from the discussion board are displayed first, the ordering criteria can be selected from ID, email, phone, issue, IP, post date, search key, and content.

User may add new records to a data table by using Add page. Any of the data fields in any of configurable tables may use a static data source or one or more table fields of one or more of data tables as a data source on its data entry form. Assuming that the input box for the Event field has been setup with fixed data pieces as data source, when user types in the Event field, the server searches and retrieves data pieces, sends data pieces to the client, and displays them in a dynamic selection box. If the user moves the cursor to a data piece in the selection box and releases it, the data piece is copied into the input box.

If the user has used the Event field as the data source for the Event field itself, when the user types in the data input box for the Event field, the keystroke causes an embedded script to call a server's search program with the key, table name, and field name as parameters. The server program searches the Event field, retrieves data pieces that match the typed key, sends the retrieved data to the client, and displays them in the selection box for the user to select. The user can select any of the data pieces in the selection box as input data. If no data is found, the user can type in a suitable data. By using this self-coupling, the user immediately knows if a particular record exists in the table.

This interactive search feature allows the user to hunt for possible data by typing in various letters in an active input box. Due to the setup feature, it is flexible to use. Moreover, the project manager can change data sources for any active field any time by using rhe configuring page. It is preferable that the selection box has the page navigation capability or scroll bars when the total number of data choices in the selection box is large.

FIG. 29 shows a first version of server pad, which has conventional and interactive search capabilities at the input box 733. A server pad allows a user to store personal notes and retrieve them later. The data in the server pad is subject to the global search by the user. The information on a server pad is not shared between different users. Each of server pads uses a dedicated individual database table or a common table. The data are entered in the window with a suitable delimiter and is saved in data records in a database table. The default delimiter is carriage return. When data are saved on the server, each piece of the data is stored as one record in the table. This can be done in part because data format is unimportant. When data pieces are entered on the pad's input window, they can be saved on the server by pressing the Update button when data pieces are shown in the original data entry order. Upon updating, the data are sent to the server and retrieved as one single text. The text is then broken up at all carriage returns or other predetermined delimiter positions to form plural data pieces. When the pad contains a certain number of data pieces, the server gets the same number of the data pieces and saves them as data records in the pad table.

There are several ways to sort data. One is an interactive search method shown in the input box 733 and the display box 735. Whenever a user clicks the drop-down box 734 to select a sorting method from all possible lists (Data entry order, reverse data entry order, alphabetic order, and reverse alphabetic order), it calls a JavaScript to call a server program to retrieve the data pieces again, sort them according to the selected sorting method, and send the data again. This could throw away all unsaved changes on the pad. Therefore, the pad throws a message to ask the user to save changes before proceeding with sorting.

Another version of server pad is implemented by using the Edit table function, the user can use it like a table calendar. The user can set up its feature by using a web page. The manager can set the number and size of main writing panes and make one or more fields have interactive search feature. The user can use search and sorting functions and interactive search function for storing personal data as in the Edit Table table. The user may use one record for one note entry, and may enter several entries on any day. All search features can be used to retrieve personal entries.

Phrase construction function, interactive search, and data-feeding function can be combined to deliver highest efficiency. A common entry in a privilege log is description of document, which may follow the following pattern:

(1)[Letter] [from counsel] {concerning} [corporate litigation].

(2)[Memo] [to the counsel] {concerning} [patent application].

. . .

(N) [Spreadsheet] [prepared at the request of counsel] {concerning} [corporate litigation].

The words or phrases enclosed by a pair of brackets is referred to as a data component. After a description is constructed, it is entered into a description field ("destination field") of a log table. The server first generates a data entry form containing four component input boxes A, B, C, and D below the original input box (the construction box). The data entry form is embedded with interactive search and data-feeding function. When the user types in a key in the first component box A, the server retrieves data pieces, sends them to the client computer for display in a dynamically generated selection box. The user selects a data piece in the selection box, copies the selected data piece into the first component box by a web script, and copies the selected data piece into the construction box for the destination filed. The user repeats the process for the second, third, and fourth component input boxes. A script embedded on the form constructs a description by using the data piece from each of the component input boxes. The data pieces are arranged in the same order of the component boxes, separated by a space. Upon submission of the data entry form, the server gets the description and saves it in the destination field.

The data used in a first input box for one destination field may also appear as a component data for a construction box for a second destination field. The construction box and all component boxes should be placed after the first input box so that they are able to use the data from the first input box. This is because that the user normally fills the data entry form from the top to the bottom and this arrangement will ensure that the first input box is filled first, and selected data pieces can be copied into the component box by a script.

The discussion board may be any of the well known discussion boards on the internet. The preferred version has two views: open view and conventional view. In the conventional view, each of the subjects is a link for opening the message. Each of the messages is docketed with subject, date and owner's name. An attachment would be just below the dotted line of the message body on the extreme right. The server downloads the attachment in response to a click at its name. When there are plural attachments, they are placed on the web page side by side without any delimiter (attachment2.ttxt attachment2.xxls) . . . . The rest of the functions and features are substantially same as those under the open view.

When the discussion board is in the open view, each of the messages is displayed in one section of the page: subject in the first line, the author information on the second line, the body of the message and attachments at the end. The author information, post date and IP address is printed above the message. Attachments are shown as links just below the message body on the right. Each of the attachments can be downloaded for view by clicking its name. Two links are placed at the bottom of the message page: "Submit Message" and "Search Message." The user can click the first button to invoke the page titled "Member Message" for submitting a message and click the "Search message" to invoke the page to conduct a search.

The "Search Message" page allows users to use two search methods. On the top is a simple search method by using message's subject. This method allows the user to find all messages containing the search key in the subject line. The second method allows the user to set up criteria for conducting an advanced search. The first criterion is the message's subject. Leaving this input box blank will cause the server to ignore this criterion and to include all possible subjects. Providing keys in this box narrows down the scope of possible hits. Search range can be further narrowed down by date. The user may use any date or specify a specific date range. In addition, the search page contains a link "More Search Key." By clicking this key once, one more search-key box is generated which is followed by a button "Fewer search key" for deleting it. The search keys entered on the web page are matched with only the search keys stored in the discussion board database. Leaving the search-key box blank causes the server to ignore the search keys in database. Records that meet all of the criteria specified on the search page are found and returned.

To post a message on the discussion board, the user clicks the "Submit Message" button. This page contains data input fields respectively for subject, search keys, user's name (optional), email address (optional), phone (optional) and a large input box for entering a message. The search keys are not shown on the discussion board, but stored in the database table. There is a link "More Search Keys" which allows user to create more boxes for entering search keys. Below the large input box, there is a link "Add more file path". Clicking this link once causes the browser to create a file path box with a browse button and two links: a link "Remove file path" next to the created file path box and a link "Add more file path" below the file path box. The file path is for accepting a file with a common extension. The user can remove this file-path box by clicking the link "Remove file path" or create more file paths by clicking "Add more file path." Therefore, the user can upload as many attachments as necessary and practical. After the user fills in data in all required fields, the user submits the page. In response, the browser responds with a confirmation message. Upon confirmation, the message is sent to the server and written into the proper database table.

Each of the message subjects is preceded by a check box under the manager account. The manager can delete any of the messages by checking on the box and clicking the Delete button at the bottom of the page. The server deletes the checked message upon a pop-up confirmation.

H. Reset Page Configuration by Configuration File

All data tables can be dropped and recreated by uploading a configuration file and executing its instructions. This configuration file should be tested in advance before it is used at any site. It contains (1) page address or table name or table ID, (2) navigation names, (3) optional page description for info tip, (4) page type, (5) table structure definitions, and (6) other optional features. Description and page type may be omitted if the system uses only one type of navigation bar.

This configuration file is preferably in a text format although it may be in any other suitable formats (additional tool may be used to create a file which cannot be read by humans). The purpose is to create the system configuration for a project instantly between two project life cycles. The data structure may be: "Table_Id; navigation_name; table_name; page type; description; table_structure; feature." Each page entry is defined by one statement which is correspondent to one record in a page setup table (also known as Head or Page table). For static pages, table structure are not necessary. A variant data structure for a configuration file is "navigation_1; navigation_2; . . . navigation_N;" "table_name_1; table_name_2; . . . table_name_N;" "page_type_1; page_type_2; . . . page_type_N;" "page_description_1; page_description_2; . . . page_description_N;" "table_structure_1; table_structure_2; . . . table_structure_N", and optional "feature_1; feature_2; . . . feature_N." Table structure is filled only for the web page associating with database table. This scheme may be simplified by omitting the statement for table names, and table names can be created using a string such as "table" or "page" affixed with a unique index so they look like Table1, Table2, . . . and TableN. The schemes may be simplified by omitting navigation names. In this case, navigation names are created using a string such as "Table" or "Page" or a user-provided string affixed with an index number. Order may also be omitted in configuration file because the program can get order from their appearance order.

Group ID is optional because the file belongs to the group for which the manger uploads the file. Table_id is useful but can be omitted due to the availability of the entry appearance order. Table Id may be a table id affixed with a string. Table ID or numbered table names (i.e., t1, t2 . . . tn) may be used so that the configuration file supports the common methods in the properties class. If a feature is not defined, the system uses default values and an authorized user can set up the features later. The table structures discussed above may use database SQL statement like "field_1 varchar(50), field_2 varchar(20), Date date, Type tinyint." If table structure is defined in lay language, the definitions should be translated into SQL statements for creating a database table. One example configuration file may contain the following structure:

format: t(0,1,2 . . . n)=navigation; table_name; description; page type; table structure
s0=Introduction; introduction; Introduction to the survey; NAT;
t1=Change; Change; changes to file pool; TAB; Events varchar(30),Date date,Comment varchar(300);
t2=Names; Names; Master Name Table; TAB; Email varchar(50),Firstname varchar(20),MI varchar(20), Lastname varchar(20),Company varchar(100),Date date,Type tinyint,Comment varchar(500)
t3=Discussion; discussion; Discussion Board; DIS;
s4=FQA; FQA; Frequently asked questions and answers; MTP;
s5=News; News; Recent client news; MSP;

This configuration file instructs the system to create six-page navigation system. The instruction for one data table takes one line, or is terminated with a unique character or string so that the system can split up the instruction. The example navigation bar contains Introduction, Change, Names, Discussion, FAQ, and News. Introduction is a native file that is stored in a table specifically designed for a static native page; Change is a data table containing three columns or fields; Names is a data table containing eight fields; Discussion is for opening the discussion board which uses a non-configurable table and an attachments table; and FAQ is a page containing frequently asked questions and answers with its data stored in a table for FAQ page; and News is a page containing multiple-section web texts with its data saved in a database table for multiple section page. The table structure is filled only if the page type is a data table. The instructions for defining table structures are similar to SQL statements.

The table name and navigation name for a table may be the same. This configuration format fully supports the common methods of the properties class.

A configuration file can be used to create a default working environment for a group or to reset the page layout, table structures and navigation system at once. On the web page for resetting Configuration, the option is defined by name="confmethod" and its value. The values include "default" for option 1, "delete data" for option 2, "reset selected tables" for option 3, and "reset all" for option 4. The option 4 is similar to option 1 except that the server uploads the user configurable file in a multi-part form and rewrite the data tables.

The general steps for resetting the default configuration is as follows:

(1). The server checks for the existence the path and validity of the default configuration file. If no such a file can be found, respond with an error message.

(2). Upon finding a default configuration file, the system reads the file into buffer, extracts data, and stores the data in proper variables. The information includes navigation names, table names, description, page type, and table structures of a plurality of data tables.

(3). Read the Page table to get the names of all data tables for the group by using the following statement: "select table_id from Page where group_id='groupID'" and found the tables id (also referred to as board id). Thus, the program gets the table ids of all existing data tables owned by the group.

(4). Delete all data tables owned by the group from the database. It is preferable to use "drop table if exist" statement to avoid error in the event of a data table does not exist in the database. Do not delete non-configurable tables, shared tables, and system tables.

(5). Insert all records for the group into the Page table. Since the table id is an auto-increment integer, the server knows the last inserted table id.

(6). Create all data tables according to the table structures from the configuration file. If the configuration file uses a particular page type that needs a non-configurable table, the server calls right SQL statements in the program for creating such table structure.

(7). Delete the records for the group from the display table and related tables.

(8). Delete records for the group from other related tables such as suggest_source, records_properties, and users etc.

(9). Delete all data from other non-configurable tables such as the discussion table and email table. A sample statement is "delete from discussion where group_id='groupID'".

The option is limited to those records relating to the affected data tables. For example, if the structure of any data table is changed or modified, the server deletes the records for the display layout for the affected table from the display table. The scope of deletion in all related tables such as suggest_source and records_properties is limited to those records relating to the affected data tables.

A class program, DefaultSys( ), has the following program structures. The program may be called with connection handler, group ID and file path. It first makes connection to the database by calling dbhandler.setAutoCommit( ), it then calls dropBoard( ). In this step, it first accesses the Page table to gets all table IDs from the table. The program goes through a loop for all table ids, uses table Ids to drop configurable data tables, and drops the history tables ht_id if a table is configurable data table (named as "tx"). It then deletes the records for the group from the Page table. It then calls clean-BaseTable( ) to delete data from the discussion table, the email table, and all non-configurable data tables. Finally, it creates new data tables by calling restore( ). The server loads the default configuration file and extracts table structures to be stored in proper variables. The server then goes though the loop for all page or tab records. If there is no more page and tab entry, program breaks. For a configurable data table, the server gets the maximum table ID from the database, constructs a proper insert statement using the table structure from the configuration file, and inserts the record into the Page table. It then creates a data table for the entry until it goes through the loop. In creating a table, it may use the max table Id or the last inserted table Id. After the system is restored, it sets AutoCommit as true.

The default configuration file contains the statement: sysField=Sys_record_id, Sys_usr_id, Sys_status, Entry_date, confirm_date, IP, Initials, and App. Those fields are added to the table structure of each of the data tables because they are used by the system for other purposes. System fields can be directly written in program, declared as the values of static final variables, or stored in any file as long as the server can get them in creating data tables and history tables.

The operation of those steps is subject to certain constraints. One constraint is the fact that certain data must be obtained for a late step of execution and other is to minimize the potential impact on the system in the event that a configuration attempt fails. For example, the user's intention of selecting an option must be ascertained before any of the steps; it is necessary to read the Page table to get the table IDs of the data tables for the project group before the data tables can be deleted; data tables can be dropped after those ids have been obtained from the Page table but preferably before the creation of new data tables to reduce the storage volume; the steps can be combined in one single java program for improved efficiency; and creating new data tables requires the knowledge of the table ids which are from the Page table; and deleting data from the discussion board and email can be done any time, but it is preferable to delete them after the program has reached a point that the configuration operation would succeed.

The function of resetting data tables may be extended to a method of selecting a configuration from plural configurations such as project_a.conf, Project_b.conf, and Project_c.conf. When the user selects option 1, the system reads all configuration files, and passes their file names or identities to the web page in hidden fields, and displays them in a list in descriptive language together with mutually exclusive radio buttons. After the user selects one of the available configurations, the user sends the file name in name-and-value pair to the server, which uses the selected file to reset table configuration. The rest of the operations are identical or substantially the same.

When the option 2 is selected, the server calls a server program to delete data from selected tables. When this option is selected, the JavaScript embedded on the page expands display page size to show all existing table names which have been embedded on the page, and a check box for each of the data tables for the user to select. It allows the user to select any or all of those tables to delete data without affecting table structures. To ensure that data is not deleted by a mistake, the user is required to confirm the option by typing "yes" in a pop-up window.

The program for deleting data is called with connection handler, history file flag, group id and tables names. It first sets dbhandler.setAutoCommit(false). It goes through all tables by a loop. For each table, the program cleans the data from the table. If the table is a data table has a history table, it just drops the history table. If the table is a discussion or email table, it deletes the data from discussion table and the email table. After those tables are deleted, it then clears the records from records_properties and suggest_source for those tables. It deletes the records which are for deleted destination fields. However, the program may be altered to keep the setup in the suggest_source table. When data is deleted from a data table, the history flag is set to "No." When table data are deleted, it resets the auto increment number by using "alter table "+tableName+" auto_increment=1." Deletion may be done by trancating the table. After deletion is done, the server sets dbhandler.setAutoCommit(true).

The option 3, resetSelected, is used to replace selected data tables by the table structures from the configuration file. All data in the selected tables will be deleted. The system will not touch existing tables that are not selected. Under the option 3, the user is prompted to select tables and browse the client computer to find the file path of the configuration file. Upon submission, the program overwrites selected data tables with the available tables in the configuration file. Data table should be named in a name best reflecting the substances of the table, and funny and arbitrary name should be avoided. For example, an attorney name table means a table holding attorney names no matter how many variations it may have. The system has the maximum number of data tables but this number can be changed in the program, a property file or a system file, or in declaration of Sysinfo.java. If the data tables on the configuration file are fewer than the tables that the user has selected, the system returns a warning and overwrites only those selected tables by the same tables defined in the configuration file.

The operation affects only selected tables without touching non-selected tables. The program for resetting tables should be similar to the program for resetting all tables. The only difference is that the program is passed with a list of selected tables. The program will delete data and tables that have been selected. The net effects can be described below:
  Table on the system: [ ] A, [X] B, [X] C, [ ] D, [ ] E
  Configuration file: A, B, Z
  Results: B (Reset)
    A, C, D, E (No change)
  In this case, only B and C are marked for reset, but only B is available to reset B. Therefore, table C is not touched, and so are the rest of the tables.

Optionally, the program may handle two conditions: Create a new table according to the configuration file if the table does not exist in your current system and delete all existing tables that do not match with any tables in the configuration file. The first condition is for adding new tables, while the second condition is to delete useless tables. The following shows the effect of the first condition on the net operational result:
  Tables on system: [ ] A, [X] B, [X] C, [X] D, [ ] E
  Configuration file: B, X, Y, Z
  Option: Create a new table if CF table does not exist.
  Results: B (Reset), D (Deleted), X, Y, and Z (New)

A, C, E (No change)

In the above example, the system adds three new tables: X, Y, Z to the system. The effect of the second condition is shown below:

Tables on system: [ ] A, [X] B, [X] C, [ ] D, [ ] E
Configuration file: B, X, Y, Z
Option: Delete the table to which no table structure is provided
Results: B (reset), A, C, D, E (deleted)
    C (no change) (this could be deleted)

When a table is marked for deletion, its data and structure are not protected. As to tables A, D and E, the user might want to keep. However, the program may be modified to keep C, A, D and E.

A method can be used to specify the location of insertion of tables from a configuration file. The setup page shows a list of existing data tables in the system with a radio button in front of each of them, and two mutual exclusive options "before the table" and "after the table" for each of the tables. This allows the user to identify the location of insertion by checking one table and one option ("before the table" and "after the table"). The server gets the list of the existing tables, goes though the list until it finds the table of insertion, and inserts the tables from the configuration file if the option is "after the table." Otherwise, the server inserts the tables at the point right before the table of insertion if the option is "before the table." To avoid confusion in deleting tables, the user should use the deletion feature with check boxes to select specific tables/pages for deletion.

In implementing "Deleting tables or data" option, the page shows a list of the existing data tables with a check button in front of each of them. When a user selects some tables to drop or delete, a script on the web page marks the selected tables by assigning a unique value to an operation status (i.e., name="opstatus", and value="drop_table" or value="delete_data"). Upon submission, the server drops or truncates each of the selected tables. This function allows a user to drop a plurality of data tables or delete data tables at once.

An improved implementation allows the user to view both data tables in the system and data tables in the configuration file, and allows the user to match exiting tables with the tables on configuration file. The server first uploads the configuration file, reads the configuration file to get table structures, and gets the existing data tables from the Page table. It then creates a page like FIG. 16 except that the field names are table names, a check box for deletion in front of each existing table, and a check box for adding new tables in front of each of the table in the configuration. Thus, the user can use any table in the configuration file to "reset" any of the existing tables, delete any tables from the system, and add any of the tables from the configuration file. The structure of FIG. 16 can be used to achieve sequential matches, table-name match, and manual matches. It is preferable to send a confirmation message like "(1) delete existing Table-A and Table-B, (2) Create Table-3 and Table-5, and (3) keep Table-C, Table-D, and Table-E." The user can confirm the operation.

When the option 4, "resetAll", is called to reset the system (FIG. 6), the user finds the file path for finding a configuration file from the client computer. Upon submission, the server sends a pop-up page, prompting the user to confirm. When the user confirms by typing "yes" in a pop-up, the system uploads the file into a temporary folder. The server reads the file and extracts data. The rest of the operational steps are substantially the same as the steps for resetting data tables to a default configuration.

In resetting all data tables for a group, the user gets session object and opens the page for resetting system configuration. The system presents two options: uploading a configuration file and using a default configuration on the system. If the user chooses default configuration, the server reads the default configuration file. Otherwise, the user uploads a configuration file. The server reads the file to get new table structures, table names, and navigation names. If the file can't be opened or no data in the file, the server sends an error reporting page, and ends the operation. If the server finds no error, it reads the Page table to get all records for the project, drops all existing data tables which are named by table ID with prefix "t", deletes records for the project from the Page table, and deletes data from the discussion and email tables. The server uses the table structure data to write records in the Page table in one record a time, and creates a new data table. If there is error in creating data table, the server sets error variable with a message and ends. If no error was encountered, the server checks whether it has more table to be created. If more table is to be created, the server repeats, and otherwise, it ends.

ResetAllTables.java loads the default configuration file and uses it to reset all tables. It goes through a loop from i=0 to the maximum table count. The loop is terminated by the statement "if(props.getProperty("t"+i)==null) break", which takes place when it has gone through all tables. It contains code for retrieving table Ids of all data tables for the group from the Page table, dropping all data tables for the group by using table IDs, deleting records for the group from the Page table, and deleting data from the discussion and email tables, and deleting all pad tables. It then restores the system. The restoring function includes getting the table structure from the configuration file, inserting records into the Page table, and dropping existing data tables, if any, and creating data tables.

If the number of the tables in the configuration file is fewer than the tables on the system, the server reuses the existing table ID. If the configuration file provides more tables than the tables in the system, the server gets the last table ID by the statement "new LastInsertID(dbhandler).getId( )" Each of the tables so assigned is above the table ID range originally used by the group. While data tables have been deleted in a prior step by using table IDs from the Page table, the system may still have spurious data tables using an assigned ID (which might be from a prior use, from an export file or any other non-obvious reasons). Therefore, it is desirable to use the "drop table t[n] if exist" command to delete any such spurious table. When the system goes through all tables, the system drops any of the data tables that are not reset by the system. This happens when the configuration file contains fewer tables then the system. After this operation on a configuration file defining six data tables, the Page table could contain the following records:

(1, 1, 'Notes', 'Notes', 'A table containing notes', '1', 'TAB', ' ', 'T', 'N', '0', NULL, '0', '2011-05-14 15:39:47', '0', 'N'),
(2, 1, 'Acronym', 'Acronym', 'A table containing Acronym', '2', 'TAB', ' ', 'T', 'N', '0', NULL, '0', '2011-05-14 15:39:47', '0', 'N'),
....
(6, 1, 'Production', 'Production_log', 'A production log', '4', 'TAB', ' ', 'T', 'N', '0', NULL, '0', '2011-05-14 15:39:47', '0', 'N'),
(7, 2, 'Introduction', 'Introduction', 'An introduction page', '1', 'MSP', ' ', ' ', ' ', '0', NULL,'0', '2011-05-15 00:50:30', '0', ' '),
(8, 2, 'Acronym', 'Acronym', 'A table containing Acronym', '2', 'TAB', ' ', 'T', 'N', '0', NULL,'0', '2011-05-15 00:50:30', '0', 'N'),
....

(12, 2, 'Discussion', 'Discussion', 'a discussion forum for posting information', '6', 'DIS', ' ', ' ', ' ', '0', NULL, '0', '2011-05-15 00:50:30', '0', ' ');

The first six entries in the Page table are for a project group with groupID=1 while the rest of the entries is for a project group 2. A setup operation by group 1 does not affect the data records for the project group 2. Their board ID or table ID may be non-consecutive because some tables have been deleted. This Page table defines overall table structures (see records 1, 2, 6, 8 above) for the system, but does not actually contain table structure for each individual table. The "N" value of the history field indicates that no data of has been transferred from a data table to a history table. The "N" in the last field denotes that the data table contains no data. The program also drops data tables for which the configuration file has not provided enough data tables in case where the configuration provides only 3 tables while the system has 6 data tables.

Configuration files may be prepared and tested for site use. They may be customized for different projects. Different projects require different tables structures. This feature allows the user to change table names, navigation names, and table structures on site within a project life cycle or between two projects life cycles. Before any of such operations, the server asks the user to save current project data by using the export function. If there is a need to change the system back to the original system's state, the user can upload the project zip file to restore the system.

I. Create and Modify Configurable Data Tables

The server sends the page (FIG. 10) which contains an input box for table's navigation name, one input box for a table name, and two buttons 503: "Insert Entry" and "Delete Entry." Below these two buttons, the page has by default one row of data input boxes for accepting the definitions of the first column of the table. Each row of input boxes is respectively for accepting filed name, type, length, not-null, and uniqueness. By clicking the "Insert entry" button once, it generates one row of input boxes. To create a table containing five fields, the user clicks the 'Insert entry' button four times. The user can delete the last row by clicking the "Delete Entry" once. The user enters table name and navigation name, generates a right rows of input boxes, and enters field name and select values for type, length, null, and uniqueness for each column. The navigation name is used in the navigation bar and the table name is used as the displayed title of the web page. The table name should be one single string without any space. Some words and phrases that have been used by the system cannot be used as table name. The field name should contain no space and special characters. The type of the field can be selected in the drop-down menu, and available choices include integer, tiny integer, char, varchar, double, year, date, time, and date and time. A check box for "Not null" is checked if the field cannot be null. A check box for uniqueness should be checked if the value in a field is unique. The page is submitted to the server. If there is error, it generates an error message and sends the setup page. If there is no error, the server gets all data, fixes missing table name or navigation name, and writes a record in the Page table. If there is an error in creating the record, the server creates an error message and sends the setup page. If there is no error in creating the data record, the server creates a data table. If the server detects an error in creating the data table, the server deletes the created record from the Page table and sends the setup page. If the server finds no error in creating the data table, it ends. If the operation is successful, the server shows the "Setup Tables" page with the newly created table in it.

To create a data table by the interactive method on web page, the user clicks the Setup More Table link (FIG. 9) to open the page shown in FIG. 10.

This web page allows the user to create up to 10 rows of input boxes for holding nine fields. This limit can be increased to any reasonable number. In this web code, when the user clicks upon "More Entry", it calls the following script to create a row of input boxes. The user can reduce the field number by clicking "Delete Entry."

A server program, CreateTable, is responsible for creating a data table on the server. It extends a HttpServlet and declares a connection dbhandler, group_id, table ID, table name, navigation, field[ ], length[ ], and type[ ]. It initializes global variables, processes the get request, and processes http post request. In processing the do-post request, it gets the values for group_id, table name, navigation, field[ ], length[ ], and type[ ] by using getParameter statements, makes connection to database application, uses the table name to find the current table Id, or, if the submitted data contains no table name, it just creates a table name. It optionally selects a project-wise default validation rule for the group. It creates a record for the new table in the Page table by using the executeUpdate command. The record includes group_id, navigation, table_name, description, page type, and validation_route. Knowing the table ID used in the last insertion, it then uses the last inserted table id to create a data table according to the naming convention. In creating the SQL statement, it first gets Sys_record_id, Sys_usr_id, Sys_status, default validation route, Entry_date, Confirm_date, IP, Initials, and App, and adds the fields (together with length and type) by a loop. It finally executes the SQL statement for creating the table. The server uses the table id to create a new data table. If the data table cannot be created due to an error, the system will delete the record it has just created from the Page table. Additional method has been provided to fix errors arising from out of synchronization between the entries in the Page table and data tables. Duplicate table names are not allowed within the project but are allowed between different projects because they use unique table ID and group ID.

The structure of any of the data tables can be modified on the page titled "Structure of Names" (FIG. 11). The structure of the attorneys (attorney names) table could have eight rows of data corresponding to eight fields: email address, first name, middle initial, last name, firm or company, dates, type, and comments. Each row contains field name, type, a null flag, and a uniqueness flag. There is a check box in front of each of the rows, and there are three buttons at the bottom: Delete, Add, and Modify.

If the user selects a column by checking a box in front of the column, and clicks the Modify button, the server sends a page titled "Modify Columns for Names" for editing the selected field in FIG. 12. This row of input boxes is substantially same as the input row used in the creating new table except that input fields are filled with the original values. The user then modifies the field. Upon submission, the server updates the table structure to reflect the modification of the field. To add a new field, the user clicks the Add button at the bottom on FIG. 11. The server sends a page titled "Add Columns for Attorney Name Table." This page is similar to the page in FIG. 12 except that it has the buttons "Insert entry" and "Delete entry" for adding or removing an input row. After the field names are provided and their types and flags are set, the page is submitted to the server. If the new fields are added successfully, the server responds with the same page titled "Structure of Names" except that it has newly inserted fields appended at the end of the table. If the user deletes a field from a table containing data, the user is prompted to continue because all of the data in this field will be lost. The user is reminded with the risk of losing data. If the user confirms the operation, the field together with data will be deleted.

J. Set Up Page Configuration by Import and Export Methods

The system has tools that allow the user to export project data in both native format and a human-friendly format (FIG. 5). If a group owns a table, the group manager can control the whole table. If a table belongs to all groups, the group can control only the records for the group. The tables that are shared by groups include Page, discussion, email, suggest_source, records_properties, and display.

In creating an export zip file, the server creates two files for tracking all files. One called data.properties or data_f.properties if the exported file was a human friendly format ("HFF") and the other is struct.properties. struct.properties contains table names and file paths and names of a list of files containing SQL table structures of exported data tables. It looks like "t6=struct/Production.txt; t5=struct/Privilege-Log.txt, . . . t1=struct/Notes.txt." The server can use each of the file to create the data table. Data.properties contains table name and file names of a list of the files containing data exported from data tables. From this file, the server knows where to find the file containing data for each of the table. The server can import data of each of the files into respective data table. When data are exported by using mysqldump, discussion attachments are saved in the one file, and email attachments are saved in a different file. However, if the project is exported in a human friendly format as denoted by different file name, data_f.properties (or "data_hff.properties"), discussion attachments and email attachments are stored in original native files in two different folders. The process of rendering a project includes (1) uploading a compressed project file to a temporary folder on the server, (2) unzipping and, optionally, decrypting it by using the key provided on the submitting page if the file is encrypted, (3) creating data tables and other non-shared tables, (4) deleting data from related tables such as suggest_source, record circumstance, display, pad, discussion, email, and groups, as illustrated in the sample program, and (5) reading the data from the file and writing them into the data tables and related tables.

The process for importing a project file is as follows. The user gets session identity and initiates the process of uploading project. At this step, the user selects an import method from two options: import a whole project and import selected tables. If the user selects the option of importing part project, the user selects tables and has an option of cleaning relation tables (importRelation="Y" or "N"). The user causes the server to upload the file to the server. If the server encounters error, it sends an error page. If it runs into no error, the server gets the user's values for import method, import type, tables, and importRelation, reads the file, and unzips, decompresses, and decrypts the file. If the server encounters error, it sends the upload page with an error message; or otherwise, the server connects to the database application. The server determines whether it imports a whole project or part of a project. If the import method is for part of a project, it calls ImportPartFiles( ). If the import method is for a whole project, the server calls ImportAllFiles( ). The server sets auto-commit to false, finds all table IDS for the group in the Page table, constructs table names by using prefix "t" and respective table IDs for all data tables and drop each of the tables. Optionally, this step deletes all history tables by executing a similar command. The server deletes data from the discussion and email tables. The server reads struct.properties to get the paths and file names of all files containing the table structures of all data tables to be imported, and loads by using a database command each of those files into the database, thereby creating new data tables. The server then reads data.properties to get the paths and file names of all files containing the data of the tables to be imported, and loads the data from the files into the database. In addition, since pads tables are not listed in the Page table, the server cleans it if it exists in the system. If the import file is in human friendly format, the process also includes a call to load the discussion attachments and email attachments and inserts each of them into discussion attachment and email attachment. The server knows the locations of all individual files within zip folder by reading struct.properties and data.properties. The program, a java servlet, needs support of file upload package. Some details in human friendly files are replaced by natural language.

To import selected tables, the user has three methods to choose: Import table and data (ImportMethod="SD"), Replace existing data (ImportMethod="OD"), and add data (ImportMethod="RD"). In addition, the user can indicate the need for cleaning entries in all related tables (importRelation="Y" or "N"). When the page is submitted, the program calls ImportPartFiles( ). If the user has chosen to import both table structure and data ("SD"), the server reads struct.properties file to get file paths and file names for the data tables to be imported. The server then loads each of the files by using the database command, thereby creating each of the data tables. In this step, the server skips the table if its name does not start with "t" and finds the file name for each of the tables selected by the user. If the user selects a table, but the server cannot find the file containing table structures, the server skips this table. For each of the data tables for which a proper table structure is provided, the server imports it by using a MYSQL command. "mysql -h serverhost -u username -p password database <dirpath/filename" The server repeats this process until all selected tables are created. The server then reads data.properties file to get the file path and file name for data for all tables (including email, pad, discussion, and other tables). The server then goes through all tables. If the table is a pad table, and if the import method is overwriting data, it deletes the pad data and loads pad data. If the table is not a group table and the import method is importing table structures and data, it proceeds to check it the table is a discussion and email table. If the table is an email and discussion table, it deletes the data for the group. If the table is other table, it directly proceeds to load data. If the table is one starting with "t", the server also loads history data. The server determines from the name of the properties files (data.properties v. data_f.properties) whether the exported file is a native database file or a human friendly file. If it is a native file, it ends here. If the file is a human friendly file, and, if the table is discussion or email table, the server imports email attachments or discussion attachments. The server determines if it has more tables to be imported. If it has no more tables, it ends.

The import and export features can be implemented as console programs. If the user has access to the server, a project zip file may be loaded onto the system from server's terminal. In this case, the command may be like "pimport project-file-path". Optionally, it may be implemented with a step of prompting for a project password. Upon confirmation of the password, the program decrypts the project file, reads data from the unzipped files, and writes data into data tables and all relevant database tables.

In exporting project, the system extracts data from the database or from selected data tables and related tables, saves the data in files inside a temporary root folder, and then zips the folder. The whole or part of project may be exported in two file formats, and the exported file can be imported back to the system. One file format is database dump file which is exported by using database application's dump tools such as mysqldump or its equivalent by using "mysqldump -h hostname, -u username -p password -d database ti > data_folder/tn.text." Optionally, the folder can be encrypted with a password. The dumped file can be imported back to the system to render the project.

A project or part of it can be exported in a human friendly format (FIG. 4). When this method is used, the program extracts data from each of the selected tables, add a proper delimiter, and save them in a folder. Project files may be saved in different sub-folders under a root folder. The files in the root folder are then zipped up to form a project zip file. After the files are unzipped, the resultant files can be read by humans, and can be imported into other applications such as Excel. If attachments from a database table are saved in one single file, they cannot be opened off the system. If they are extracted from the table and saved as individual native files, they can be opened off the system. The project zip file can be imported back to the database to overwrite same tables, add new tables, copies data into the data tables, and inserts records in related database tables such as Page, display, suggest_source, records_properties, pad, discussion, and email.

In creating a human-friendly project zip file, the server first extracts basic information ("group properties") such as owner identity, project name, project password, member list, member accounts and passwords, project table setup data, and writes them in one or more text files. The server extracts posting dates and times for web mail messages and attachments from relevant tables and saves the data in a text file, extracts posting dates, author identities, and client IP addresses from the discussion board table and saves data in a text file; the server also extracts data from the pad tables and saves them in a text file. All of those files are in well-delimited text format, and contains file names of attachments. They contain the same substantive information that is shown on the discussion board, email page, and data tables.

The message bodies of the email messages are saved as plural text files in one sub-folder, and the message bodies of the discussion messages are saved as plural text files in another sub-folder. The program also extracts discussion attachments and saves them in native formats in a sub-folder, and extracts email attachments and saves them in native formats in another sub-folder. Each of the attachments may be renamed by a message ID or appended with a unique string or its posting-date and time so that no name conflicts exist. The root project folder is compressed as a project zip with an optional password protection. This human-friendly project file can be opened and viewed without using the system's software.

Other data stored in property files, written in programs as constants, or static variables in java programs, must be treated properly. Any information in those files is taken care of separately because they are not part of the database. It is understood that the import and export tools may include functions to collect and manipulate the data.

The process of exporting a project is as follows. When the user submits the import page, the server gets group ID, user ID, file path, export method, selected table names, and file format. The server checks the file path, if the file path is valid, the server sets writable permission. If the file path does not exist, the server creates a file path and sets writable permission. The server connects to the database. It then determines which of the tables have been selected for export. If the user has selected no table, the server prompts the user to select tables again. Otherwise, the server checks each of the tables, exports only those tables that have been selected. The server exports the groups table if the groups table is selected. The server exports the email table if it has been selected, exports the discussion tables if it is selected, exports the owner pad table if it is selected, and exports users' pads if they are selected. Each time when the server exports data from a table, it also adds a record to a properties file by using "properties.setProperty (tablename, tablefile)." When the data of all tables have been exported, the server stores the properties in a file stream by using properties.store (outstream, "set") to create a data.properties file.

The server exports the table structure of the selected data tables to a file in struct folder by using statement like "mysqldump -h hostname, -u username -p password -d database ti > struct folder/tn.txt". In the process of exporting table structures, the server creates a properties.setProperty (tablename, tablefile) object. When all structures of all tables are exported, the server saves the object data in the struct-.properties file in a properties folder before the file was closed. The server then zips up the whole folder, and downloads the zip file to the client computer. The data.properties file is a map showing the relationship between the table names and data files, while the struct.properties file is a map showing the relationship between table names and table structures in SQL statements.

When the database application dumps data from data tables, it needs a sufficient wait time. Thread.sleep( ) causes the server to wait for the files to be formed. The required wait-time depends upon the table size and server performance. It cannot be a static value. The ways of determining the best wait time is by trial-and-error to establish a formula, which is a function of the size of the table file and the server performance. A solution is to run this program in background, and the user will download the file in a late time. The filename is preferably affixed with date and time so the user knows when the project is formed at the time of download.

K. Display Layouts for Configurable Data Tables

The method of implementing a display layout including (1) defining a data object for storing the display layout definition for data tables, (2) creating a record or data entry for a target data table for the user or the entire group, (3) displaying the target table in an initial default display, and (4) applying and changing any of the available layouts to the data table.

By convention, tables are always displayed by columns on the web page. When this type of layout is used, it imposes a severe limit on the number of data fields and may cause the user to constantly scroll back and forth to see data. The present invention discloses a new method of displaying tables in multiple-row display layout. Each of the data records is displayed in multiple display lines. For example, five small data fields may need only one single line, two relatively large fields may occupy one line, and a single large field may take a single line or even a big block. Since the looks and feels of a table on the web page are a matter of personal preference, the best approach is to let the user set up display layouts. The user knows the maximum size of each of the fields, and can allocate them into several lines or blocks. The user may have personal preference, arrange the fields in a certain way, and place some fields next to each other. For the attorney names table, the user might desire to set up a display layout as follows:

TABLE 2

Display Layout Example A for The Names Table

| Line | Fields in Each Display Line | Position |
|---|---|---|
| 1 | 'Sys__record_id, 20; Confirm_date, 20; App, 20' | left |
| 2 | 'Firstname, 10; MI, 6; Lastname, 10' | left |
| 3 | 'Email, 60; Company, 20' | left |
| 4 | 'Comment, 98' | left |
| 5 | 'Initials, 20' | left |
| 6 | 'Type, 40' | left |
| 7 | 'Entry_date, 90' | left |
| 8 | 'Date, 10' | left |

In this example, a data record is displayed in 8 lines. Four system fields are displayed in the first line and three name fields are displayed in the second line; two fields are displayed in the third line; and one the rest of fields are displayed in single line and all lines are aligned to left. First, the system uses a scheme to define (1) the number of total lines for each record, (2) the number of the fields and field names in each of the display lines (a field may take one line or even a whole block space), (3) the size of each of the data fields on the web page, which may be different from its storage size, and (4) position of each of the fields in the context or the position of each of the display lines on the web page.

Assuming that a display line has 100-character display space, comment needs more than one line so it has to be displayed in a block. First name, middle name and last may be placed in one line. Type, email (address), and Date may be placed in one line. Other fields such as Initials, Entry_date, Confirm_date, and App may be placed in one line. After the user knows how many lines to display the table and how to place data fields on the web page, the user clicks "view" on the user's top menu (A user could click "layout" on the Setup Tables page) to access the function. The user clicks the link for setting up a display layout in the line of the target data table to open the page. Under the manager's setup page, the user needs to specify whether the display layout is for personal use or for the project group by selecting a drop-down menu right under the page title.

2. Data Structure for Defining Display Layout

In order to make a display layout persistent, layout definitions must be saved in a file or database table. To allow users to use their own displays, the layout data object must be has ownership, application scope, and other unique identity. In the preferred embodiment, the display table contains the following fields: table_id, group_id, manager_id, line1, line2, . . . , lineN, status, position1, position2, . . . , positionN, font_size, KEY table_id). The table has a table_id, group_Id, manager_Id, N lines field definitions, and N lines position definitions. Manager_Id stores owner identity such as user Id. The status, having "m" or "p" value, determining whether the display layout definition is for the group or a user. Owner identity could be user ID or unique user names. The relationship between two or more variables is reflected in their order. The fields in the third line are defined by the positions in the third line, and their correspondent relationship is preserved through the use of an array index. The position definitions define the horizontal position of each of the display lines. If a line contains 3 fields of 20 spaces each and the line has 100 spaces on the display screen, this line will use only 60 spaces with 40 spaces unused. If the position is set to "left", the unused 40 spaces will be on the right. If the position is set to "center", it has 20 unused spaces on the left and 20 unused spaces on the right. Optional fields may be added to define the vertical position of each of the display lines and the relative position within a data field. The position instructions for potentially maximum N lines may be defined by one single string such as "lllccrrrr . . . ", which denotes left alignment for the first three lines, center alignment for the fourth to seventh lines, and right alignment for the last three lines.

There are many alternative data structures for carrying the necessary information for a display layout. One alternative scheme comprises an owner identification, a field list "field_name_1, field_name_2, field_name_3, . . . and field_name_n," a size list: "size_1, size_2, size_3 . . . and size_N," a field allocating instruction: "3, 2, 1, 1, 1, 1, n, n, n, n, . . . " and a horizontal position instruction: "lll0000000, lr00000000, c000000000, c000000000, l000000000, r000000000, n, n, n, n, . . . " This scheme means that each record from a target data table is displayed in six lines: three fields in the first line, two fields in the second line, and one field per line for the last 4 fields. The first three fields are aligned to left, the first and second fields in the second line are aligned to left and right respectfully, and the fields in the lines 3, 4, 5 and 6 are aligned to center, center, left and right, respectfully. The horizontal position instruction would be combined to form one word "llllrcclr0" as long as the program understands it. In this case, it is convenient to keep track of all fields by field index, rather than the index for tracking fields within each of the display lines. The scheme may include a two-dimensional positions by using strings "llllrcclr0; ttttcbbbb0", where the first string defines horizontal positions for 9 fields and the second string defines vertical positions for 9 fields. In the second string, t means "top," b means "bottom" and c means "center." The string lengths may be increased to accommodate the maximum display lines.

Another alternative scheme is one single string "Owner_identification@field_name:20:l:c, field_name_2:30:r:t, field_name_3:50:l:b; field_name_4:20:l:c, field_name_5:30:r:t; n; n; n; n; n; n; n; n". This schema can be split by "@" to form owner identification and display instructions for ten display lines. This scheme means that each record from the data table is displayed in two lines: the first line has three fields and the second line has two fields. The eight additional lines, denoted by n, are not used. After the remaining string is split at ";" to form ten sub-strings, only the first two sub-strings have values while the 3rd to 10th sub-strings have no value. Each of the sub-strings is further split by "," to get instruction set for each of the fields. After the instruction set is further spitting by ":", the system gets field name, display size, horizontal position, and vertical position, respectively. The instruction on vertical positions is provided, and the program applying display layout should be implemented to effectuate vertical position. The owner identification could be delimited by a different character or marked up with a unique mark or stored in a separate field if this scheme is maintained in a special table. The delimiter characters can be any characters as long as they are allowed in the database and used in proper levels. If the owner identification is also separated by the same delimiter ";", it has 11 sub-strings. The first sub-string is treated as owner identification and the remaining sub-strings are treated as layout instructions.

3. Creating A Display Layout

The method of creating a layout is just to filing a data record for the user and target table. From the field from a data table, one can create a layout by writing a proper data record and saving it in the display table or by uploading a file containing one or more layout records defining display layouts.

The display layout can be created for any data table without the support of the Page table or equivalent. The display layout can be created for fixed data tables. In this case, the navigation buttons are permanently built in program files. The field names, field types, and storage sizes for each of the static tables can be directly written in a program, properties file or system file. The server can get field names, field types, and storage sizes from any of those sources or from the data table in MYSOL directly. Reasonable size may be provided for those fields having no size information such as date, time, integer, and float. The user can set up display layouts for static data tables by using the field definitions. The server can fill layout descriptive arrays using the layout records, and display a target table by using the data and the layout descriptive arrays. Non-configurable data tables may be displayed in a multiple-row display layout. All other functions such as sorting, searching, data validation, and data routing can be implemented. Table attributes may be saved in a system file, program file, and properties file, and even partially in data tables themselves.

The user can set up a display layout for all users of the group interactively. Each user can create a display layout for each of the configurable data tables. After a user sets up a display layout for a data table, the display layout data is saved in a display table. If a display layout is created for the group, the status field has value "m". If it is created for personal use, it has value "p." The process of setting display layout is same FIGS. 17-20 and related discussion. Many steps of creating a display layout can be changed. Font size may be entered at any time or order. The maximum line size is the limit of total display space used by assigned fields in a display line and depends upon web page size, table view, and display screen. The system may provide any reasonable default value for maximum line size. The step of selecting fields must be done before allocating them; and field space sizes and line positions can be set only after fields have been allocated to lines. In addition, the process may be implemented in one or two steps by using interactive data changing method such as Ajax. The line number, font size, and maximum line size may be entered interactively, script may be designed in support of user action of allocating the fields to all display lines, and the server can get their values, and use them in generating web page for taking next action.

After the user submits the final page with specified fields in each of the blocks, the server gets the selected fields, their display sizes, and the display position for each line. The Java program processes the data and writes a display record for the table and for the user in the display table. A display setup program, DisplaySetup.java, writes the display layout record in the display table. It first declares session, dbhandler, user Id, table Id, group Id, layout type, fontSize[ ], fields[ ][ ], size[ ][ ], position[ ], and lines[ ]. The program gets values for session, user Id, group Id, table Id, and layout type by using getAttribute statements. It gets fields, positions, and field sizes by request.getParameterValues and request.getParameter, and stores them in the proper variables for each of the display lines in the loop (int i=0; i<lines; i++). It then connects to the database application, constructs a SQL statement to retrieve the layout for the user and the target table. If a record exists for the user and the target table, the program deletes it. It then creates a SQL statement for inserting a record by using loop. In creating the statement, the program creates the statement for inserting lines and assignment positions. Within a line, the program goes through an inner loop (int j=0; j<lineFields.length; j++) to create statement for inserting fields and field sizes. The program then saves the layout record by writing it in the display table. It finally sends the page for showing the layout. After the user goes through the four steps, the displaySetup create a personal layout for attorney name table: (3, 1, 3, 'Sys_record_id, 20; Confirm_date, 20; App, 20', 'Firstname, 10; MI, 6; Lastname, 10', 'Email, 60; Company, 20', 'Comment, 98', 'Initials, 20', 'Type, 40', 'Entry_date, 90', 'Date, 10', ' ', ' ', 'p', 'left', 'left', 'left', 'left', 'left', 'left', 'left', 'left', 'left', 'left', 14). This display layout record is for table_id=3 (the attorney name table), group_id=1, and manager_id=1 (the user ID), it is for a personal layout, as indicated by "p," and the display font size is 14.

4. Applying Display Layout

In one version of the present invention, the table view is crated by using a JSP program and a Java program BoardRecords. When the user tries to access a data table from a client, it calls the JSP program, which interacts with BoardRecords. One of the methods in BoardRecords is to determine the display layout based upon the value of view_layout in the users table and the related display records in the display table, as shown in the following code features:

The purpose of the method, displayFields( ), is to fill the layout descriptive variables according to the preference in the users table and available display layouts. If the view_layout uses a string as the settings of the default preference of the data tables, the program should get the letter for the specific table. displayFields( ) calls three methods: pFields( ), mFields( ) and sFields( ). System layout, sFields( ), is always available, and it may use conventional table format or stagger (one-data-field-per-line view) layout. In other words, sFields( ) fills layout descriptive variables with the values for a default display layout. If the program calls pFields( ) or mFields( ), it searches the display table for a display record for a target data table, processes the record, and filled layout descriptive variables if the operation is successful. The program, displayFields( ), first reads the users table to get the value for preference of display layout. If the user does not select a group display layout and nor a default layout, it will try the personal display layout. If a personal layout exists, the program uses the personal layout. If no personal layout exists, pField( ) will return a false result. The program then tries to get a group display layout by trying haveFields=mFields( ). If it has a true value, the program uses the group display layout for the table. If it is false, the program tries to use the system display layout by calling haveFields=sFields( ). A default display layout always exists. If view_layout in the users table is set to "m", the group layout, the program tries to get the group layout. If group layout does not exist in the display table, it then tries to get a personal layout. The program uses the personal layout if a personal layout exists, or uses the system layout if no personal layout can be found in the display table. If view_layout in the users table is set to "s", the program returns system display layout. By using the program, the system always applies a proper display layout to any data table.

All three methods, sFields( ), pFields( ) and mFields( ), fill data into several layout-descriptive array variables. The purpose of those array variables is to define the sizes of fields in the column headers, the fields in each display line, and line positions or field positions in the display context on web page. Since record data are displayed on the web page, the variable carrying data is also discussed. There are different ways to represent the layout data, but generic data elements contain the following:

| | |
|---|---|
| Data records | record_Data[i][k], for i=0 to P−1, and k=0 to M−1 |
| Record Line | Record_Line[j], for j=0 to N−1 |
| Positions | position[j], for j=0 to N−1 |
| Fields | fields[k], for k=0 to M−1 |
| Field sizes | fields_Sizes[k], for k=0 to M−1 |

Those layout descriptive arrays are for defining P data records, with M fields, displayed in N lines. Record_Line[j] defines the field number in each display line j for j=0 to N−1 and position[j] defines the horizontal position for each of the display lines for j=0 to N−1. The array fields[k] holds field names for k=0 to M−1 field names, which are used to print the column header and small print field identifiers in front of each field data on the web page. The fields_Sizes[k] defines the field sizes for k=0 to M−1 fields. The record_Data [i] [k] holds data from the target data table for i=0 to P−1 records and k=0 to M−1 fields. The server reads data from the target data table in the i loop. The total display line number, N, is generally smaller than the total field number, M. When all fields are displayed in one field per line, the display line number is equal to the field number (N=M).

The layout descriptive variables could be implemented as two-dimensional arrays: fields[j][k], fields_Sizes[j][k], hposition[j][k], where j=0 to N−1 display lines, and k=0 to the field number within each display line. Number of fields in a display line j is stored in Record_Line[j], where j=0 to N−1, and the field names are stored in fields[j][k], where k=0 to M−1. If field names are used to print the small field identifiers in front of each of the data fields, field names may be stored in fields[j][k], where j=0 to N−1, and k=0 to actual field number in the display line. Since a data table has P data records, the array for holding record data would require a three-dimensional record_Data[i][j][k], where i=0 to P−1, j=0 to N−1, and k=0 to actual field number in the display line. When the server generates the web page, the server gets data in the i loop. It gets one data record at a time, and therefore, it needs two-dimensional array record_Data[j][k] (where j=0 to N−1, k=0 to actual field number in the display line).

The layout descriptive arrays share the same index. Field names are used to print the column header and also used to retrieve data from the data table. When two-dimensional arrays are used, many of the arrays are not completely filled. The reason is that N fields can be allocated to one single display line, several display lines, and N display lines (one field per line). Both the program that processes the display layout records and the program that displays the table data must support the same scheme. When the program processes the layout record, it assigns fields[j][k] (where j=0 to N−1 and k=0 to the actual field number in the line) with null when it has no value. In printing the column header, the program exits the loop when it encounters null or when it hits the maximum number of the fields for the display line. Those generic layout descriptive arrays may be used in any implementations and under any server environments.

Java ArrayList may be used to implement the concept in a simple way. In this case, the i loop is for tracking the index for the ArrayList. Additional arrays may be used to define other properties such as font size, font type, color, and font weights. It is understood that many other variations may be derived from those as long as they can carry the required layout information.

The method sFields( ) for creating a system layout fields, fieldsSize, and recordsLine. It gets all fields from the correspondent data table by using "desc table_name." It gets the field names, and field size from storage size, which can be identified by the brackets. The program assigns an arbitrary size for variable types such as Date, Integer and anything that do not have numerical figure of storage size. It then adds field name, field size, line and position by using fields.add (Field), fieldsSize.add(StringSize), recordsLine.add(1), and position.add("left"). The program may specially threat Entry_date, Confirm_date, Initials, and App fields. If the operation is successful, it returns true.

The default display layout ("system layout") may be created without using a layout record from the display table. The default display layout may be (1) the conventional one-line display layout, (2) a one-field-per-line view layout, or (3) and layout created by a computer algorithm. The main requirement is a default layout must be available and reliable. The main purpose of sFields( ) is to fill recordsLine[j] position[j] where j=0 to N−1 (the number of display lines), fields[k], and fieldsSize[k], where k=0 to M−1. The array for holding record data is similar to fields[k], but it is generated by a different method. All data tables have eight system fields. The change table has three fields: Events varchar(80), Date date, and Comment varchar(300).

The sFields( ) is responsible for return a default layout. If a system uses conventional layout, it just returns a layout descriptive array consistent with the one-line display layout. If a system uses one-field-per-line display layout, it just returns a layout descriptive array consistent with the one-line display layout. sFields( ) first reads the table t1, the Event table (or changes table). It gets the fields right after the 8th row so that it gets all data fields but avoid getting system fields. It adds special fields Entry_date and Initials with recordLine[3]=2 if the intended view is a tentative table, or adds special fields Entry_data, Initials, confirm_data and App with recordLine[3]=4 if the intended view is a validated table. Those fields are added with appropriate fixed sizes. The data table is to be displayed in 4 display lines, each of the first three lines containing only one field and the last line containing four system fields. After execution, the method fills following values for recordsLine[ ], fields[ ], fieldsSize [ ], and position[ ].

TABLE 3

The Values in the Layout Descriptive Arrays for One Example Layout

| Display Line Values | Field Name Values | Field Size Values | Position Values |
|---|---|---|---|
| recordsLine[0] = 1 | fields[0] = Events | fieldsSize[0] = 80 | Position[0] = left |
| recordsLine[1] = 1 | fields[1] = Date | fieldsSize[1] = 10 | Position[1] = left |

TABLE 3-continued

The Values in the Layout Descriptive Arrays for One Example Layout

| Display Line Values | Field Name Values | Field Size Values | Position Values |
|---|---|---|---|
| recordsLine[2] = 1 | fields[2] = Comment | fieldsSize[2] = 300 | Position[2] = left |
| recordsLine[3] = 4 | fields[3] = Entry_date | fieldsSize[3] = 20 | Position[3] = left |
| | fields[4] = Confirm_date | fieldsSize[4] = 20 | |
| | fields[5] = Initials | fieldsSize[5] = 10 | |
| | fields[6] = App | fieldsSize[6] = 10 | | sFields( ) treats system fields such as Initials, Entry_date, Comfirm_date, and App in a special way, depending upon the view and layout setup. Those fields are hidden in some user views, but show up in the manager' views. Comfirm_date and App are not used in a tentative table because they are only for the validated records. Preferably, those system fields may be placed as neighbors and displayed in one single line to save space. To display four system fields in the fourth line, recordsLine[3] is set to 4. After all of the variables are set, a JSP program displays the table by using the default display layout or a group layout.

If the user has set up with a personal display layout and if the manager's preference is a personal layout, displayFields( ) uses the method pFields( ) to fill layout descriptive variables. To fill the layout descriptive variables, it first retrieves all lines, line1, line2 . . . lineN, all positions, position1, position2, . . . positionN, and font size for the target table and the user from the display table. The program goes through the lines in a loop, and gets fields names and field sizes for each of the line. It adds fields and filed sizes to an arrayList by using fields.add(fieldname) and fieldsSize.add (fieldsize) for each of the lines. In the loop, it may skip non-displaying fields such as confirm_date. At the end of each lines, it adds recordsLine.add(fieldnumber) and position.add(alignment) once for each line, as shown in the above table. The algorithm in mFields( ) is substantially same as that of pField( ) except that mFields( ) processes a group layout. It process display record for the whole group and only the manager (status='m') can create the display layout for the whole group to use.

One display layout for the names table is: (3,1,3, 'Sys_record_id,20; Confirm_date, 20; App, 20', 'Firstname, 10; MI, 6; Lastname, 10', 'Email, 60; Company, 20', 'Comment, 98', 'Initials, 20', 'Type, 40', 'Entry_date, 90', 'Date, 10', ' ', ' ', 'p', 'left', 'left', 'left', 'left', 'left', 'left', 'left', 'left', 'left', 'left', 14). This display record instructs pFields( ) to fill values for RecordsLine[ ], fields[ ], fieldsSize[ ] and position[ ] as follows:

TABLE 4 the Values of Layout Descriptive Arrays for Display Layout Example A.

| Display Line Values | Field Name Values | Size Values | Position Values |
|---|---|---|---|
| recordsLine[0] = 3 | fields[0] = Sys_record_id | fieldsSize[0] = 20 | position[0] = left |
| | *fields[1] = Confirm_date | fieldsSize[1] = 20 | |
| | *fields[2] = App | fieldsSize[2] = 20 | |
| recordsLine[1] = 3 | fields[3] = Firstname | fieldsSize[3] = 10 | position[1] = left |
| | fields[4] = MI | fieldsSize[4] = 6 | |
| | fields[5] = Lastname | fieldsSize[5] = 10 | |
| recordsLine[2] = 2 | fields[6] = Email | fieldsSize[6] = 60 | position[2] = left |
| | fields[7] = Company | fieldsSize[7] = 20 | |
| recordsLine[3] = 1 | fields[8] = Comment | fieldsSize[8] = 98 | position[3] = left |
| recordsLine[4] = 1 | fields[9] = Initials | fieldsSize[9] = 20 | position[4] = left |
| recordsLine[5] = 1 | fields[10] = Type | fieldsSize[10] = 40 | position[5] = left |
| recordsLine[6] = 1 | fields[11] = Entry_date | fieldsSize[11] = 90 | position[6] = left |
| recordsLine[7] = 1 | fields[12] = Date | fieldsSize[12] = 10 | position[7] = left |

*Note: The confirm_date and App fields are added for a validated table but not for a tentative.

Some fields such as date and integer do not have numeric values for defining their storage sizes. The program cannot get their sizes from field data. They must be given reasonable spaces on the web page. The code for generating a group layout for a data table is substantially same as the code for the generating personal display layout.

This method, mFields( ) differs from the pFields( ) in a where clause. It retrieves group display layout. Assuming that the user has the following group's display layout record in the display table for the names table: (3, 1, 1, 'Firstname, 20; MI, 2; Lastname, 20; Type, 10; Email, 30', 'Company, 90', 'Comment, 180', 'Sys_record_id, 10; Entry_date, 10; Confirm_date, 10; Initials, 5; App, 10', ' ', ' ', ' ', ' ', ' ', ' ', 'm', 'left', 'left', 'left', 'left', 'left', 'left', 'left', 'left', 'left', 'left', 14) (the "Group Layout"), after execution, mFields( ) fills values for recordsLine[ ], fields[ ], fieldsSize [ ] and position[ ]. The 12 fields are allocated to four display lines: the first line has five fields, the second and third line has one field each, and the last line also has five fields. Fields[ ] does not have Date because the display record does not have it.

After the values in fields[ ], recordsLine[ ], recordsSize [ ], and position[ ] are obtained, the JSP program then applies the layout to data records on the web page. The 12 fields are displayed in 4 lines or blocks. In displaying the fields, the on a JSP page runs three loops. The outer loop goes through the ArrayList. The middle loop goes through the record lines, from j=0 to N−1 (the line number). For each display line, the program goes through the field names, from k=0 to records Line[i]−1 (the field number per line). The code keeps tracking of the fields by using a cumulative index m. The middle and inner loops may be illustrated by the following pseudo code:

```
int m=0;
for (j=0; j<DisplayLineNo; j++) {
    for(k=0; k< recordsLine[j]; k++){
    print field[m];
    print recordData[m] (using fieldsSize[m] to determine the display space);
    m++;
    }
    [Print the HTML code for changing line]
}
```

For the "group layout" discussed above, the program prints the following 12 data fields data:

For j=0, 0 to recordsLine[0]=4, it prints recordData[m], m from 0 to 4

For j=1, 0 to recordsLine[1]=1, it prints recordData[5]
For j=2, 0 to recordsLine[2]=1, it prints recordData[6]
For j=3, 0 to recordsLine[3]=4, it prints recordData[m], m from 7 to 11

FieldsSize [ ] determines the display space on the table on a display screen and position[ ] determines the horizontal layout. After the program goes through the three loops, it results in a display layout. While code may be implemented in various ways, it must achieve the above layout.

A JSP program is used to create a web page using the layout. The JSP page contains <jsp:useBean id="BR" class="dforum.BoardRecords"/>. It then declares an array-list for records, fields, recordsLine, fieldsSize, position, and other necessary variables for page navigation and user session. It gets value by using records=BR.getRecords( ), fields=BR.getFields( ), recordsLine=BR.getRecordsLine( ), fieldsSize=BR.getFieldsSize( ), position=BR.getPosition( ), and fontSize=BR.getFontSize( ). The number of records is the number of records that will appear in the view. It first creates a column header by using the fields and fieldsSize by using a loop process and those cell header names are also the links for sorting. If the Java program gets no records from the database table, it sends a page containing the message that the data table contains no data. The HTML code for displaying a table in a view contains three loops: for(int i=0; i<records.size( ); i++), for(int j=0; j<recordsLine.size( ); j++) and for(int n=0; n<(Integer)recordsLine.get(j); n++, m++), where m is an accumulator as an index within a record. The outer i loop goes through all records to get individual record data. It gets records by ArrayList rcd= (ArrayList)records.get(i). If the page is a combined page, it should include all data records. If the page is a tentative page, it will skip all validated data records since the BoardRecords returns all records. For each of the records, the program prints a small left-side cell, which may be in different colors for tentative records and validated records. If the table is set up with a vote method, the background color of the left cells may be marked in different colors, respectfully, for user-voted records, others-voted records, and non-voted records.

For each of the records, the program goes through all record lines from j=0 to recordsLine.size( )−1. If the table has five display lines, the program will go though all five lines one by one. For each display line, the program will go though all data fields from n=0 to n<recordsLine.get(j)−1. If the display line has three fields, it will go through the three fields. The field names are used as field names or unless correspondent numeric number are used to save space, the field sizes are used to define the horizontal spaces of data fields on table. The position defines if the whole line should be alighted to left, center, or right within the span of the display area. It keeps track of the fields within each record line j. In addition, a cumulative counter m is used to keep track of the data field. All field data are allocated to all display lines.

5. Changing Display Layout

Each user is allowed to set up one or more display layouts and to select one from all available layouts for any data table. The user's preference is set in the users table by the value of "view_layout" enum('p','m','s','d') not null default 'd', 'p for private display, m for group display layout (also "common layout"), s for system-set layout, and d for having no preference. This view_layout field serves as the user's preference for all data tables. To allow the user to set preference for each of N data tables, the layout definitions may be implemented in a string like "ppppmmss", where the user uses personal layout for tables 1 to 4, group layout for tables 5 to 6, and the default layout for tables 7 to 8. The order of the letters is correspondent to the order of data tables sorted by their table ID numbers.

The system allows the user to change the display layout for any of the data tables at the client computer. On each of those pages (tentative table, combined table, validated table, and Edit Table), there is a link for changing layout ("Change Layout"). This link is associated with the code <a href="javascript:openLayoutSet('edit', 'member')." When the user clicks it, it opens a web form for setting layout. This form has hidden field flag and tableid, and a variable "layout." The "layout" variable has three options: s, m, and p, respectively, for a system default, a group layout, and a personal layout. The "flag" value determines whether the page is one of tentative, validated, and combined table, or an edit table view. After the user selects an option, and submits the page to a server program, LayoutSet.java, together with table ID and flag="view." The program gets the value for "flag" and "layout" and saves the layout's value in the view_layout field for the user in the users table. The program then sends an updated page. The LayoutSet program uses response.setContentType( ). It prints a web page containing a window-reloading path. If the flag is set to "view", it reloads the window. If the flag is set to "edit", it calls an Edit Table page using window.opener.location.href=jsp/[user]/editTableInText.jsp?tableid=5, where [user] may be member or manager. If the user starts the layout dialog from an Edit Table page, the flag would have the value "edit."

L. Generate Web Page for Configurable Tables

The main functions of the system are realized by using database application with special system tables: Page, display, suggest_source, records_properties, groups, and users.

FIG. 22 shows the main steps of creating web page 718 for a data table. The user logs in the server at Step 711, calls a view page or web table at Step 712, and accesses the database at Step 713. It gets project settings such as project name and code, and preference settings such as layout choice and name search settings etc. at Step 714. It then gets all navigation names, all table Ids, the table name, the field names of the called table, and the settings for the called table from the Page table at Step 715, gets the relevant display layout data from the display setup table by using the preference data at Step 716, and uses the field names to read data from the data table at Step 717. The server uses navigation names to build a navigation bar at Step 719, uses the table name to build the web page or table, uses the field names to build column header 720, uses retrieved layout setting and record data to build data records in a proper format at Step 721, and uses other data to create other code at Step 723. The server creates column headers by using the layout descriptive arrays, and uses the retrieved data from the target table and uses them in printing data records in a proper web format defined by the layout descriptive arrays.

Among the layout descriptive arrays, fields[ ] is used to print column headers and optional small field identifies, recordLine[ ] is used to allocate the fields in each display line, and fieldsSize[ ] determines the display space of fields, and position[ ] determines the horizontal position of each display line on the table. The server creates other HTML code and embedded script to implement other functions such as Edit, Delete, Validate, Validate all, Vote, Revoke, Sort, Search. After the page is generated, the server sends it to the client for rendering. After the page is rendered, the user can change the initial default values for many variables such as display page, page size, sorting key, and search keys.

For each view page, two types of data field check methods are used to ensure that entered data are good. First, the browser checks whether necessary data exist and, if yes, whether the data are of right type. If required data are absent or are of wrong type, Browser asks the user to fill data. The server programs also check data validity from the server's side. If the data are valid, the server responds with a success message. Otherwise, the server responds with an error message.

M. Edit Table Page

The Edit table page is a special way of rendering data for a table (FIG. 27). It allows users to edit tentative records efficiently. The user calls the page by clicking Edit Table on the view-selecting bar. This page allows the user to delete any records, create data input boxes for new data records at the end of the table, enter data for newly recreated data input boxes, copy data from an existing record and paste the data onto an existing record or a new record, and update data in the data table.

As shown in FIG. 27, Edit Table page has navigation/layout changing tools 724, search boxes 725, edit icons 726, a table body, and a button "Enter Record" 728, and submission button 729. Each of the data records may have plural data fields or columns, depending upon the table's display layout. Each of the data fields is shown in one editable input box. If a record in the table has five fields, it has five editable boxes. On the left of each of the records, there are three very small menu icons 726 respectively for copying, pasting, and deleting data records. Each of the icons indicates its function whenever the mouse is moved over it. At the top and bottom are two buttons: "Save Changes" and "Discard Changes." The page also has a page number navigation bar. The column name is also a link for sorting the table using the field as a sorting key. The user can use the search tool, the sorting links, and the page number navigation bar to find data records on the Edit Table page.

To delete a record, the user just clicks the delete icon on the left of the record. The record has been deleted from the web page, but has not been deleted from the data table. Deletion will be effectuated only when the page is submitted. To enter data at the end of the table, the user first creates a block of input boxes at the end of the table by clicking the "Enter Record" bottom. The user types data into the boxes and saves the record by pressing on the "Save Change" button. If the user wants to copy data from an existing record to this empty record, the user clicks the copy icon on the left side of the existing record, and pastes the data onto the empty record by clicking the paste icon associated with the empty record. Of course, data can be copied from any existing record and pasted onto any exiting tentative records of the user. Selecting individual fields is not necessary for copying and pasting a whole record. However, the user can copy data from one field to another field on the web page by using the system's copying method.

To make permanent changes to the database table, the user clicks the "Save Changes" button to have changes saved. If the user does not want to save the changes, the user can click the "Discard Changes" button. Use of the search function would cause the server to retrieve the data records, reconstruct a web page, and thus discard unsaved changes. Conspicuous instructions are placed on the web page to warn the user that navigating pages, conducting a search, and sorting data records would cause the server to discard all changes made on the table. An embedded script throws a warning message whenever the user tries to do anything that causes the server to discard changes.

Different functions interacts on the Edit Table page. When the user clicks on the Edit Table link, the server sends the edit table page. The user can add new records, delete records, and Edit records. To enter data into the table, the user creates a block of input boxes by clicking the "Enter Record" link at the end of the table, types data into the boxes, and then save data. To delete a record, the user clicks the "Delete" icon on the left of the records, the record is deleted from the table on the web page upon confirmation, but has not been deleted from the data table. The browser marks the record as "deleted." To edit a record, the user selects a data record, changes data, causes the record marked as "edited" and save it. The user decides if changes should be saved. If the user chooses to save changes, the user presses the "Save Change" button, caused the page submitted to the server. In processing data, the server access the database, and saves all changes in the target data table, go back to the edit page. The user may remain on the page or press the "Discard" button to discard the changes. The user can press the "Save" button any time to save the table and can press the "Discard" button any time to discard changes. If the user has touched the data in the table but tries to move away from the page, the user is prompted to save the changes (at 727) or discard the changes.

N. Editing, Deleting and Voting Methods

Edit page may be used to edit a plurality of records for a data table. If a user selects 3 records (213, 212, 211) and then clicks the edit button, the member is promoted to edit one record at a time. The edit page shows record number 213 under edit, and the records, 212, 211 stand in a line for edit. The record Ids are tracked by using statement: <input type="hidden" name="recordId" value="212,211,"/>. If the user runs into a record that the member is not authorized to edit, the server responds with a message, and prompts the member to skip it, and, upon skipping the record, the member is presented with next record for edit together with a list of the record numbers in the line. The records standing in the line will decrease one by one until all selected records have been edited.

When the user chooses plural records for vote, it changes the action by the code <input type="submit" name="vote" value="Vote" onclick="changeAction('/dforum/ ConfirmEntry', this.name)"/>. Thus, the browser prompts the user to confirm. Upon confirmation, it proceeds to change vote status. Otherwise, it will do nothing. It is understood that the program can be modified to include a feature of displaying a message that the user has already voted.

When records have been voted, the color of the records in the left margin (the field number and cell background) changes, indicating their voted status. If the user revokes her vote, the color will be changed back to the original color. It is preferable, that two distinctive colors are used to distinguish the records voted by the user and the records voted by other users. By modification, the edit table page may contain links for both validation and editing functions, and thus a privileged user has an option to edit a record only, validate a record only, and edit and validate a record at once. When a record is both edited and validated, "-R" is attached to the creator's initials, and manager's initials are added in the APP field (the initials of the person who approves the record).

The tentative page, combined page, and all manager pages have the function of showing voting status by moving mouse over the record ID number or the first field. This features is realized by using a records_properties table, with the following fields: table_id, record_id, user_id, vote_status, vote_date, revoke_date, and access_date. Vote_status has the values ('0','1','2','9','10'), where 0=no action taken", 1=voted, 2=revoked, 9=validated by manager, and 10=validated by vote. Vote_date, revoke_date, and access_date can store a plurality of dates each.

When a user submits a vote on the validation page, the browser shows "Records List 2: The records have passed validation. You can find them in "Validated Table." For this record, it has the value (2, 2, 3, '10', '2011-07-05 19:58:15', null, null), reflecting the status of being validated by vote. If a user (Id=2) voted and then revoked it, the server results in a record: (3, 2, 1, '2', '2011-07-05 20:15:37', '; 2011-07-05 20:16:34', null) where status=2 means "revoked." The record (3, 2, 1, '2', '2011-07-05 20:15:37; 2011-07-05 20:18:16', '; 2011-07-05 20:16:34; 2011-07-05 20:20:50', null) suggests that the user (id=2) has voted twice, and revoked twice with a final status of "revoked."

When mouse is moved over the number and the first data field, the browser shows the voting status. It gets items and votes from an ajax object from the server, fills the items and votes arrays, adds votes and access information, and sets divisions visible. Since ajax technology, used to display data interactively is a matured art, those functions can be adopted from prior art applications. Embedding static voting data on web page is not a good approach.

The data entry form has a feature of displaying message on the same data entry page. If the server finds no error, the server writes the record, and responds with a success message on the top region of the same data entry form for entering next record. If the server encounters an error, it displays an error message. The operation scope of Edit and Delete on data records are different from the scope of Vote and Revoke. The server may use different criteria for determining if it creates a check box in front of each of the tentative records on a table view page. One method is to place a check box for all tentative records. In this case, the user can check records of others for voting purpose, but cannot edit and delete them. Another method is to place a check box in front of each tentative record only if data edit rule is public, the user is the record's owner, or voting method is a validation method. It does not place a check box for the record of other users if neither voting validation nor public edit is required. To avoid scope inconsistency, the system may use two separate series of checking boxes, one series for Edit and Delete, and the other for Vote and Revoke. Also, the voting function is directly implemented as a small link "Vote" for all proper records and a "Revoke" for a record voted by the user.

A server tool for changing the status of the records may be used to move data records from one view to another. If there is a need for revisiting validated records, the user can use the tool to manipulate their statuses so they are lodged in a tentative table for edit.

O. Table Views, Search and Sorting Functions

All data tables are similar in their looks, functions, and views. Records statuses are determined by the values in their status fields in the data table. They are changed upon validation. Any suitable method may be implemented to mark the two kinds of records so that they can be easily identified. For example, the background color in the space containing the front check boxes may be marked in black for tentative records and in green for validated records; the first field index number, an index number, may be marked in black for validated records, and in red for tentative records; and their validated status may be shown in an information tip, upon moving the mouse over a record. Their marking scheme for validated records should be distinctively different from the marking scheme for voted tentative records: the records that the user has voted, the records other users have voted, and the records nobody has voted.

The system is designed to allow for use of both tentative table and combined table as validation page. In this case, validated records are lodged in the validated table, tentative records in the tentative table, and all records in the combined table. Validation may be performed in either the tentative table or the combined table. Data for difference views may be stored in different database tables as long as the program is properly modified.

The method of retrieving data from a data table may be used to replace the specific way of retrieving the data. The common implementation methods of submitting data to a server for saving in a database table, retrieving data from a database table, and displaying data from a database table can be used to substitute the specific implementation.

The search function is part of the server program for retrieving data for displaying. This server program is responsible for retrieving tentative records, validated records, or all records according to record statuses. This is done by constructing different segment of SQL statements in response to the selected view type. It also has a method for determining the maximum page number that is used in the page number navigation bar. It also has a method SearchRecords( ) for generating the segment of SQL statement for conducting search and sorting. The only unique feature in this search method is that the program specially takes care of the names table. It must recognize four integer values as respective types: law firm, client, partner, and other. It also gets the voting status for each of the records that are passed to the JSP for rendering.

The server first gets the search keys in one string, and the fields to be used as a sorting key. The server splits the keys by space and uses them as alternative search keys. It constructs a where sentence: "and (first_field like '%key1%' or like '%key2%' second_field like '%key1%' or like '%key2%' . . . last_field like '%key1%' or like '%key2%')."
The entire SQL statement may look like:
    select Sys_usr_id, Sys_status, Sys_record_id, [a list of selected fields] from to where Sys_status in ('1','2') and (first_field like '%key1%' or like '%key2%' second_field like '%key1%' or like '%key2%' . . . last_field like '%key1%' or like '%key2%') order by orderbytype limit pagesize (pageNo−1), pageSize In the above illustrative statement, Sys_usr_id is included on the table views for project managers. The selected fields are the fields to be displayed. table name, tx, is formed by attaching prefix "t" to the table ID. Sys_status has three values: Sys_status="0" for validated record, Sys_status="1" for tentative record from a combined table, and Sys_status="2" for tentative record from a tentative table. Thus, Sys_status="0", Sys_status in ('1','2'), and Sys_status in ('0','1','2'), which determines how the data is retrieved for three table views: validated, tentative and combined tables. The server adds Sys_record_id to the fields if it is not in the fields.

Table views is created by a JSP program that uses a java class BoardRecords. When a user submits a request, BoardRecords gets values for searchkey, pageNo, pageSize, curPage, and orderby etc. from the submitted web page. It may use set-methods to pass into an object the values of searchkey, pageSize, curPage, orderby, and orderbytype etc. The java program is responsible for (1) retrieving data by a search method using user-provided search key, (2) sorting found data, (3) getting right portion of data for the right page number (as defined by page size and the current page), (4) getting the vote properties for retrieved data records, (5) displaying the layout definitions. One or more of those functions may be implemented in separate programs. It applies the new values of orderby and orderbytype in sorting the data, and the new values of search key for conducting search. Those new values affect the SQL statements for conducting search and sorting. By changing this portion of the code, the search and sorting methods can be changed. For example, the search may be performed by using a plurality of keys in user-selectable logic such as "and" and "or".

In generating a web page, the JSP program (or another JSP program) then uses data to build the web page reflecting new sorting key and sorting method. The web page also indicates table type, user's role ("MB"), group_id, usr_id, and board Id.

P. Global Search

Global search presents several difficulties in implementation. One of the difficulties is the display format of found data records. It cannot be planned in advance because data tables are configured between or within project cycles. Data tables have different field numbers and types. Due to the uncertainty, it is thus impossible to display them in a conventional table view on the web page because the programmer could not allocate a suitable size. Therefore, search results are printed on the web page in "text format" or in the same display layout set for the table view.

Another difficulty is lack of a common sorting key. Since data tables have different column numbers and different fields, there is no way to sort them cross all data tables. Sorting results are displayed according to the order of tables. The result page contains an embedded tool for changing sorting method. This tool, in conjunction with a server program, allows the user to choose the first table, and select a sorting key from all available fields in the selected first table. The system allows the user to focus on one table and view the results sorted by the most likely key. It is understood that an advanced sorting tool can be implemented to allow the user to set up the order of all data tables for showing search results, select a sorting key for each of the tables, and save search configuration on the system.

The web page contains a global search form which allows the user to call a global search program. A JSP program, CombinedSearch.jsp, use a Bean CombinedSearch. This program declares variables with initial values for orderby="sys_record_id", searchkey=" ", firstboard=" ", records=new ArrayList( ), boards=new ArrayList( ), maxPage=0, curPage=1, pageSize=50, and isexist=false. It then gets values for orderby, searchkey, firstboard, pageNo, and pageSize by using request.getParameter. It gets usr_id and group_id from a session object. It then passes the values of usr_id, usr_id, pageSize, curPage, searchkey, firstboard, orderby, pageNo and isexit into a combinedSearch class object. The search results are filled into an object combined Results( ). If search result exists, the JSP program gets data records, maxPage, and board by using three get-methods: records=CS.getRecords( ) maxPage=CS.getMaxPage( ), and boards=CS.getBoards( ). The program finally displays search results as shown in FIG. 30.

The combinedSearch program conducts the following operations. In the combinedResult method, it connects to the database application, then calls four methods: search Board( ), field( ), boardMaxpage( ) and selectRecords( ), and closes the connection. The method SearchBoards( ) gets a list of database table names and table common names (or description) for all data tables, saves them in str, and adds them into variable boards by using boards.add(str). It then adds discussion table to str, and adds it to boards. And finally, it adds pad table and other searchable static tables to boards. The method field( )constructs the portion of the where statement ("where[j]") for conducting search. It retrieves field names for each of the tables by using "desc table." If database application is not used, it may get data from the equivalent file. It constructs part of an SQL statement like "Acrynom like '%firstkey secondkey%' or Acrynom like '%firstkey%' or Acrynom like '%secondkey%' or Full_name like '%firstkey secondkey%' or Full_name like '%firstkey%' or Full_name like '%secondkey%' or Comment like '%firstkey secondkey%' or Comment like '%firstkey%' or Comment like '%secondkey%'".

The method boardMaxPage( ) gets the count of found data records for each table by using the statement like "select count(*) from board[0] where where[j]", where board[0] contains database table name. It goes through the loop from j=0 to board.size( )−1. When board[0] is a discussion table, it would be "select count(*) from board[0] where group_id='groupid' and (where[j])." This program then sums up the count for all tables to arrive at the total count, which is shown in the search result. The count should include record numbers from static database tables.

The method, selectRecords( ), gets the data records to be shown in the result page. The actual data records may be of many pages long, but the selected result is of one page. It has initial values: startRecord=pageSize*(pageNo−1), curRecord=0, lastRecord=0, limitStart=0, limitSize=0, and readCount=0. The program conducts searches by using an SQL statement "select selectfields[j], ' ' as fieldx,'board[1]' as boardname from board[0] where where[j] [order by orderby] limit limitStart, limitSize."

If there is four data tables, one pad table and a discussion table, it would execute an SQL statement six times. The statement for the discussion board includes an additional parameter, "group_id='groupid'," with necessary adjustment. "Order by" appears only for the table selected as the first table. The X in fieldX is an index number. After the server runs a search by using search key "firstkey secondkey", an SQl statement for the Acrynom table is "select Sys_status, Sys_record_id, Acrynom, Full_name, Comment, ' ' as field0,' ' as field1,' ' as field2,' ' as field3,' ' as field4, ' ' as field5,'Acrynom' as boardname from t4 where Acrynom like '%firstkey secondkey%' or Acrynom like '%firstkey%' or Acrynom like '%secondkey%' or Full_name like '%firstkey secondkey%' or Full_name like '%firstkey%' or Full_name like '%secondkey%' or Comment like '%firstkey secondkey%' or Comment like '%firstkey%' or Comment like '%secondkey%' order by Sys_record_id limit 0,0."

The rest of the program fills the found records into an array. It copies the data from the column 3 to the maximum column into a text string. If a data field has nothing, it will be copied as [ ] to indicate empty data. It adds a red color marks for the record number for tentative records (whose sys_status is not 0). This program returns maxpage, and ArrayList boards and ArrayList records.

In generating the web page, the server knows total hits, page number, field list, and table names. The server uses table list and field list to build a drop-down box for selecting the first table and the drop-down box for the fields, to be placed on the search result page. This web form contains all hidden values for maxPage, currentorderby, pageSize etc. It has a drop down box for selecting different tables and a drop down box for selecting sorting key. After the user selects a first table, the change of the table name calls the script to refresh the fields list by a script using ajax object. After the field list is refreshed, the user elects a field as a sorting key and sends the page back to the server. CombinedSearch conducts another search by using new sorting parameters and returns search results using the first table and sorting field. The limitSize may make many searches unnecessary. If the page size is 50 records per page and if the first table returns 13 records, the second table returns 37 of found records. The server will not search the rest of tables. It is understood that a sophisticated advance search tool, such as the one used on the edit table page and the discussion board, may be implemented to allow the user to enter a plurality of search keys with "or" and "and" match logic. When the server receives the page, it constructs a proper SQL statement consistent with the search keys and the search logic.

Q. Interactive Search and Data-Feeding Functions

The interactive search and data-feeding function is implemented by using a data source setup table, a method for defining destination field and data source, a script generator for the necessary tool, and a server's search program. The script generator is able to generate script and embed it on a data entry page for any active input field. Script for conducting interactive search and data feeding is known and can be modified. Necessary changes are in search target and the identity of the input box for accepting returned data.

If the data source contains a large number of data choices, the server has the ability to progressively narrow down data choices for the input box. If the user types the letter "e," the selection box shows only phrases starting with letter "e". If the user types in "ab", the server would display nothing if no data record starts with letters "ab."

The setup is saved in the setup table or equivalent file. One example data source setup table is: table suggest_source (table_id int, field_name varchar(50), static source varchar (5000), tabl_source varchar(5000), field_source varchar (5000), type enum('0','1','2') default '0', primary key (table_id, field_name). In this table, the table_id stores unique ID number of the table. Field_name is for storing active fields for which potential data are provided. The static source contains static data choices (also "data pieces") separated by a proper delimiter. Tabl_source contains table names separated by a proper delimiter such as semicolon, and field_source contains field names separated by a proper delimiter such as semicolon. The number of choices in the tabl_source and field_source are identical so that after they are split up to form two arrays of strings (e.g., string table[i] and string field[i]), the same index number would define the same table. Thus, table[2] and field[2] could mean the table name and field names. One example is (5, 'Description', 'letter\r\narticle@#@#regarding \r\n about@#', ';0:3,;;',', ';'; Firstname|MI|Lastname|,;;', '1'). Complex data source is available only for the destination fields which is sufficiently large. This record contains an instruction for the description field of the privilege log table ID=S. Type=1 denotes "a composite source" (also referred to as "combined source") while type=0 and type=2 denotes an interactive search feature for the field only and copying other fields. The description field uses three static data sources for three component boxes separated by "@#." The number of input components is consistent with the number of "@#" pairs. The first input component uses a static source consisting of "letter" and "article," the second one does not use any static data source, and the third one uses a static data source consisting of "regarding" and "about." Tabl_source contains table ID: the first input component does not use any table, the table ID for the second component is "0:3," (0: is not table ID) and the table ID for the third component is null. The field source contains field names: the field for the first input component is null, the field for the second component is "Firstname|MI|Lastname|," and the field for the third component is null. Type=1 means the active field does not use any component input box. An example is (5,'comment', 'A choice\r\nB choice','6;','Description,;', '0'). It does not use any of the component delimiters. The comment of table 5 uses two words and the description field of Table ID=6 as a data source. The setup is similar to the setup page for composite data source except that it has only one input box. A setup record for copying fields is (5, 'all recipients', ' ', '5', 'sender,recipients, cc-recipients', '2'). Static source field is not used. This instruction means that the data in the recipient field is formed from combining sender, recipients and cc-recipients in the order of their appearance in the setup record. The setup page displays its own table with a check box and an input box for each field box. The user selects fields and put an order numeric number (1, 2, and 3) for each of the selected fields and saves the form. In saving the setup, the order number becomes the appearance order in the setup record. The value in the table name means only one table name, but the value in a field name may mean plural field names separated by "|". The tabl_source=";0:6,5,;;" and field source="; Sender|,Sender|Recipient|CC_recipient|,;;" mean that for the second input component, the data source is the sender field of table 6 and the sender, recipient, cc_recipient fields of the table 5. The first ";" (the delimiter for input components) indicates that it has a data source that does not use any table. "," is the delimiter for table source and "|" is the delimiter for fields within a table. Delimiters, word designations, and order arrangements can be changed to achieve the same intended purposes.

In conducting interactive search and data feeding function, the code for input box contains the component order number (onkeyup="controlDiv(this, event, 'Description', '2', '0')") where "2" is the component field order. It also has a function for appending selected data pieces. A script function controlDiv(textOj, event, fieldname, fieldorder, stype){ . . . }. Inside the function, it makes a call to an ajax method for conducting interactive search: ajax.setRequestURL(cxtPath+"/SuggestServlet key="+curText.value+ "&tableid="+boardId+"&fieldName="+fieldName+"&curPage="+cur_s_page+"&FactoryName="+FactoryName+ "&BeanName="+BeanName). After the ajax request is sent, the script gets a response by using the statement: window.

setTimeout ("handleResponse(ajax);",300). The example shows how to use a script to conduct interactive searches and data feeding function for one of the component boxes.

The script may be a shared program, which can be called by any active input fields with its table ID (e.g., names) or an individual program specifically for a given field. For a simple data entry field, the interactive search and data-feeding function is similar to those used in the internet, thus all of known scripts can be used with little modifications. Script is embedded only for an active destination field that has been listed in the setup table. For a privilege log table containing ten fields, only two of them may have the need to use interactive search and feed functions. The destination field must be transformed into a proper input box on the data entry form. The server also embeds event statements for each active input box. Second, the script must use proper destination table name and field names. When the browser contacts the server, the server uses the table name and field name to conduct a search. Existing interactive search programs can be modified to use the table name and fields to do searches. While existing interactive search programs are generally for searching one field or one file, such programs can be modified to search a plurality of data fields in one or more tables. Moreover, an Ajax search program can be modified so that the last names and first names are shown in the dynamic selection box.

When the server is called to generate a data entry form for a data table, the server first checks the setup table or equivalent file to determine if any of the fields of the table is listed as an active destination field. If none of the fields is listed, the data entry page is not embedded with script for conducting interactive search. If a field is listed in the file as an active input field, the server generates required script with proper parameters (such as static field name and database table names and field names) for that field.

When the user types a key in an active input box, the typing action triggers the script to run and calls the server's search program with typed key and the data source (i.e., table names and field names) as parameters. Therefore, the server gets both the search key and the data sources, conducts a search using the data source, retrieves data that match the key, and sends the retrieved data to the client in background. The retrieved data are shown in a dynamically generated selection box according to selected sorting order. The user then selects one of the entries by highlighting it and clicking mouse or typing a proper number associated with the selected data piece. The selected data piece will be entered into the input box.

When a data component or a field uses both static data source and data table fields, it is preferable not to embed static data pieces on browser so the program allows the user to control data appearance order in the selection box. The server gets static data from the setup table and retrieves data from designated table fields. A preferable data appearance order in the selection box is putting static data prices on top of the data pieces from data table fields. If the user types a letter such as "t" to narrow down the responsive scope, the server sends all static data starting with "t" and followed by the data piece starting with "t" from data table fields. Other orders can be used, however.

If the data entry form has a second active input box, typing in a key in the second input box would call a script to call the server's search program with its search key and different table names and field names as parameters. Thus, the server searches different tables and fields, retrieves responsive data, and sends them to the selection box on the browser for display. The user can select one of the displayed data pieces for the second input box. When an input box for a field on a data entry form for a data table is coupled with the field itself, the user has no need to check if a particular record has already existed in the table. This self-coupling function helps the user avoid checking records before entering a record, and can be set up by default for the key field (or primary field) of all data tables such as names, transaction, acronym, document log, hot log, and privilege log, as a global measure to avoid duplicate entries.

R. Construct Phrases for Destination Field on a Data Entry Form

The feature allows a user to construct a phrase in an input box for a destination field. Assuming that a phrase is made of the five components: [component 1] [component 2] [component 3] [component 4] [component 5], and each of the components has the following choices:

Component 1: Letter, email, Article, Press release (static)
Component 2: prepared by counsel, sent to counsel, and provided by counsel (static)
Component 3: Attorneys: First name, Last name (database fields)
Component 4: concerning, regarding, relating (static)
Component 5: product litigation, employment relationship, customer complaint, and business transactions (static)

The construction function is implemented by using a data source setup table suggest_source, a script generator, a server's interactive search program, and a set-up tool. The task is to choose a value for each of the components listed above and appends them with a preceding space to form one string. The method of creating a phrase construction feature comprises the following steps:

1. Creating a database setup table or equivalent file for storing destination field, data source, and construction type, and their relationship.

2. The user opens a set up page associated with a target table, table Id, and the table Id or field name is passed to the page.

3. The user sets up a construction method for a destination field by providing the destination field, number of components, construction type, and data source. The user may also provide static data, and submit it to the server. The sources might be a static data source or one or more data fields of one or more data tables. It may include optional data sorting method. The system allows the user to define the number of construction components and select a construction method from one of the two choices: constructing phrase in plural component boxes or constructing phrase in a single construction box. A component may be set up to accept static data pieces only, database data only, or combination of both. Additional setup allows use to select data feeding order. For static data source, data may be fed in original order, reverse original order, alphabetic order, or reverse alphabetic order. The feeding orders for database field data include alphabetic order and reverse alphabetic order. If a component uses static data source and dynamic data source, the system by default shows the static data pieces on the top of data from database field data in the selection box.

4. The server saves the setup data in the setup table or equivalent file.

5. When a data entry form is called for the target table, the server determines if any of the fields of the target table is listed as a destination field in the setup table or file. If at least one field is a destination field, the server embeds a script on the form as a tool for conducting interactive search and feeding function, with the destination field, data source, and sorting method, as parameters.

The user types in each of the component input boxes, the client computer contacts the server's interactive search program to search the source data, retrieves data, sends data to the client computer, and displays the retrieved data on the browser for the user to select. If a phrase is constructed in one single input box, the user needs to enter suitable advance keys between two data components. The browser contains code for appending the values of all components with a separator space. After the user finishes entering data for all input boxes, the user submits the data entry form so that the server can get data and save the constructed phrase in the destination field of the target table.

Some component input boxes may accept manual input and other components may disallow the user to provide manual data to improve data consistency. When a component is not set up with a data source, it always allows manual data entry.

When a phrase construction function is set up, the setting is also saved in the setup table suggest_source or equivalent file. In this setup table, the table_id stores unique ID number of the destination table. Field_name holds the name of the destination field ("destination field") to which suggestion data is provided. The static source stores words and phrases separated by a proper delimiter as suggestion data. Tabl_source contains table names separated by a proper delimiter such as semicolon, and field_source contains field names separated by a proper delimiter such as semicolon. The number of data pieces in the tabl_source and field_source are identical so that they are split up to form two string arrays (e.g., string table_name[i] and string field_name[i]), the same index number means that the table name is related to the field name. The value in the table name is single (i.e., "attorney_name"), but the values in the field name may be plural separated by comma (i.e., "first_name, last_name, comment").

To set up a construction function, a privileged user can choose "Composite Data Source" option. On this page (FIG. 21), the user can add or delete input boxes by using "Add Box" or "Delete Last Box" at 664. The right top box is for inputting a static source data. By clicking Paste to N, the source data will be moved into the correspondent left box. After a construction function is set up, the setup data are saved in the suggest_source table. One example record is (5,'Description','Letter\r\nemail\r\nArticle\r\nPress release@# prepared by counsel\r\nsent to counsel\r\nprovided by counsel@#@# concerning\r\nregarding\r\nrelating@# product litigation\r\nemployment relationship\r\ncustomer complaint\r\nbusiness transactions@#',';;;0:3,;;;',';;Firstname|Lastname|,;;;','1'). The record means that a type 1 construction ("a composite construction") is set for the description field of the privilege log table. It has total five components as indicated by the "@#" count. The first and second components accepts static data sources, the third component accepts first names and last names from the attorney name table (ID=3), and the fourth and fifth components accept static data.

The system may use a static file to track data source, and the definition may look like "2:field1=table1.sfield2, table2.sfield1, and table2.sfield2" where the first numeral 2 is the table id and field1 is a destination field and the string after the equal sign defines table names and field names for the data sources. If the data-feeding function is maintained in a file, the file should contain similar definitions. Project ID, and board ID, which are unique among all projects, are used so that the same file can be used to track data sources for many projects on the server. In the alternative, if the user types in the construction box from first to the last, selects the data for each of the construction boxes, and sends the data to the server which then combines the component data to form a phrase.

When a user calls the data entry form by clicking "Enter Record," the server checks the suggest_source table or the equivalent file to determine if any data fields of the data table are listed as a destination field. If no field is listed, the program will not embed a script on the data entry page. Otherwise, the server retrieves this record and splits it at the delimiter points to yield basic information such as the total number of components, the data for the first and second components, and the data for the fourth and fifth components. It also gets the source table ID=3 and field names (first name and last name) for the third component. The server program then embeds a script with necessary parameters for calling an interactive search program for retrieving source data. The web form may contain a plurality of sets of construction boxes, and each set of construction boxes is for a destination field. It may contain a plurality of sets of construction boxes for one single destination field and the different sets of the construction boxes use different data sources. A construction function can be embedded on different data entry forms for the same destination field. Construction functions can be embedded for different input boxes for the same destination field. When plural construction boxes are used, the long construction box is not always necessary, but allows the user to see a preview of the phrase under construction.

The script contains the code of event statement for triggering the running of the script by user's action in the intended input box. The script gets user-typed keys, calls the server program using data sources and sorting methods as parameters, accepts returned data pieces from the server, displays the data pieces in the selection boxes for the user to select, and copies user-selected data pieces into the construction input box. The script contains code for appending user-selected data pieces with a preceding space to form a phrase in the construction box. If an active data input box for a destination field is set up with a static data source, the script causes the server to retrieves and sends static data source when the user types in the input box. If the active box accepts source data from dynamic data table, the script passes the table names and field names to the server, which uses in searching the source data. It retrieves data and sends it to the browser to be displayed in the selection box for the user to select.

For an example using the setup data shown in FIG. 21, when the user types in the first, second, fourth or fifth component boxes, the system retrieves the static data respectfully from the data sources. When the user types in the third component box, it passes the table name and field names to the server so that the server searches those fields by user-provided key, retrieves first names and last names from name table, and fills the selection box with retrieved names. By going through the process, it constructs a phrase "Letter sent by counsel Triten concerning product litigation." Upon submission, the server saves the formed phrase in the destination field of the data table.

A data-entry form may contain several input boxes for several destination fields, and several construction boxes and corresponding component box sets. One input box may use one data source and others may use different data sources. Two input boxes may use the same data sources or part of the same data sources. Two or more input boxes may be for the same destination field, but use different data sources. Any of the data fields, which serves as data source, may also be set up with a data source on a data entry form. If a component box uses a data field that has already had a data source, the user may use the data field or use that the data source as its data source. The script should support all applications. A script may be placed on the data entry page to copy the data from one input box to another automatically and a method is used to set up a copying function for any two input boxes.

The data entry form, which does not have sufficient space for placing a plurality of component input boxes, may contain just one input box as a "construction box." The user types in the input box, the server retrieves data pieces from the data source associated with the first component, and displays data pieces in a dynamically generated selection box. The user selects one of the data pieces and the script copies it into to the construction box. The user then types unique key or combination for advancing to the second component, and types keys, which cause the script to call the search program to get data pieces for the second component, and displays them in the dynamic selection box. The user selects a data pieces, has it appended to the data in the construction box with a preceding space, and types a switch key to advance to the third component. This process is repeated until the user finishes all components. When the user finishes the process, a phrase is constructed in the construction box. To avoid confusion from losing track of keystroke sequence, all of the sequential searches may be triggered by a combination of a unique keystroke and a number key 1, 2, 3, or 4. Further when the data source is a database field, the server should conduct interactive search to narrow down the data pieces. It is not required that every component is set up with a data source, and some components may accept user-entered data.

The construction box, where the user types keys directly, may be the input box itself. In this case, the user directly types in the input box for the destination field. When the user types in the input box, the browser shows the selection box for the user to view, selects data pieces, and advances the component. In addition, the user should be allowed to edit the final product. The construction input box may be different from the input box. In this case, the user types in the construction box, but the final result is copied into the input box for the destination field. If the phrase has N components, the user types keys in N rounds, the browser shows dynamic selection box N times, and the user selects data in the dynamic selection box N times, the user enters switch key by N−1 times, and the browser copies the user-selected data pieces from the dynamic selection box to the input box N times.

When the source data is one or more fields of the data tables, and the number of data pieces may be large, it is preferable to retrieve only the data pieces containing typed keys. The keystrokes for defining component order should be different from the keystrokes for retrieving data; the keystrokes for defining component order may be a special key plus a number key while data keystrokes are for sequential search. Keystrokes "ab" cause the server to retrieve only the words and phrases starting with "ab." Dynamically generated selection box should be labeled with the order number so the user knows if a component has been skipped. After a phrase is constructed and the data entry form is filled, the form is submitted to the server for processing. Upon receiving the form, the server retrieves data and saves it, including the constructed phrase in the data table.

The data feeding method may include (1) manually inputing data, (2) showing a static data source in an alphabetic order, (3) showing field data in an alphabetic order; and (4) showing a field data retrieved by typed keys. In addition, the user selects a keystroke such as control or other key combination as the key for advancing components.

The third method is a server construction of a phrase using unique values from other fields in the same record. Phrase construction can be performed without personal attention after all of required fields have been filled with values. The program should mark out the records that have missing component data. In addition, all resulted phrases should be verified in a quality control stage to ensure that errors from component incompatibility are fixed.

A privileged user can use tools for setting up a background construction method. This method is useful only when the destination field uses data of same table or single data from other source. The user is allowed to define a destination field, the data source fields in the same table, construction order, and static data pieces. If a component data comes from a field of a different table, it must have a single value and is able to get a single value. The system retrieves data pieces from source fields, appends them in buffers to form phrases, and finally writes them in the destination fields.

S. Personal Server Pad

A server pad is generated by a server and rendered on the browser of a client computer. Each of server pads uses a dedicated individual database table or a shared table. The data field of the server pad is a field, which is within the search scope of the global search function by the owner. Each user can get only the data pieces from user own server pad.

Two types of server pads may be used in this system. Personal server pad can be implemented by using Edit Table page with one modification: each pad uses a dedicated table. If all users share a common database table, the users do not share data. In addition, an interactive search box may be added for any key field. The data structure of the server pad can be configured as in Edit Table. The pad can be configured as a table calendar. The user under a manager account may set up the table structure for the pad as global default while the user may change the structure of the user own pad table.

Another version of server pad is shown in FIG. 29 and has seen disclosed in U.S. Pat. No. 8,548,997 and the relevant materials are incorporated by reference. The number of the users is unknown and thus the pad table cannot be created in advance. A database table or required entry on shared tables for a user is created when the account is assigned or when a user logs into the account for the first time. The table contains record_id, content fields. The server also creates a table for maintaining the information on all pad structures. This table contains user_id, record_size, font_size, and other preference data. The pad allows the user to display data on the pad by normal data entry order, reverse data entry order, alphabetic order, and/or reverse alphabetic order.

A successful implementation allows the pad to update in four views. Since data are entered into a text input box, preservation of data entry order is a challenge. If the data pieces are arranged in the user's order, the data pieces are sorted in an alphabetic order, and the data pieces are saved, the pad loses original order information. One solution to this problem is to disallow the user to update and save the pad when the pad displays its data pieces in an alphabetic or a reverse alphabetic order. When the pad displays data in alphabetic or reverse alphabetic order, the pad is displayed in a read-only mode. While the user can view and copy data for other use, the user cannot enter data piece into the main window. When the user tries to update the pad or enters data on the server pad, the user is asked to go back to the original data entry order view.

Data may be retrieved by interactive search, which may be realized by Ajax XMLHttpRequest object or through the use of Remote Scripting in browsers. The user can retrieve pad data interactively from the server asynchronously in the background. If the user types "a" in the input box, the server shows all records starting with "a" in the selection box. If the user types a second letter "b", the server shows all records starting with "ab." After the user finds a data piece, the user may move the cursor to the data piece and clicks it. This data piece enters into the data input box. The user may copy this data piece into the system's clipboard for further use. In the alternative, the user may select the data piece by moving the cursor to the data piece and dragging the cursor to the end of the data piece, and pressing on Control-C to copy the selected data piece on clip board for later use. The data-feeding function in conducting search and sorting ignores space, articles and embedded order numbers.

The search box is placed on the top of the server pad for conducting inclusive search (FIG. 29). The purpose of this search tool is to allow the user to find any data piece that contains a search key. Its implementation is substantially same as all local search tools for other tables. The database table for the user's server pad is searched by the global search. However, the global search by a user retrieves data only from the server pad table that belongs to the user. Other features include the function for setting up font size, which can be saved in a database table.

T. Data Tables Access Control

Access control is implemented in the navigation structure of the data tables. A field may be added to the Page table with a plurality of values, each denotes one access level. Some tables appear only under the accounts of the privileged users such as managers while others appear under the accounts of both privileged users and non-privileged users. The preferred embodiment has only two classes of users in addition to the administrator. As an improvement to the system, different access levels are established for different users. The roles are expanded to include several classes such as role-1, role-2, role-3, role-4, and role-5. The access levels of any data table may include level-1, level-2, level-3, level-4, and level-5, with the level-1 having the highest restriction and level-5 having the least restriction. Thus, a level-1 table can be accessed only by role-1 users, a table of level-3 can be accessed by the users of role-1, role-2, and role-3, and a table of level-5 can be access by all. Besides the gradient access control, the data tables may also have an exclusion field in the Page table for exclusion of the users of any role class. For example, the role-3 value in the exclusion field of a data table means that role-3 users cannot access the table. Each time, when the system generates navigation buttons, it gets the user's role, and the value of the access field and the value of the exclusion field in the Page table to build proper navigation button.

U. System Integrity

In the preferred embodiment, the relationship between table names and the entries in the Page Table is established by table_IDs and database table names, which are formed by prefix "t" and the table_Ids. It is understood that the relationships can be established and maintained by using common table names as database table names as long as they are unique in the database. Use of common table names is not convenient when the system runs a plurality of projects because the table names used by one group cannot be used by a second group. In one version of the embodiment, the table ID increases with the number of data tables used by all project groups. If for any reason, the entries in the Page table are not consistent with the actual data tables, the system may, but not always, malfunction. A privileged user can check the Page table's dump file and the database dump file to see if they are consistent. Inconsistency can happen as a result of failed attempt to reset the system. An error may happen as a result of using configuration tools improperly. For example, improper table name, navigation name, and field name are provided in setting up a data table.

Whenever an existing data table is not listed in the Page table or an entry exists without a corresponding data table, the administrator should compare all data tables with the entries in the Page table. The table ID automatically increases, and any table ID, which has been used and generally will not be used against by the system until the Page table is dropped and recreated. If the first project group takes IDs 1-6, the second group will take IDs 7-12. If IDs 13-21 had been used by group 3, were later deleted, and 3 more tables are added, their IDs will be 22-24. After a table is deleted, and a new table is added, the ID will be 25.

A system tool can be used to delete from the Page table the entries that are not associated with any data tables and to drop a data table that has no correspondent entry in the Page table. Assume that two records "addition" and "addition2" are spurious, they can be deleted at the server's terminal by issuing "delete from Page where table_id='22'" and "delete from Page where table_id='23'." If the database has a spurious table t24, the table can be dropped using the command "drop table t24" at the server terminal. A client tool is for deleting any data table not pointed to by any record in the Page table, and any entry in the Page table pointing to non-existing data table.

After the Page table has been used for a long time, it may be necessary to reset the system. When the table Id number is too large, it may be necessary to restart the table id number. Resetting project for a project group cannot reset the table Id numbers. When the system is configured using a default configuration file or a user's configuration file, and the board-id (table ID) will not restart from the lowest number. To restart the table ID in the Page table, the administrator issues "Drop Table" and then deletes data tables by issuing a series of commands: "drop table t1", "drop table t2", and "drop table tn." After this operation, the Page table contains no entry, the table ID will restart from 1, and the navigation bar will be reset to the initial setting.

There might be situations where resetting the Page table is not proper, but there is a need for restarting the table ID. This can be achieved through dropping the table_id field and then using the "alter the table" to add the table ID field back with the same attributes. This will renumber the table ID in all entries. Because table IDs are changed in the Page table, the names of data tables should be changed as well. This can be achieved by exporting data from data tables to dump files, and then import them back to the tables containing the same table structures.

A solution to part of the table-mismatching problem is to conduct validity check for the table structures in the configuration file and in interactive table setup process. The browser should detect improper length and impermissible characters before the upload page is submitted. A script embedded on the setup page may limit their lengths to specified values.

The database tables described in this disclosure are only examples. Tables with different structures can be used to achieve the same objective. Virtually any of the commercial database applications may be used to achieve the same objectives.

In those exemplary embodiments of the present invention, specific components, hardware parts, arrangements, and processes are used. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for collecting, storing and distributing information among a group of users using a server and at least one client computer connected to the server in a network, the method comprising the steps of:

defining a working group or a project for the group of the users by using a group name or a project identity and assigning user accounts to the users;

setting up web page configuration for the group of the users, the page configuration comprising a plurality of web pages, at least one of the web pages containing data from at least one data table used by a database application;

setting up at least one data table upon user input on a client computer by using data table setup menus on web pages, executing a configuration file, or importing a project file, wherein all of the at least one data table are used in a navigation bar-creating function, a display setup function, and a data validation function;

creating at least one navigation bar for any user of the group of the users, the navigation bar having individual buttons that are, respectfully, associated with web pages, and used for accessing associated web pages in support of data retrieval, data entry and data validation;

setting up data validation web tables and at least one data validation method for the at least one data table;

searching and retrieving data from any table of the at least one data table and presenting the retrieved data on a validated web table, a tentative web table, and/or a combined web table with embedded tools supporting voting validation, privileged user's validation, or both;

submitting data to the server upon user input from at least one of the users and saving submitted data in the at least one data table;

retrieving data from a data table of the at least one data table for at least one of the users, and sending the retrieved data to the client computer of the user for rendering; and validating data on a tentative web table and/or a combined web table by using the at least one validation method.

2. The method of claim 1, further comprising setting up a display layout for one of the at least one data table and changing display layout for a user of the group of the users.

3. The method of claim 1, further comprising changing the navigation bar upon user action on a client computer to select a navigation bar, thereby changing button names and/or the display order of the button names.

4. The method of claim 1, further comprising changing navigation bar by selecting one from navigation names in the original order, navigation names in an alphabetic order, numeric numerals in an ascending order, and capital letters in an alphabetic order.

5. The method of claim 1, wherein the step for interactively configuring at least one data table using data table setup menus on web pages further comprises creating one or more data tables, deleting one or more data tables, overwriting one or more data tables, and/or changing the table structures of one or more data tables.

6. The method of claim 1, wherein the step of setting up data tables further comprises uploading a configuration file containing table names or identities and table structures to overwrite all of the at least one data table or specified data tables for the project or the steps of deleting existing data tables, creating new data tables, and modifying data tables for storing data.

7. The method of claim 1, further comprising importing data to destination fields of the at least one data table by uploading a file containing properly delimited data.

8. A method of extending a server database application functions to browsers on a system comprising a server and at least one client computer, the least one client computer being used by at least one user, the method comprising the steps of:

operating a database application on a server;

defining a working group or a project for the at least one user by using a group name or a project identity and assigning a user account to each of the at least one user;

creating at least one data table in a database for the database application on the server by using commands on a server terminal, running database script, executing a configuration file, importing a model project file, and/or using data table setup menus on web pages, wherein table names and navigation names of the data tables are written in a setting file or a database table, as a data source tracking table;

searching and retrieving data from the at least one data table, creating web pages containing the retrieved data from the at least one data table, and rendering the created web pages on a client computer;

accepting data on a data entry page under one of the user accounts, submitting the filled data entry page to the server, obtaining data from the submitted page, and saving the obtained data in the at least one data table on the server; and modifying at least one data table, adding at least one data table, or deleting at least one data table on the server by executing a configuration file, importing a project file, uploading a configuration file, and/or submitting configuration information by using data table setup menus on web pages, wherein changes in data table names are written in the data source tracking table, whereby the server maintains data access to the database.

9. The method of claim 8, further comprising setting up a display layout for one table of the at least one data table wherein a display layout setting defines data display lengths of data fields, data line numbers for data records, and data alignment for each data field.

10. The method of claim 8, further comprising creating a setup file for setting up data tables for system recovery.

11. The method of claim 8, further comprising updating data tables within a production cycle, wherein the updating step further includes exporting a configuration file or a project file from the system, importing the configuration file or the exported project file into a non-production system, implementing necessary modifications to data table names and data structures, and transferring the modifications from the non-production system to the system by importing a pre-tested configuration file or a project file exported from the non-production system.

12. The method of claim 8, further comprising setting up a data source for a destination field of one table of the at least one data table or uploading a file containing properly delimited data and copying the data into a data source setup table, and conducting interactive data entry in an input box for the destination field.

13. The method of claim 8, further comprising generating a data validation web table in support of at least one data validation method for the at least one data table, wherein the at least one data validation method comprises manager validation, voting validation, or both.

14. The method of claim 8, further comprising adding new user accounts, deleting user accounts, or modifying user accounts for users.

15. A method of extending server database application functions to browsers on a system comprising a server and at least one client computer, each client computer being used by a user, the method comprising the steps of:

developing a web application which can generate web pages supporting the functions of: accessing a database from client computers, accessing data in at least one data table of the database, searching at least one data table in the database, and entering data into at least one data table in the database;

installing a database application on a server;

deploying the web application on the server and allowing the web application to communicate with the database application and creating a database for the database application;

creating a file or database table, as a data source tracking table, for tracking data sources that are used by the deployed web application, wherein the data sources comprise data tables only, or a combination of data tables and static web pages;

creating at least one data table upon user input from a client computer using the deployed web application by using a method of uploading a configuration file, importing a project file, or using data table setup menus on web pages, wherein table names and navigation names of the data tables are written in the data source tracking table for the at least one user and the at least one data table is for storing data in the database on the server;

generating at least one navigation bar being placed on web pages allowing a user to select any associated web pages for accessing associated data sources;

generating a web page together with an embedded navigation bar in support of searching the at least one data table, retrieving data from the at least one data table, creating a web page containing the retrieved data, and rendering the created web page on a client computer;

generating a web page together with an embedded navigation bar in support of entering data, submitting the page filled with data to the server, obtaining the data from the submitted page, and saving the obtained data in the at least one data table on the server; and modifying at least one data table, adding at least one data table, or deleting at least one data table on the server by uploading a configuration file, importing a project file, or submitting configuration information created by using data table setup menus on web pages, wherein the server writes changes in data table names or data sources in the data source tracking table to maintain the deployed web application's access to the data tables in the database without code modifications and redeployment of the deployed web application.

16. The method of claim 15, further comprising setting up a display layout for one of the at least one data tables and changing display layout for any user, wherein a display layout setting for a data table defines data display widths of data fields, total data lines or input boxes, and data alignment of each data field on a web page.

17. The method of claim 15, wherein the at least one navigation bar for any user of the at least one user comprises at least two navigation bars with features selected from the group consisting of original navigation button names in an original order, original navigation button names in an alphabetic order, original navigation button names in a reverse alphabetic order, numeric numbers in an acceding order, numeric numbers in a descending order, correspondent letters in an alphabetic order, and correspondent letters in a reverse alphabetic order.

18. The method of claim 15, further comprising updating the data tables upon user action by any of the at least one user by (1) exporting a configuration file or a project file from the system, (2) importing the exported configuration or the exported project file in a non-production system, (3) implementing necessary modifications in data tables and data structures in the non-production system, and (4) exporting a configuration file or a project file from the non-production system and re-importing the modified configuration or project file to the system.

19. The method of claim 15, further comprising setting up a data source for a destination field of one of the at least one data table and generating interactive data entry form containing at least one interactive input box, conducting an interactive search in the data source, retrieving responsive data, sending the retrieved data to the client computer for selection by a user on a client computer, and repeating interactive searches upon entering additional characters.

20. The method of claim 15 wherein the step for configuring at least one data table using data table setup menus on web pages further comprises creating one or more data tables, deleting one or more data tables, overwriting one or more data tables, and/or changing the table structures of one or more data tables.

* * * * *